US009883198B2

(12) United States Patent
Puri et al.

(10) Patent No.: US 9,883,198 B2
(45) Date of Patent: Jan. 30, 2018

(54) VIDEO CODEC ARCHITECTURE FOR NEXT GENERATION VIDEO

(71) Applicant: Intel Corporation, Santa Clara, CA (US)

(72) Inventors: Atul Puri, Redmond, WA (US); Neelesh Gokhale, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 211 days.

(21) Appl. No.: 14/435,734

(22) PCT Filed: Nov. 13, 2013

(86) PCT No.: PCT/US2013/069960
§ 371 (c)(1),
(2) Date: Apr. 14, 2015

(87) PCT Pub. No.: WO2014/109826
PCT Pub. Date: Jul. 17, 2014

(65) Prior Publication Data
US 2015/0229948 A1 Aug. 13, 2015

Related U.S. Application Data

(60) Provisional application No. 61/725,576, filed on Nov. 13, 2012, provisional application No. 61/758,314, filed on Jan. 30, 2013.

(51) Int. Cl.
*H04N 19/50* (2014.01)
*H04N 19/00* (2014.01)
(Continued)

(52) U.S. Cl.
CPC .......... *H04N 19/52* (2014.11); *H04N 19/105* (2014.11); *H04N 19/117* (2014.11);
(Continued)

(58) Field of Classification Search
CPC ........ H04N 19/52; H04N 19/91; H04N 19/12; H04N 19/573; H04N 19/615;
(Continued)

(56) References Cited

U.S. PATENT DOCUMENTS 8,009,965 B2 * 8/2011 Takao .................. G11B 27/034
348/700
9,232,227 B2 * 1/2016 Maani .................. H04N 19/159
(Continued)

FOREIGN PATENT DOCUMENTS

CN 101518085 A 8/2009
CN 102595127 A 7/2012
(Continued)

OTHER PUBLICATIONS

Notice of Preliminary Rejection for Korean Patent Appln. No. 2015-7009522 and translation, mailed Apr. 20, 2016, 5 pages.
(Continued)

*Primary Examiner* — Christopher S Kelley
*Assistant Examiner* — Nasim Nirjhar
(74) *Attorney, Agent, or Firm* — Jordan IP Law, LLC

(57) ABSTRACT

Techniques related to video codec architecture for next generation video are described.

24 Claims, 35 Drawing Sheets

(51) Int. Cl.
*H04N 19/52* (2014.01)
*H04N 19/105* (2014.01)
*H04N 19/176* (2014.01)
*H04N 19/119* (2014.01)
*H04N 19/61* (2014.01)
*H04N 19/117* (2014.01)
*H04N 19/14* (2014.01)
*H04N 19/82* (2014.01)
*H04N 19/86* (2014.01)
*H04N 19/124* (2014.01)
*H04N 19/172* (2014.01)
*H04N 19/169* (2014.01)
*H04N 19/577* (2014.01)
*H04N 19/615* (2014.01)
*H04N 19/80* (2014.01)
*H04N 19/91* (2014.01)
*H04N 19/573* (2014.01)
*H04N 19/12* (2014.01)

(52) U.S. Cl.
CPC ........... *H04N 19/119* (2014.11); *H04N 19/12* (2014.11); *H04N 19/124* (2014.11); *H04N 19/14* (2014.11); *H04N 19/172* (2014.11); *H04N 19/176* (2014.11); *H04N 19/1887* (2014.11); *H04N 19/573* (2014.11); *H04N 19/577* (2014.11); *H04N 19/61* (2014.11); *H04N 19/615* (2014.11); *H04N 19/80* (2014.11); *H04N 19/82* (2014.11); *H04N 19/86* (2014.11); *H04N 19/91* (2014.11)

(58) Field of Classification Search
CPC ............. H04N 19/1887; H04N 19/172; H04N 19/577; H04N 19/80; H04N 19/124; H04N 19/105; H04N 19/82; H04N 19/61; H04N 19/86; H04N 19/119; H04N 19/176; H04N 19/14; H04N 19/117
See application file for complete search history.

(56) References Cited

U.S. PATENT DOCUMENTS

| | | | | |
|---|---|---|---|---|
| 2009/0175333 A1* | 7/2009 | Hsiang | ................... | H04N 19/63 375/240.12 |
| 2010/0040146 A1* | 2/2010 | Wang | ................... | H04N 19/63 375/240.16 |
| 2010/0046845 A1* | 2/2010 | Wedi | .................... | H04N 19/619 382/233 |
| 2010/0061461 A1* | 3/2010 | Bankoski | ............. | H04N 19/105 375/240.16 |
| 2011/0255610 A1* | 10/2011 | Kameyama | ........... | G06T 3/4053 375/240.26 |
| 2012/0257677 A1* | 10/2012 | Bankoski | ............. | H04N 19/105 375/240.16 |
| 2012/0281928 A1* | 11/2012 | Cohen | ...................... | G06T 9/40 382/240 |

FOREIGN PATENT DOCUMENTS

| | | | |
|---|---|---|---|
| JP | 20030206583 A | | 8/2003 |
| JP | 2004007650 A | | 1/2004 |
| JP | 20060171569 A | | 6/2006 |
| JP | 2008182562 A | | 8/2008 |
| JP | 2011217105 A | | 10/2011 |
| JP | 2011223319 A | | 11/2013 |
| WO | 2009021062 A1 | | 2/2009 |
| WO | WO 2009021062 A1 | * | 2/2009 |
| WO | 2011128269 A1 | | 10/2011 |
| WO | WO 2011128269 A1 | * | 10/2011 |
| WO | 2014109826 A1 | | 7/2014 |

OTHER PUBLICATIONS

First Office Action for Japanese Patent Application. No. 2015-542040 and translation, mailed Aug. 2, 2016, 5 pages.

Bossen, et al., Video Coding Using a Simplified B lock Structure and Advanced Coding Techniques, IEEE Transactions on Circuits and Systems for Video Technology Year: 2010, IEEE Circuits and Systems Society, Nov. 15, 2010, vol. 20, Issue 12, pp. 1667-1675.

International Preliminary Report on Patentability for PCT/US2013/069960, mailed May 28, 2015, 7 pages.

International Search Report and Written Opinion for PCT/US2013/069960, mailed Mar. 14, 2014, 11 pages.

Office Action for Chinese Patent Application No. 201380053514.7, dated Apr. 12, 2017, 11 pages including 6 pages of English translation.

Search Report for European Patent Application No. 13870772.4, dated Jun. 15, 2016, 10 pages.

Office Action for European Patent Application No. 13870772.4, dated Jun. 1, 2017, 4 pages.

Notice of Allowance for Korean Patent Application No. 10-2015-7009522, dated Aug. 12, 2016, 5 pages including 2 pages of English translation.

Minasyan et al., "An Image Compression Scheme Based on Parametric Haar-like Transform", 2005 IEEE, pp. 2088-2091.

* cited by examiner

VIDEO CODEC ARCHITECTURE FOR NEXT GENERATION VIDEO

RELATED APPLICATIONS

The present application claims the benefit of U.S. Provisional Application No. 61/725,576 filed 13 Nov. 2012, and titled "CONTENT ADAPTIVE VIDEO CODER", as well as U.S. Provisional Application No. 61/758,314 filed 30 Jan. 2013, and titled "NEXT GENERATION VIDEO CODING".

BACKGROUND

A video encoder compresses video information so that more information can be sent over a given bandwidth. The compressed signal may then be transmitted to a receiver having a decoder that decodes or decompresses the signal prior to display.

High Efficient Video Coding (HEVC) is the latest video compression standard, which is being developed by the Joint Collaborative Team on Video Coding (JCT-VC) formed by ISO/IEC Moving Picture Experts Group (MPEG) and ITU-T Video Coding Experts Group (VCEG). HEVC is being developed in response to the previous H.264/AVC (Advanced Video Coding) standard not providing enough compression for evolving higher resolution video applications. Similar to previous video coding standards, HEVC includes basic functional modules such as intra/inter prediction, transform, quantization, in-loop filtering, and entropy coding.

The ongoing HEVC standard may attempt to improve on limitations of the H.264/AVC standard such as limited choices for allowed prediction partitions and coding partitions, limited allowed multiple references and prediction generation, limited transform block sizes and actual transforms, limited mechanisms for reducing coding artifacts, and inefficient entropy encoding techniques. However, the ongoing HEVC standard may use iterative approaches to solving such problems.

For instance, with ever increasing resolution of video to be compressed and expectation of high video quality, the corresponding bitrate/bandwidth required for coding using existing video coding standards such as H.264 or even evolving standards such as H.265/HEVC, is relatively high. The aforementioned standards use expanded forms of traditional approaches to implicitly address the insufficient compression/quality problem, but often the results are limited.

This disclosure, developed within the context of a Next Generation Video (NGV) codec project, addresses the general problem of designing an advanced video codec that maximizes the achievable compression efficiency while remaining sufficiently practical for implementation on devices. For instance, with ever increasing resolution of video and expectation of high video quality due to availability of good displays, the corresponding bitrate/bandwidth required using existing video coding standards such as earlier MPEG standards and even the more recent H.264/AVC standard, is relatively high. H.264/AVC was not perceived to be providing high enough compression for evolving higher resolution video applications.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1A:
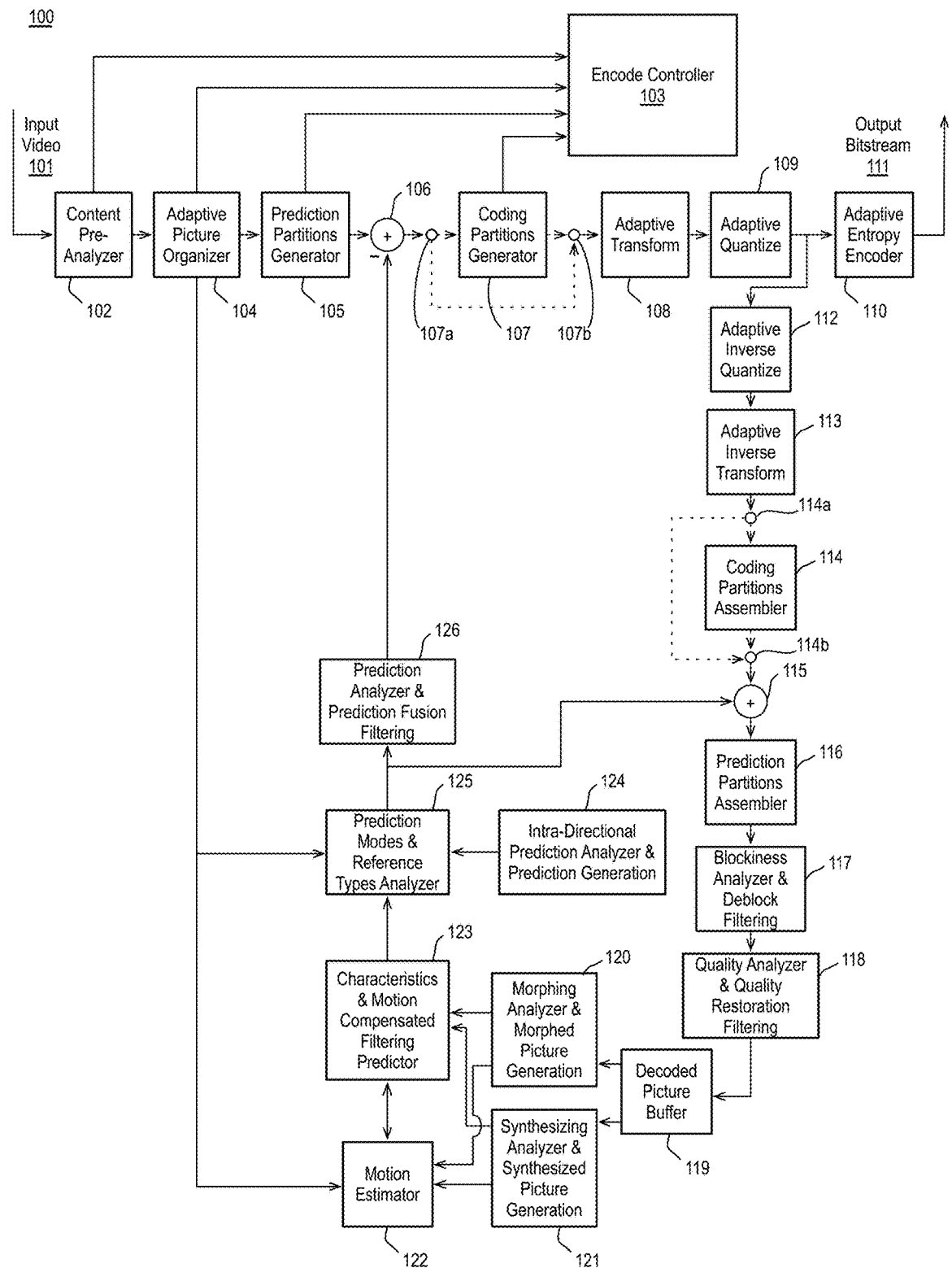
FIG. 1(a) is an illustrative diagram of an example next generation video encoder.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.); and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Systems, apparatus, articles, and methods are described below related to content adaptive partitioning for prediction and coding for next generation video coding.

As discussed above, with ever increasing resolution of video and expectation of high video quality due to availability of good displays, the corresponding bitrate/bandwidth required using existing video coding standards such as earlier MPEG standards and even the more recent H.264/AVC standard, is relatively high. In fact, the development of a new standard (HEVC) was deemed necessary as H.264/AVC was not perceived to be providing high enough compression for evolving higher resolution video applications.

The H.264/AVC coding standard, while it represents improvement over past MPEG standards, is still very limiting. For example, the ongoing HEVC standard has the following limitations: 1). the choices for allowed prediction partitions and coding partitions are very limited; 2). the allowed multiple references, and predictions generation are very limited; 3). the transform block sizes, and actual transforms available are very limited; 4). the mechanism for reducing coding artifacts (deblocking only) is very limited; and 5). entropy coding techniques for overhead data (modes, motion vectors etc) are not efficient. The aforementioned limitations of the state of the art standards such as H.264 are recognized by the ongoing work in HEVC that uses an iterative approach to fixing these limitations.

As will be discussed in greater detail below, this disclosure is developed within the context of Next Generation Video (NGV) codec project addresses the general problem of designing an advanced video codec that maximizes the achievable compression efficiency while remaining sufficiently practical for implementation on devices. The aforementioned limitations of the state of the art standards such as H.264 are recognized by the ongoing work in HEVC that uses an iterative approach to fixing these limitations, as opposed to the approaches used by NGV video coding system described by this disclosure.

NGV video coding differs from standards based approaches as it naturally incorporates significant content based adaptivity in video coding process to achieve higher compression. By comparison, standards based video coding approaches typically tend to squeeze higher gains by adaptations and fine tuning of legacy approaches. For instance, all standards based approaches heavily rely on adapting and further tweaking of motion compensated interframe coding as the primary means to reduce prediction differences to achieve gains. On the other hand, NGV, in addition to exploiting interframe differences due to motion, also exploits other types of interframe differences (gain, blur, registration) that naturally exist in typical video scenes.

As used herein, the term "coder" may refer to an encoder and/or a decoder. Similarly, as used herein, the term "coding" may refer to performing video encoding via an encoder and/or performing video decoding via a decoder. For example, a video encoder and video decoder may both be examples of coders capable of coding video data. In addition, as used herein, the term "codec" may refer to any process, program or set of operations, such as, for example, any combination of software, firmware, and/or hardware that may implement an encoder and/or a decoder. Further, as used herein, the phrase "video data" may refer to any type of data associated with video coding such as, for example, video frames, image data, encoded bit stream data, or the like.

FIG. 1(a) is an illustrative diagram of an example next generation video encoder 100, arranged in accordance with at least some implementations of the present disclosure. As shown, encoder 100 may receive input video 101. Input video 101 may include any suitable input video for encoding such as, for example, input frames of a video sequence. As shown, input video 101 may be received via a content pre-analyzer module 102. Content pre-analyzer module 102 may be configured to perform analysis of the content of video frames of input video 101 to determine various types of parameters for improving video coding efficiency and speed performance. For example, content pre-analyzer module 102 may determine horizontal and vertical gradient information (e.g., Rs, Cs), variance, spatial complexity per picture, temporal complexity per picture, scene change detection, motion range estimation, gain detection, prediction distance estimation, number of objects estimation, region boundary detection, spatial complexity map computation, focus estimation, film grain estimation, or the like. The parameters generated by content pre-analyzer module 102 may be used by encoder 100 (e.g., via encode controller 103) and/or quantized and communicated to a decoder. As shown, video frames and/or other data may be transmitted from content pre-analyzer module 102 to adaptive picture organizer module 104, which may determine the picture type (e.g., I-, P-, or F/B-picture) of each video frame and reorder the video frames as needed. In some examples, adaptive picture organizer module 104 may include a frame portion generator configured to generate frame portions. In some examples, content pre-analyzer module 102 and adaptive picture organizer module 104 may together be considered a pre-analyzer subsystem of encoder 100.

As shown, video frames and/or other data may be transmitted from adaptive picture organizer module 104 to prediction partitions generator module 105. In some examples, prediction partitions generator module 105 may divide a frame or picture into tiles or super-fragments or the like. In some examples, an additional module (e.g., between modules 104 and 105) may be provided for dividing a frame or picture into tiles or super-fragments. Prediction partitions generator module 105 may divide each tile or super-fragment into potential prediction partitionings or partitions. In some examples, the potential prediction partitionings may be determined using a partitioning technique such as, for example, a k-d tree partitioning technique, a bi-tree partitioning technique, or the like, which may be determined based on the picture type (e.g., I-, P-, or F/B-picture) of individual video frames, a characteristic of the frame portion being partitioned, or the like. In some examples, the determined potential prediction partitionings may be partitions for prediction (e.g., inter- or intra-prediction) and may be described as prediction partitions or prediction blocks or the like.

In some examples, a selected prediction partitioning (e.g., prediction partitions) may be determined from the potential prediction partitionings. For example, the selected prediction partitioning may be based on determining, for each potential prediction partitioning, predictions using characteristics and motion based multi-reference predictions or intra-predictions, and determining prediction parameters. For each potential prediction partitioning, a potential prediction error may be determined by differencing original pixels with prediction pixels and the selected prediction partitioning may be the potential prediction partitioning with the minimum prediction error. In other examples, the selected prediction partitioning may be determined based on a rate distortion optimization including a weighted scoring based on number of bits for coding the partitioning and a prediction error associated with the prediction partitioning.

As shown, the original pixels of the selected prediction partitioning (e.g., prediction partitions of a current frame) may be differenced with predicted partitions (e.g., a prediction of the prediction partition of the current frame based on a reference frame or frames and other predictive data such as inter- or intra-prediction data) at differencer 106. The determination of the predicted partitions will be described further below and may include a decode loop as shown in FIG. 1(a). Any residuals or residual data (e.g., partition prediction error data) from the differencing may be transmitted to coding partitions generator module 107. In some examples, such as for intra-prediction of prediction partitions in any picture type (I-, F/B- or P-pictures), coding partitions generator module 107 may be bypassed via switches 107a and 107b. In such examples, only a single level of partitioning may be performed. Such partitioning may be described as prediction partitioning (as discussed) or coding partitioning or both. In various examples, such partitioning may be performed via prediction partitions generator module 105 (as discussed) or, as is discussed further herein, such partitioning may be performed via a k-d tree intra-prediction/coding partitioner module or a bi-tree intra-prediction/coding partitioner module implemented via coding partitions generator module 107.

In some examples, the partition prediction error data, if any, may not be significant enough to warrant encoding. In other examples, where it may be desirable to encode the partition prediction error data and the partition prediction error data is associated with inter-prediction or the like, coding partitions generator module 107 may determine coding partitions of the prediction partitions. In some examples, coding partitions generator module 107 may not be needed as the partition may be encoded without coding partitioning (e.g., as shown via the bypass path available via switches 107a and 107b). With or without coding partitioning, the partition prediction error data (which may subsequently be described as coding partitions in either event) may be transmitted to adaptive transform module 108 in the event the residuals or residual data require encoding. In some examples, prediction partitions generator module 105 and coding partitions generator module 107 may together be considered a partitioner subsystem of encoder 100. In various examples, coding partitions generator module 107 may operate on partition prediction error data, original pixel data, residual data, or wavelet data.

Coding partitions generator module 107 may generate potential coding partitionings (e.g., coding partitions) of, for example, partition prediction error data using bi-tree and/or k-d tree partitioning techniques or the like. In some examples, the potential coding partitions may be transformed using adaptive or fixed transforms with various block sizes via adaptive transform module 108 and a selected coding partitioning and selected transforms (e.g., adaptive or fixed) may be determined based on a rate distortion optimization or other basis. In some examples, the selected coding partitioning and/or the selected transform(s) may be determined based on a predetermined selection method based on coding partitions size or the like.

For example, adaptive transform module 108 may include a first portion or component for performing a parametric transform to allow locally optimal transform coding of small to medium size blocks and a second portion or component for performing globally stable, low overhead transform coding using a fixed transform, such as a discrete cosine transform (DCT) or a picture based transform from a variety of transforms, including parametric transforms, or any other configuration as is discussed further herein. In some examples, for locally optimal transform coding a Parametric Haar Transform (PHT) may be performed, as is discussed further herein. In some examples, transforms may be performed on 2D blocks of rectangular sizes between about 4×4 pixels and 64×64 pixels, with actual sizes depending on a number of factors such as whether the transformed data is luma or chroma, or inter or intra, or if the determined transform used is PHT or DCT or the like.

As shown, the resultant transform coefficients may be transmitted to adaptive quantize module 109. Adaptive quantize module 109 may quantize the resultant transform coefficients. Further, any data associated with a parametric transform, as needed, may be transmitted to either adaptive quantize module 109 (if quantization is desired) or adaptive entropy encoder module 110. Also as shown in FIG. 1(a), the quantized coefficients may be scanned and transmitted to adaptive entropy encoder module 110. Adaptive entropy encoder module 110 may entropy encode the quantized coefficients and include them in output bitstream 111. In some examples, adaptive transform module 108 and adaptive quantize module 109 may together be considered a transform encoder subsystem of encoder 100.

As also shown in FIG. 1(a), encoder 100 includes a local decode loop. The local decode loop may begin at adaptive inverse quantize module 112. Adaptive inverse quantize module 112 may be configured to perform the opposite operation(s) of adaptive quantize module 109 such that an inverse scan may be performed and quantized coefficients may be de-scaled to determine transform coefficients. Such an adaptive quantize operation may be lossy, for example. As shown, the transform coefficients may be transmitted to an adaptive inverse transform module 113. Adaptive inverse transform module 113 may perform the inverse transform as that performed by adaptive transform module 108, for example, to generate residuals or residual values or partition prediction error data (or original data or wavelet data, as discussed) associated with coding partitions. In some examples, adaptive inverse quantize module 112 and adaptive inverse transform module 113 may together be considered a transform decoder subsystem of encoder 100.

As shown, the partition prediction error data (or the like) may be transmitted to optional coding partitions assembler 114. Coding partitions assembler 114 may assemble coding partitions into decoded prediction partitions as needed (as shown, in some examples, coding partitions assembler 114 may be skipped via switches 114a and 114b such that decoded prediction partitions may have been generated at adaptive inverse transform module 113) to generate prediction partitions of prediction error data or decoded residual prediction partitions or the like.

As shown, the decoded residual prediction partitions may be added to predicted partitions (e.g., prediction pixel data) at adder 115 to generate reconstructed prediction partitions. The reconstructed prediction partitions may be transmitted to prediction partitions assembler 116. Prediction partitions assembler 116 may assemble the reconstructed prediction partitions to generate reconstructed tiles or super-fragments. In some examples, coding partitions assembler module 114 and prediction partitions assembler module 116 may together be considered an un-partitioner subsystem of encoder 100.

The reconstructed tiles or super-fragments may be transmitted to blockiness analyzer and deblock filtering module 117. Blockiness analyzer and deblock filtering module 117 may deblock and dither the reconstructed tiles or super-fragments (or prediction partitions of tiles or super-fragments). The generated deblock and dither filter parameters may be used for the current filter operation and/or coded in output bitstream 111 for use by a decoder, for example. The output of blockiness analyzer and deblock filtering module 117 may be transmitted to a quality analyzer and quality restoration filtering module 118. Quality analyzer and quality restoration filtering module 118 may determine QR filtering parameters (e.g., for a QR decomposition) and use the determined parameters for filtering. The QR filtering parameters may also be coded in output bitstream 111 for use by a decoder. As shown, the output of quality analyzer and quality restoration filtering module 118 may be transmitted to decoded picture buffer 119. In some examples, the output of quality analyzer and quality restoration filtering module 118 may be a final reconstructed frame that may be used for prediction for coding other frames (e.g., the final reconstructed frame may be a reference frame or the like). In some examples, blockiness analyzer and deblock filtering module 117 and quality analyzer and quality restoration filtering module 118 may together be considered a filtering subsystem of encoder 100.

In encoder 100, prediction operations may include inter- and/or intra-prediction. As shown in FIG. 1(a), inter-prediction may be performed by one or more modules including morphing analyzer and morphed picture generation module 120, synthesizing analyzer and generation module 121, and characteristics and motion filtering predictor module 123. Morphing analyzer and morphed picture generation module 120 may analyze a current picture to determine parameters for changes in gain, changes in dominant motion, changes in registration, and changes in blur with respect to a reference frame or frames with which it may be to be coded. The determined morphing parameters may be quantized/de-quantized and used (e.g., by morphing analyzer and morphed picture generation module 120) to generate morphed reference frames that that may be used by motion estimator module 122 for computing motion vectors for efficient motion (and characteristics) compensated prediction of a current frame. Synthesizing analyzer and generation module 121 may generate super resolution (SR) pictures and projected interpolation (PI) pictures or the like for motion for determining motion vectors for efficient motion compensated prediction in these frames.

Motion estimator module 122 may generate motion vector data based on morphed reference frame(s) and/or super resolution (SR) pictures and projected interpolation (PI) pictures along with the current frame. In some examples, motion estimator module 122 may be considered an inter-prediction module. For example, the motion vector data may be used for inter-prediction. If inter-prediction is applied, characteristics and motion compensated filtering predictor module 123 may apply motion compensation as part of the local decode loop as discussed.

Intra-prediction may be performed by intra-directional prediction analyzer and prediction generation module 124. Intra-directional prediction analyzer and prediction generation module 124 may be configured to perform spatial directional prediction and may use decoded neighboring partitions. In some examples, both the determination of direction and generation of prediction may be performed by intra-directional prediction analyzer and prediction generation module 124. In some examples, intra-directional prediction analyzer and prediction generation module 124 may be considered an intra-prediction module.

As shown in FIG. 1(a), prediction modes and reference types analyzer module 125 may allow for selection of prediction modes from among, "skip", "auto", "inter", "split", "multi", and "intra", for each prediction partition of a tile (or super-fragment), all of which may apply to P- and F/B-pictures. In addition to prediction modes, it also allows for selection of reference types that can be different depending on "inter" or "multi" mode, as well as for P- and F/B-pictures. The prediction signal at the output of prediction modes and reference types analyzer module 125 may be filtered by prediction analyzer and prediction fusion filtering module 126. Prediction analyzer and prediction fusion filtering module 126 may determine parameters (e.g., filtering coefficients, frequency, overhead) to use for filtering and may perform the filtering. In some examples, filtering the prediction signal may fuse different types of signals representing different modes (e.g., intra, inter, multi, split, skip, and auto). In some examples, intra-prediction signals may be different than all other types of inter-prediction signal(s) such that proper filtering may greatly enhance coding efficiency. In some examples, the filtering parameters may be encoded in output bitstream 111 for use by a decoder. The filtered prediction signal may provide the second input (e.g., prediction partition(s)) to differencer 106, as discussed above, that may determine the prediction difference signal (e.g., partition prediction error) for coding discussed earlier. Further, the same filtered prediction signal may provide the second input to adder 115, also as discussed above. As discussed, output bitstream 111 may provide an efficiently encoded bitstream for use by a decoder for the presentment of video.

Figure 1B:
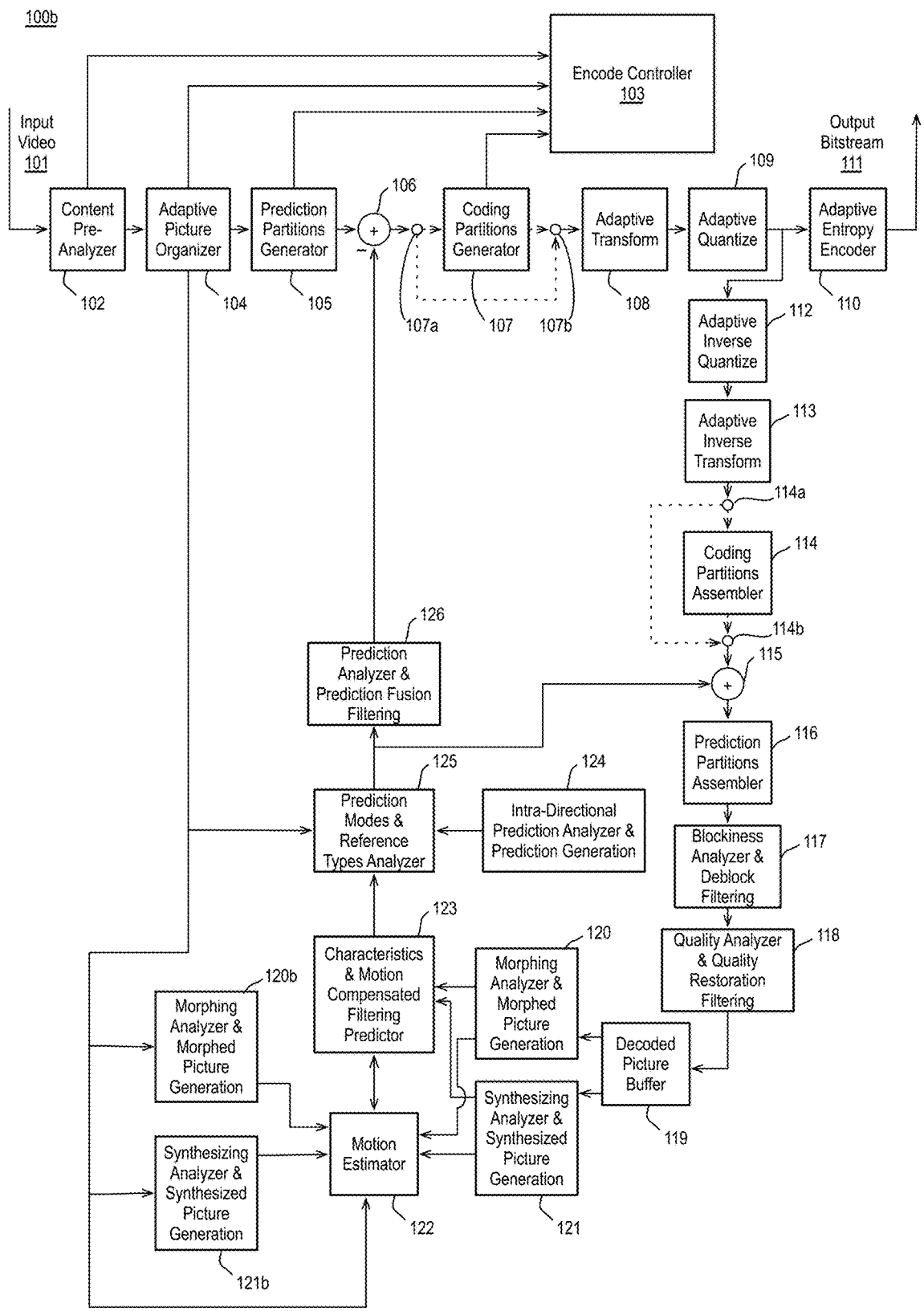
FIG. 1(b) is an illustrative diagram of an example next generation video encoder.

FIG. 1(b) is an illustrative diagram of an example next generation video encoder 100b, arranged in accordance with at least some implementations of the present disclosure. FIG. 1(b) presents a similar encoder to that shown in FIG. 1(a), and similar elements will not be repeated for the sake of brevity. As shown in FIG. 1(b), encoder 100b may include morphing analyzer and morphed picture generation module 120b and synthesizing analyzer and generation module 121b. In this example configuration, morphing analyzer and morphed picture generation module 120b and synthesizing analyzer and generation module 121b may receive output from adaptive picture organizer 104. Morphing analyzer and morphed picture generation module 120b and synthesizing analyzer and generation module 121b may be considered "out-of-loop" in that the operation of morphing analyzer and morphed picture generation module 120b and synthesizing analyzer and generation module 121b may not occur in the local decode loop. Conversely, morphing analyzer and morphed picture generation module 120 and synthesizing analyzer and generation module 121 may be considered "in-loop" in that the operation of morphing analyzer and morphed picture generation module 120 and synthesizing analyzer and generation module 121 may occur in the local decode loop.

Referring back to FIG. 1(a), encoder 100 that differs slightly from encoder 100b of FIG. 1(a). One feature to the illustrated example is the particular location of morphing analyzer and morphed picture generation module 120 and in the location of synthesizing analyzer and synthesized picture generation module 121. In FIG. 1(a) these operations are shown in prediction loop such that the analysis needed for morph parameters generation or synth parameters generation may be performed on decoded pictures rather than on original frames as shown in FIG. 1(b). Thus the morph and synth parameters generation structure provides better results however, at the expense of some delay as analysis may be now based on the decoded pictures and can't be done on original frames.

Figure 2:
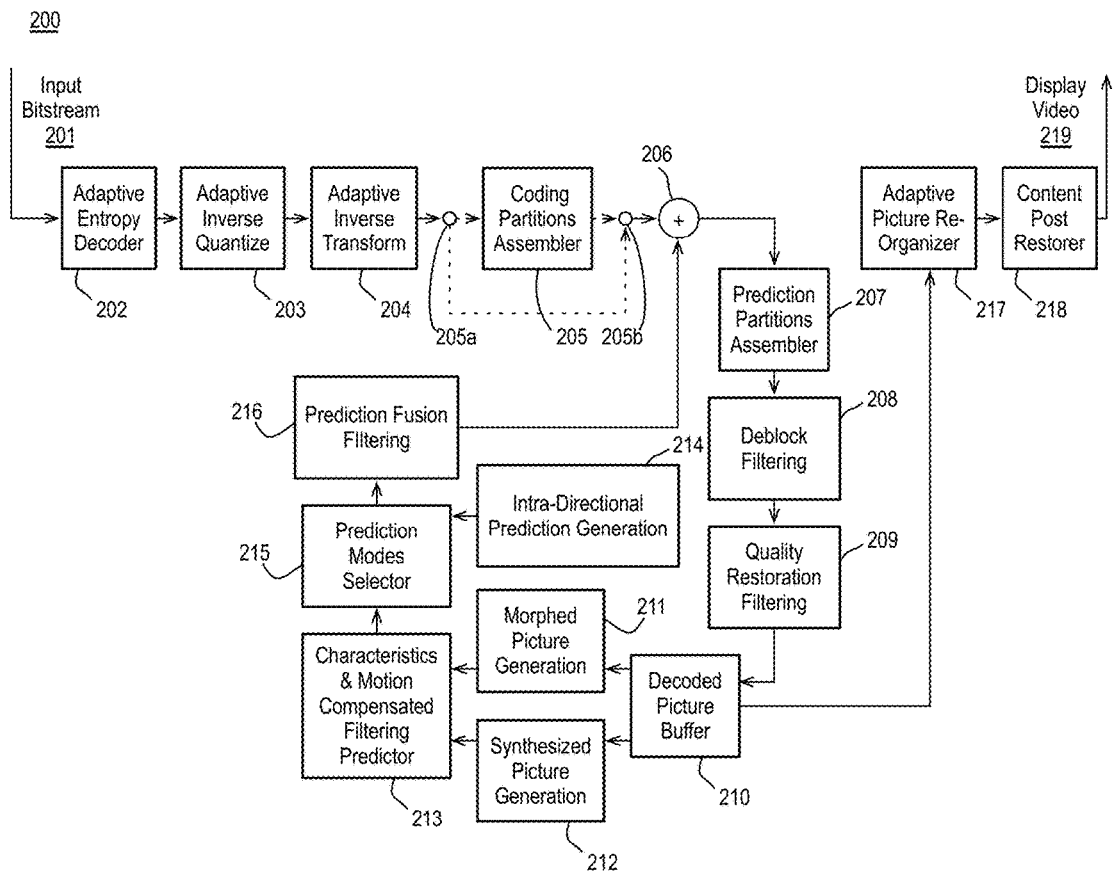
FIG. 2 is an illustrative diagram of an example next generation video decoder.

FIG. 2 is an illustrative diagram of an example next generation video decoder 200, arranged in accordance with at least some implementations of the present disclosure. As shown, decoder 200 may receive an input bitstream 201. In some examples, input bitstream 201 may be encoded via encoder 100 and/or via the encoding techniques discussed herein. As shown, input bitstream 201 may be received by an adaptive entropy decoder module 202. Adaptive entropy decoder module 202 may decode the various types of encoded data (e.g., overhead, motion vectors, transform coefficients, etc.). In some examples, adaptive entropy decoder 202 may use a variable length decoding technique. In some examples, adaptive entropy decoder 202 may perform the inverse operation(s) of adaptive entropy encoder module 110 discussed above.

The decoded data may be transmitted to adaptive inverse quantize module 203. Adaptive inverse quantize module 203 may be configured to inverse scan and de-scale quantized coefficients to determine transform coefficients. Such an adaptive quantize operation may be lossy, for example. In some examples, adaptive inverse quantize module 203 may be configured to perform the opposite operation of adaptive quantize module 109 (e.g., substantially the same operations as adaptive inverse quantize module 112). As shown, the transform coefficients (and, in some examples, transform data for use in a parametric transform) may be transmitted to an adaptive inverse transform module 204. Adaptive inverse transform module 204 may perform an inverse transform on the transform coefficients to generate residuals or residual values or partition prediction error data (or original data or wavelet data) associated with coding partitions. In some examples, adaptive inverse transform module 204 may be configured to perform the opposite operation of adaptive transform module 108 (e.g., substantially the same operations as adaptive inverse transform module 113). In some examples, adaptive inverse transform module 204 may perform an inverse transform based on other previously decoded data, such as, for example, decoded neighboring partitions. In some examples, adaptive inverse quantize module 203 and adaptive inverse transform module 204 may together be considered a transform decoder subsystem of decoder 200.

As shown, the residuals or residual values or partition prediction error data may be transmitted to coding partitions assembler 205. Coding partitions assembler 205 may assemble coding partitions into decoded prediction partitions as needed (as shown, in some examples, coding partitions assembler 205 may be skipped via switches 205a and 205b such that decoded prediction partitions may have been generated at adaptive inverse transform module 204). The decoded prediction partitions of prediction error data (e.g., prediction partition residuals) may be added to predicted partitions (e.g., prediction pixel data) at adder 206 to generate reconstructed prediction partitions. The reconstructed prediction partitions may be transmitted to prediction partitions assembler 207. Prediction partitions assembler 207 may assemble the reconstructed prediction partitions to generate reconstructed tiles or super-fragments. In some examples, coding partitions assembler module 205 and prediction partitions assembler module 207 may together be considered an un-partitioner subsystem of decoder 200.

The reconstructed tiles or super-fragments may be transmitted to deblock filtering module 208. Deblock filtering module 208 may deblock and dither the reconstructed tiles or super-fragments (or prediction partitions of tiles or super-fragments). The generated deblock and dither filter parameters may be determined from input bitstream 201, for example. The output of deblock filtering module 208 may be transmitted to a quality restoration filtering module 209. Quality restoration filtering module 209 may apply quality filtering based on QR parameters, which may be determined from input bitstream 201, for example. As shown in FIG. 2, the output of quality restoration filtering module 209 may be transmitted to decoded picture buffer 210. In some examples, the output of quality restoration filtering module 209 may be a final reconstructed frame that may be used for prediction for coding other frames (e.g., the final reconstructed frame may be a reference frame or the like). In some examples, deblock filtering module 208 and quality restoration filtering module 209 may together be considered a filtering subsystem of decoder 200.

As discussed, compensation due to prediction operations may include inter- and/or intra-prediction compensation. As shown, inter-prediction compensation may be performed by one or more modules including morphed picture generation module 211, synthesized picture generation module 212, and characteristics and motion compensated filtering predictor module 213. Morphed picture generation module 211 may use de-quantized morphing parameters (e.g., determined from input bitstream 201) to generate morphed reference frames. Synthesized picture generation module 212 may generate super resolution (SR) pictures and projected interpolation (PI) pictures or the like based on parameters determined from input bitstream 201. If inter-prediction is applied, characteristics and motion compensated filtering predictor module 213 may apply motion compensation based on the received frames and motion vector data or the like in input bitstream 201.

Intra-prediction compensation may be performed by intra-directional prediction generation module 214. Intra-directional prediction generation module 214 may be configured to perform spatial directional prediction and may use decoded neighboring partitions according to intra-prediction data in input bitstream 201.

As shown in FIG. 2, prediction modes selector module 215 may determine a prediction mode selection from among, "skip", "auto", "inter", "multi", and "intra", for each prediction partition of a tile, all of which may apply to P- and F/B-pictures, based on mode selection data in input bitstream 201. In addition to prediction modes, it also allows for selection of reference types that can be different depending on "inter" or "multi" mode, as well as for P- and F/B-pictures. The prediction signal at the output of prediction modes selector module 215 may be filtered by prediction fusion filtering module 216. Prediction fusion filtering module 216 may perform filtering based on parameters (e.g., filtering coefficients, frequency, overhead) determined via input bitstream 201. In some examples, filtering the prediction signal may fuse different types of signals representing different modes (e.g., intra, inter, multi, skip, and auto). In some examples, intra-prediction signals may be different than all other types of inter-prediction signal(s) such that proper filtering may greatly enhance coding efficiency. The filtered prediction signal may provide the second input (e.g., prediction partition(s)) to differencer 206, as discussed above.

As discussed, the output of quality restoration filtering module 209 may be a final reconstructed frame. Final reconstructed frames may be transmitted to an adaptive picture re-organizer 217, which may re-order or re-organize frames as needed based on ordering parameters in input bitstream 201. Re-ordered frames may be transmitted to content post-restorer module 218. Content post-restorer module 218 may be an optional module configured to perform further improvement of perceptual quality of the decoded video. The improvement processing may be performed in response to quality improvement parameters in input bitstream 201 or it may be performed as standalone operation. In some examples, content post-restorer module 218 may apply parameters to improve quality such as, for example, an estimation of film grain noise or residual blockiness reduction (e.g., even after the deblocking operations discussed with respect to deblock filtering module 208). As shown, decoder 200 may provide display video 219, which may be configured for display via a display device (not shown).

As discussed, in some examples, encoder 100 and/or decoder 200 may implement techniques related to content adaptive partitioning for prediction and coding for next generation video coding. In some examples, content adaptive partitioning for prediction may be performed by prediction partitions generator module 105 of encoder 100. In some examples, content adaptive partitioning for coding may be performed by coding partitions generator module 107 of encoder 100. In some examples, content adaptive partitioning for prediction for inter-prediction or the like may be performed by prediction partitions generator module 105 and content adaptive partitioning for coding for inter-prediction or the like may be performed by coding partitions generator module 107 of encoder 100. In some examples, content adaptive partitioning for prediction/coding (e.g., only one layer of partitioning) for intra-prediction may be performed by prediction partitions generator module 105 or coding partitions generator module 107 of encoder 100. Further, in some examples, based on encoded prediction partitioning and/or coding partitioning, coding partitions assembler module 114 of encoder 100 and/or coding partitions assembler module 205 of decoder 200 may assemble coding partitions to form prediction partitions. Also, in some examples, prediction partitions assembler 116 of encoder 100 and/or prediction partitions assembler 207 of decoder 200 may assemble reconstructed prediction partitions to form tiles, super-fragments, which may be assembled to generate frames or pictures. As discussed, the various prediction partitions, coding partitions, or tiles or super-fragments may be used for inter-prediction, intra-prediction, other coding efficiency enhancement, or image or video enhancements as discussed herein.

While FIGS. 1 and 2 illustrate particular encoding and decoding modules, various other coding modules or components not depicted may also be utilized in accordance with the present disclosure. Further, the present disclosure is not limited to the particular components illustrated in FIGS. 1 and 2 and/or to the manner in which the various components are arranged. Various components of the systems described herein may be implemented in software, firmware, and/or hardware and/or any combination thereof. For example, various components of encoder 100 and/or decoder 200 may be provided, at least in part, by hardware of a computing System-on-a-Chip (SoC) such as may be found in a computing system such as, for example, a mobile phone.

Further, it may be recognized that encoder 100 may be associated with and/or provided by a content provider system including, for example, a video content server system, and that output bitstream 111 may be transmitted or conveyed to decoders such as, for example, decoder 200 by various communications components and/or systems such as transceivers, antennae, network systems, and the like not depicted in FIGS. 1 and 2. It may also be recognized that decoder 200 may be associated with a client system such as a computing device (e.g., a desktop computer, laptop computer, tablet computer, convertible laptop, mobile phone, or the like) that is remote to encoder 100 and that receives input bitstream 201 via various communications components and/or systems such as transceivers, antennae, network systems, and the like not depicted in FIGS. 1 and 2. Therefore, in various implementations, encoder 100 and decoder subsystem 200 may be implemented either together or independent of one another.

Figure 3:
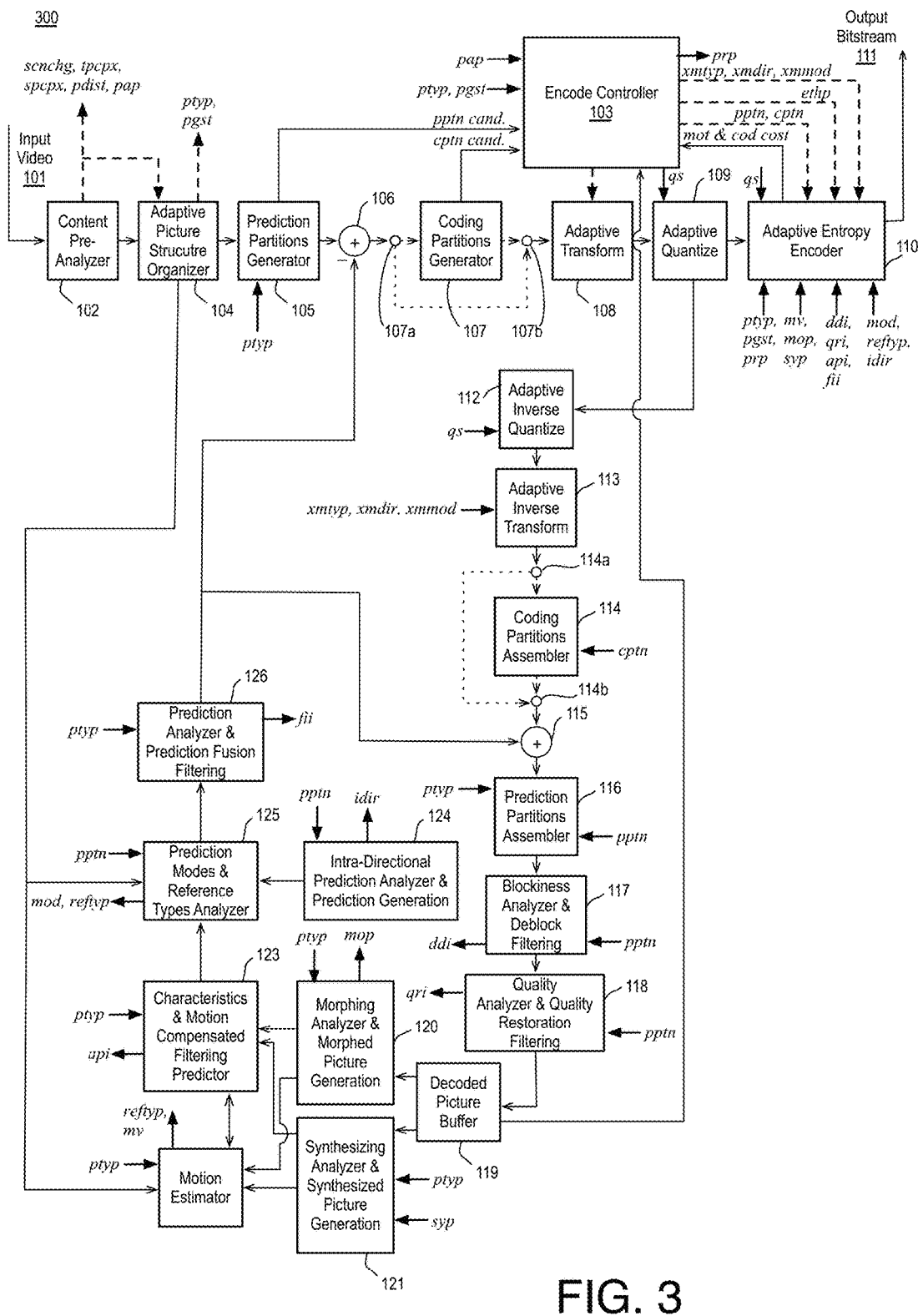
FIG. 3 is an illustrative diagram of an example next generation video encoder and related control signals.

FIG. 3 is an illustrative diagram of an example next generation video encoder 300, arranged in accordance with at least some implementations of the present disclosure. To the extent that video encoder 300 is similar to video encoder 100 of FIG. 1(a), the discussion of similar elements has not been repeated here for the sake of brevity. FIG. 3 illustrates example control signals associated with operation of video encoder 300, where the following abbreviations may represent the associated information:

scnchg Scene change information
spcpx Spatial complexity information
tpcpx Temporal complexity information
pdist Temporal prediction distance information
pap Pre Analysis parameters (placeholder for all other pre analysis parameters except scnchg, spcpx, tpcpx, pdist)
ptyp Picture types information
pgst Picture group structure information
pptn cand. Prediction partitioning candidates
cptn cand. Coding Partitioning Candidates
prp Preprocessing
xmtyp Transform type information
xmdir Transform direction information
xmmod Transform mode
ethp One eighth (⅛th) pel motion prediction
pptn Prediction Partitioning
cptn Coding Partitioning
mot&cod cost Motion and Coding Cost
qs quantizer information set (includes Quantizer parameter (Qp), Quantizer matrix (QM) choice)
mv Motion vectors
mop Morphing Parameters
syp Synthesizing Parameters
ddi Deblock and dither information
qri Quality Restoration filtering index/information
api Adaptive Precision filtering index/information
fii Fusion Filtering index/information
mod Mode information
reftyp Reference type information
idir Intra Prediction Direction While these control signals are illustrated as being associated with specific example functional modules of encoder 300 in FIG. 3, other implementations may include a different distribution of control signals among the functional modules of encoder 300. The present disclosure is not limited in this regard and, in various examples, implementation of the control signals herein may include the undertaking of only a subset of the specific example control signals shown, additional control signals, and/or in a different arrangement than illustrated.

Figure 4:
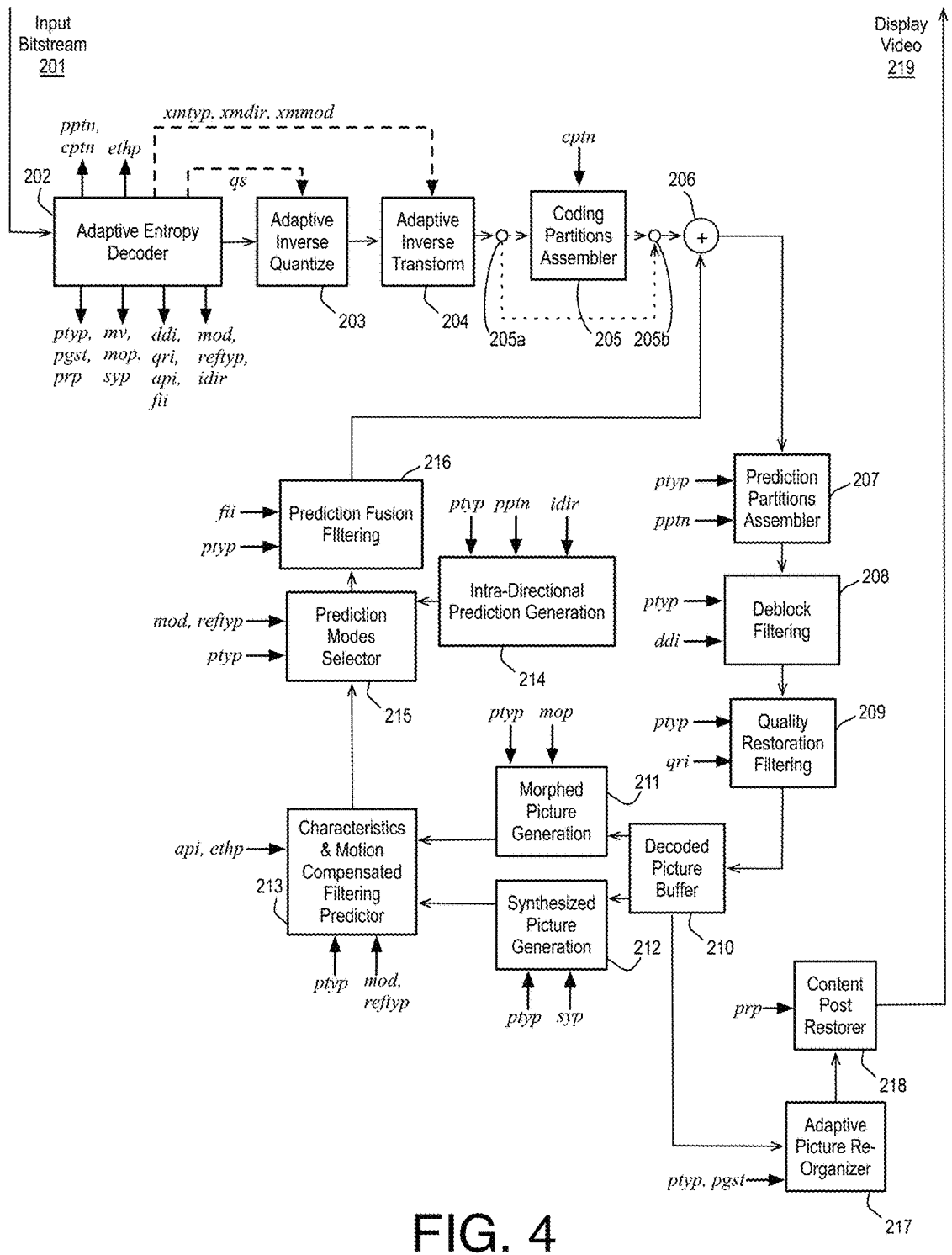
FIG. 4 is an illustrative diagram of an example next generation video decoder and related control signals.

FIG. 4 is an illustrative diagram of an example next generation video decoder 400, arranged in accordance with at least some implementations of the present disclosure. To the extent that video decoder 400 is similar to video decoder 200 of FIG. 2, the discussion of similar elements has not been repeated here for the sake of brevity. FIG. 4 illustrates example control signals associated with operation of video decoder 400, where the indicated abbreviations may represent similar information as discussed with respect to FIG. 3 above.

While these control signals are illustrated as being associated with specific example functional modules of decoder 400 in FIG. 4, other implementations may include a different distribution of control signals among the functional modules of encoder 400. The present disclosure is not limited in this regard and, in various examples, implementation of the control signals herein may include the undertaking of only a subset of the specific example control signals shown, additional control signals, and/or in a different arrangement than illustrated.

Figure 5A:
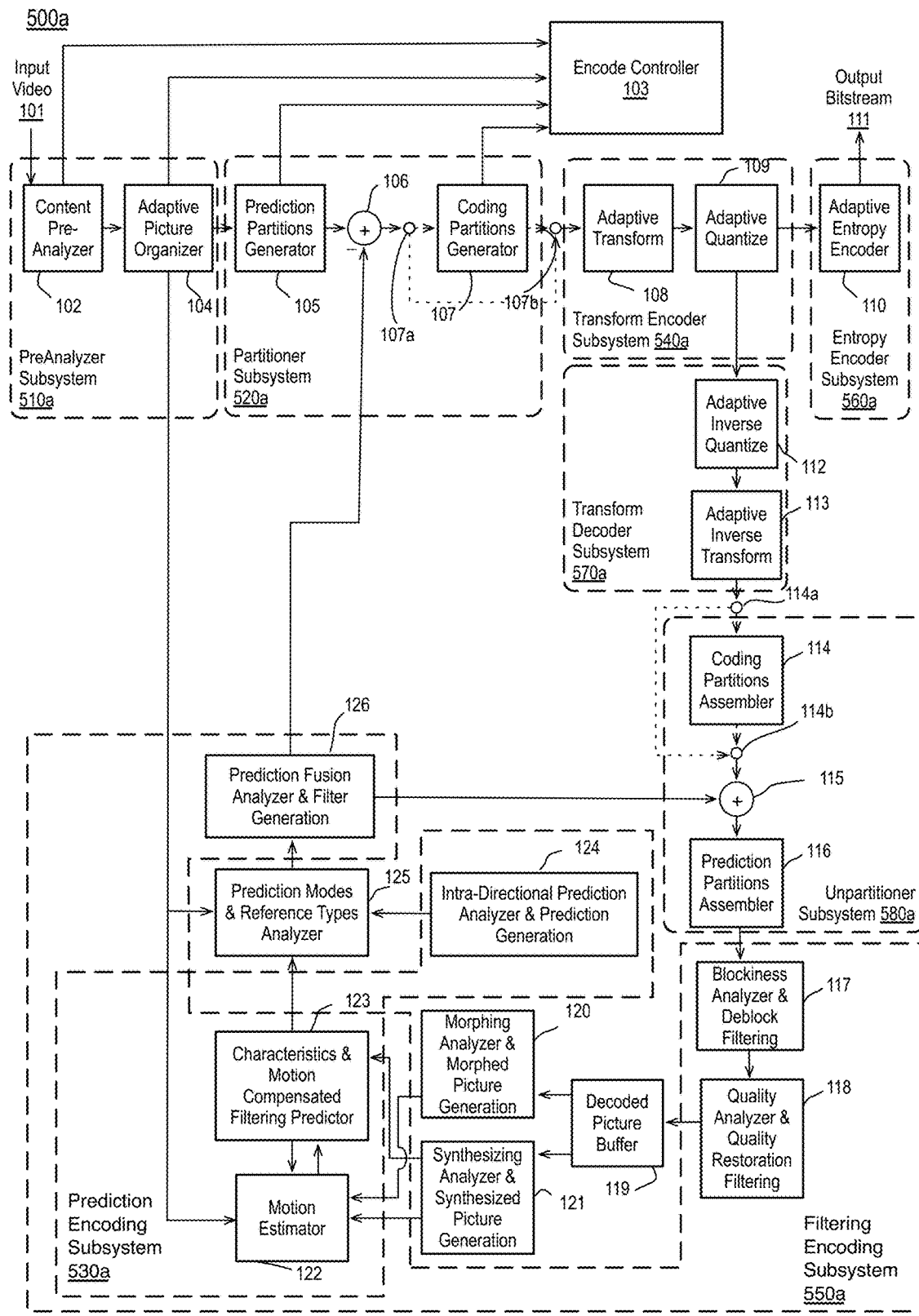
FIG. 5(a) is an illustrative diagram of an example next generation video encoder and subsystems.

FIG. 5(a) is an illustrative diagram of an example next generation video encoder 500a, arranged in accordance with at least some implementations of the present disclosure. FIG. 5(a) presents a similar encoder to that shown in FIGS. 1(a) and 1(b), and similar elements will not be repeated for the sake of brevity. As shown in FIG. 5(a), encoder 500a may include preanalyzer subsystem 510a, partitioner subsystem 520a, prediction encoding subsystem 530a, transform encoder subsystem 540a, filtering encoding subsystem 550a, entropy encoder system 560a, transform decoder subsystem 570a, and/or unpartitioner subsystem 580a. Preanalyzer subsystem 510a may include content pre-analyzer module 102 and/or adaptive picture organizer module 104. Partitioner subsystem 520a may include prediction partitions generator module 105, and/or coding partitions generator 107. Prediction encoding subsystem 530a may include motion estimator module 122, characteristics and motion compensated filtering predictor module 123, and/or intra-directional prediction analyzer and prediction generation module 124. Transform encoder subsystem 540a may include adaptive transform module 108 and/or adaptive quantize module 109. Filtering encoding subsystem 550a may include blockiness analyzer and deblock filtering module 117, quality analyzer and quality restoration filtering module 118, motion estimator module 122, characteristics and motion compensated filtering predictor module 123, and/or prediction analyzer and prediction fusion filtering module 126. Entropy coding subsystem 560a may include adaptive entropy encoder module 110. Transform decoder subsystem 570a may include adaptive inverse quantize module 112 and/or adaptive inverse transform module 113. Unpartioner subsystem 580a may include coding partitions assembler 114 and/or prediction partitions assembler 116.

Partitioner subsystem 520a of encoder 500a may include two partitioning subsystems: prediction partitions generator module 105 that may perform analysis and partitioning for prediction, and coding partitions generator module 107 that may perform analysis and partitioning for coding. Another partitioning method may include adaptive picture organizer 104 which may segment pictures into regions or slices may also be optionally considered as being part of this partitioner.

Prediction encoder subsystem 530a of encoder 500a may include motion estimator 122 and characteristics and motion compensated filtering predictor 123 that may perform analysis and prediction of "inter" signal, and intra-directional prediction analyzer and prediction generation module 124 that may perform analysis and prediction of "intra" signal. Motion estimator 122 and characteristics and motion compensated filtering predictor 123 may allow for increasing predictability by first compensating for other sources of differences (such as gain, global motion, registration), followed by actual motion compensation. They may also allow for use of data modeling to create synthesized frames (super resolution, and projection) that may allow better predictions, followed by use of actual motion compensation in such frames.

Transform encoder subsystem 540*a* of encoder 500*a* may perform analysis to select the type and size of transform and may include two major types of components. The first type of component may allow for using parametric transform to allow locally optimal transform coding of small to medium size blocks; such coding however may require some overhead. The second type of component may allow globally stable, low overhead coding using a generic/fixed transform such as the DCT, or a picture based transform from a choice of small number of transforms including parametric transforms. For locally adaptive transform coding, PHT (Parametric Haar Transform) may be used. Transforms may be performed on 2D blocks of rectangular sizes between 4×4 and 64×64, with actual sizes that may depend on a number of factors such as if the transformed data is luma or chroma, inter or intra, and if the transform used is PHT or DCT. The resulting transform coefficients may be quantized, scanned and entropy coded.

Entropy encoder subsystem 560*a* of encoder 500*a* may include a number of efficient but low complexity components each with the goal of efficiently coding a specific type of data (various types of overhead, motion vectors, or transform coefficients). Components of this subsystem may belong to a generic class of low complexity variable length coding techniques, however, for efficient coding, each component may be custom optimized for highest efficiency. For instance, a custom solution may be designed for coding of "Coded/Not Coded" data, another for "Modes and Ref Types" data, yet another for "Motion Vector" data, and yet another one for "Prediction and Coding Partitions" data. Finally, because a very large portion of data to be entropy coded is "transform coefficient" data, multiple approaches for efficient handling of specific block sizes, as well as an algorithm that may adapt between multiple tables may be used.

Filtering encoder subsystem 550*a* of encoder 500*a* may perform analysis of parameters as well as multiple filtering of the reconstructed pictures based on these parameters, and may include several subsystems. For example, a first subsystem, blockiness analyzer and deblock filtering module 117 may deblock and dither to reduce or mask any potential block coding artifacts. A second example subsystem, quality analyzer and quality restoration filtering module 118, may perform general quality restoration to reduce the artifacts due to quantization operation in any video coding. A third example subsystem, which may include motion estimator 122 and characteristics and motion compensated filtering predictor module 123, may improve results from motion compensation by using a filter that adapts to the motion characteristics (motion speed/degree of blurriness) of the content. A fourth example subsystem, prediction fusion analyzer and filter generation module 126, may allow adaptive filtering of the prediction signal (which may reduce spurious artifacts in prediction, often from intra prediction) thereby reducing the prediction error which needs to be coded.

Encode controller module 103 of encoder 500*a* may be responsible for overall video quality under the constraints of given resources and desired encoding speed. For instance, in full RDO (Rate Distortion Optimization) based coding without using any shortcuts, the encoding speed for software encoding may be simply a consequence of computing resources (speed of processor, number of processors, hyperthreading, DDR3 memory etc.) availability. In such case, encode controller module 103 may be input every single combination of prediction partitions and coding partitions and by actual encoding, and the bitrate may be calculated along with reconstructed error for each case and, based on lagrangian optimization equations, the best set of prediction and coding partitions may be sent for each tile of each frame being coded. The full RDO based mode may result in best compression efficiency and may also be the slowest encoding mode. By using content analysis parameters from content preanalyzer module 102 and using them to make RDO simplification (not test all possible cases) or only pass a certain percentage of the blocks through full RDO, quality versus speed tradeoffs may be made allowing speedier encoding. Up to now we have described a variable bitrate (VBR) based encoder operation. Encode controller module 103 may also include a rate controller that can be invoked in case of constant bitrate (CBR) controlled coding.

Lastly, preanalyzer subsystem 510*a* of encoder 500*a* may perform analysis of content to compute various types of parameters useful for improving video coding efficiency and speed performance. For instance, it may compute horizontal and vertical gradient information (Rs, Cs), variance, spatial complexity per picture, temporal complexity per picture, scene change detection, motion range estimation, gain detection, prediction distance estimation, number of objects estimation, region boundary detection, spatial complexity map computation, focus estimation, film grain estimation etc. The parameters generated by preanalyzer subsystem 510*a* may either be consumed by the encoder or be quantized and communicated to decoder 200.

While subsystems 510*a* through 580*a* are illustrated as being associated with specific example functional modules of encoder 500*a* in FIG. 5(*a*), other implementations of encoder 500*a* herein may include a different distribution of the functional modules of encoder 500*a* among subsystems 510*a* through 580*a*. The present disclosure is not limited in this regard and, in various examples, implementation of the example subsystems 510*a* through 580*a* herein may include the undertaking of only a subset of the specific example functional modules of encoder 500*a* shown, additional functional modules, and/or in a different arrangement than illustrated.

FIG. 5(*b*) is an illustrative diagram of an example next generation video decoder 500*b*, arranged in accordance with at least some implementations of the present disclosure. FIG. 5(*b*) presents a similar decoder to that shown in FIG. 2, and similar elements will not be repeated for the sake of brevity. As shown in FIG. 5(*b*), decoder 500*b* may include prediction decoder subsystem 530*b*, filtering decoder subsystem 550*b*, entropy decoder subsystem 560*b*, transform decoder subsystem 570*b*, unpartitioner_2 subsystem 580*b*, unpartitioner_1 subsystem 551*b*, filtering decoder subsystem 550*b*, and/or postrestorer subsystem 590*b*. Prediction decoder subsystem 530*b* may include characteristics and motion compensated filtering predictor module 213 and/or intra-directional prediction generation module 214. Filtering decoder subsystem 550*b* may include deblock filtering module 208, quality restoration filtering module 209, characteristics and motion compensated filtering predictor module 213, and/or prediction fusion filtering module 216. Entropy decoder subsystem 560*b* may include adaptive entropy decoder module 202. Transform decoder subsystem 570*b* may include adaptive inverse quantize module 203 and/or adaptive inverse transform module 204. Unpartitioner_2 subsystem 580*b* may include coding partitions assembler 205. Unpartitioner_1 subsystem 551b may include prediction partitions assembler 207. Postrestorer subsystem 790 may include content post restorer module 218 and/or adaptive picture re-organizer 217.

Entropy decoding subsystem 560b of decoder 500b may perform the inverse operation of the entropy encoder subsystem 560a of encoder 500a, i.e., it may decode various data (types of overhead, motion vectors, transform coefficients) encoded by entropy encoder subsystem 560a using a class of techniques loosely referred to as variable length decoding. Specifically, various types of data to be decoded may include "Coded/Not Coded" data, "Modes and Ref Types" data, "Motion Vector" data, "Prediction and Coding Partitions" data, and "Transform Coefficient" data.

Transform decoder subsystem 570b of decoder 500b may perform inverse operation to that of transform encoder subsystem 540a of encoder 500a. Transform decoder subsystem 570b may include two types of components. The first type of example component may support use of the parametric inverse PHT transform of small to medium block sizes, while the other type of example component may support inverse DCT transform for all block sizes. The PHT transform used for a block may depend on analysis of decoded data of the neighboring blocks. Output bitstream 111 and/or input bitstream 201 may carry information about partition/block sizes for PHT transform as well as in which direction of the 2D block to be inverse transformed the PHT may be used (the other direction uses DCT). For blocks coded purely by DCT, the partition/block sizes information may be also retrieved from output bitstream 111 and/or input bitstream 201 and used to apply inverse DCT of appropriate size.

Unpartitioner subsystem 580b of decoder 500b may perform inverse operation to that of partitioner subsystem 520a of encoder 500a and may include two unpartitioning subsystems, coding partitions assembler module 205 that may perform unpartitioning of coded data and prediction partitions assembler module 207 that may perform unpartitioning for prediction. Further if optional adaptive picture organizer module 104 is used at encoder 500a for region segmentation or slices, adaptive picture re-organizer module 217 may be needed at the decoder.

Prediction decoder subsystem 530b of decoder 500b may include characteristics and motion compensated filtering predictor module 213 that may perform prediction of "inter" signal and intra-directional prediction generation module 214 that may perform prediction of "intra" signal. Characteristics and motion compensated filtering predictor module 213 may allow for increasing predictability by first compensating for other sources of differences (such as gain, global motion, registration) or creation of synthesized frames (super resolution, and projection), followed by actual motion compensation.

Filtering decoder subsystem 550b of decoder 500b may perform multiple filtering of the reconstructed pictures based on parameters sent by encoder 500a and may include several subsystems. The first example subsystem, deblock filtering module 208, may deblock and dither to reduce or mask any potential block coding artifacts. The second example subsystem, quality restoration filtering module 209, may perform general quality restoration to reduce the artifacts due to quantization operation in any video coding. The third example subsystem, characteristics and motion compensated filtering predictor module 213, may improve results from motion compensation by using a filter that may adapt to the motion characteristics (motion speed/degree of blurriness) of the content. The fourth example subsystem, prediction fusion filtering module 216, may allow adaptive filtering of the prediction signal (which may reduce spurious artifacts in prediction, often from intra prediction) thereby reducing the prediction error which may need to be coded.

Postrestorer subsystem 590b of decoder 500b is an optional block that may perform further improvement of perceptual quality of decoded video. This processing can be done either in response to quality improvement parameters sent by encoder 100, or it can be standalone decision made at the postrestorer subsystem 590b. In terms of specific parameters computed at encoder 100 that can be used to improve quality at postrestorer subsystem 590b may be estimation of film grain noise and residual blockiness at encoder 100 (even after deblocking) As regards the film grain noise, if parameters can be computed and sent via output bitstream 111 and/or input bitstream 201 to decoder 200, then these parameters may be used to synthesize the film grain noise. Likewise, for any residual blocking artifacts at encoder 100, if they can be measured and parameters sent via output bitstream 111 and/or bitstream 201, postrestorer subsystem 590b may decode these parameters and may use them to optionally perform additional deblocking prior to display. In addition, encoder 100 also may have access to scene change, spatial complexity, temporal complexity, motion range, and prediction distance information that may help in quality restoration in postrestorer subsystem 590b.

Figure 5B:
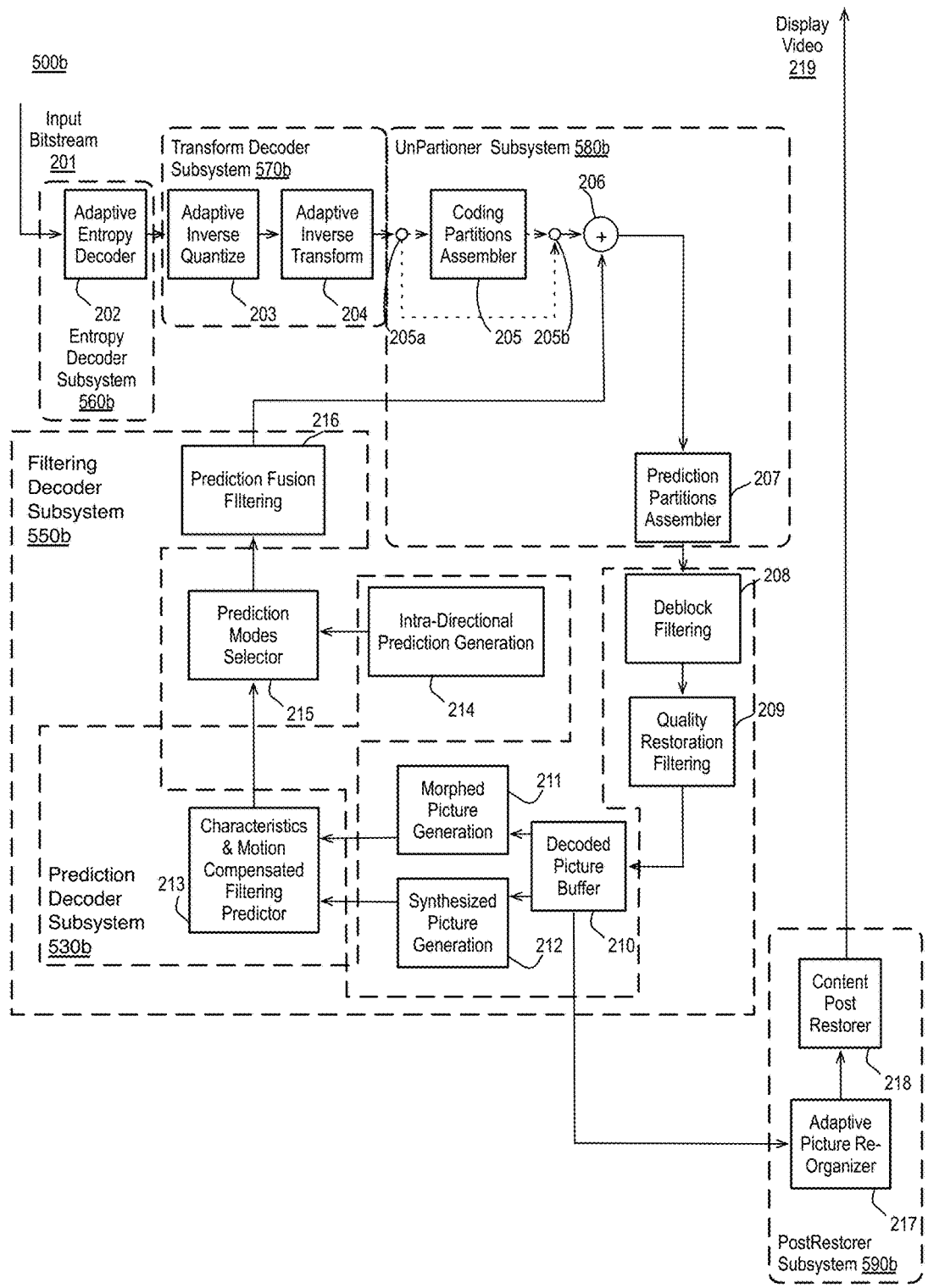
FIG. 5(b) is an illustrative diagram of an example next generation video decoder and subsystems.

While subsystems 530b through 590b are illustrated as being associated with specific example functional modules of decoder 500b in FIG. 5(b), other implementations of decoder 500b herein may include a different distribution of the functional modules of decoder 500b among subsystems 530b through 590b. The present disclosure is not limited in this regard and, in various examples, implementation of the example subsystems 530b through 590b herein may include the undertaking of only a subset of the specific example functional modules of decoder 500b shown, additional functional modules, and/or in a different arrangement than illustrated.

Figure 6:
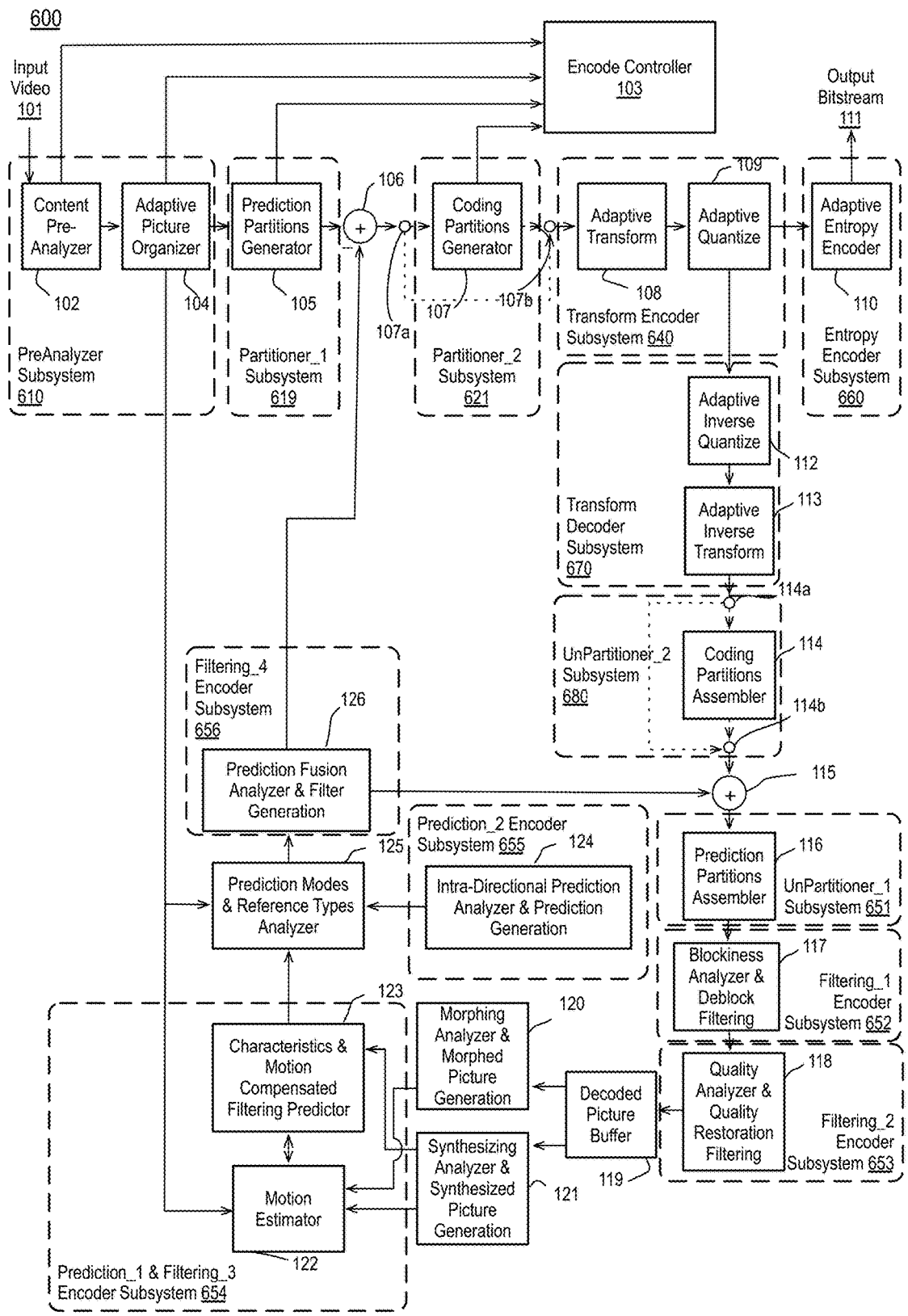
FIG. 6 is an illustrative diagram of an example next generation video coder and subsystems.

FIG. 6 is an illustrative diagram of an example next generation video encoder 600, arranged in accordance with at least some implementations of the present disclosure. FIG. 6 presents a similar encoder to that shown in FIGS. 1(a), 1(b), and 5, and similar elements will not be repeated for the sake of brevity. As shown in FIG. 6, encoder 600 may include preanalyzer subsystem 610, partitioner_1 subsystem 619, partitioner_2 subsystem 621, transform encoder subsystem 640, unpartitioner_1 subsystem 651, filtering_1 encoder subsystem 652, filtering_2 encoder subsystem 653, prediction_1 and filtering_3 encoder subsystem 654, prediction_2 encoder subsystem 655, filtering_4 encoder subsystem 656, entropy encoder subsystem 660, transform decoder subsystem 670, and/or unpartitioner_2 subsystem 680.

Preanalyzer subsystem 610 may include content preanalyzer module 102 and/or adaptive picture organizer module 104. Partitioner_1 subsystem 619 may include prediction partitions generator module 105. Partitioner_2 subsystem 621 may include coding partitions generator 107. Transform encoder subsystem 640 may include adaptive transform module 108 and/or adaptive quantize module 109. Unpartitioner_1 subsystem 651 may include prediction partitions assembler module 116. Filtering_1 encoder subsystem 652 may include blockiness analyzer and deblock filtering module 117. Filtering_2 encoder subsystem 653 may include quality analyzer and quality restoration filtering module 118. Prediction_1 and filtering_3 encoder subsystem 654 may include motion estimator module 122 and/or characteristics and motion compensated filtering predictor module 123. Prediction_2 encoder subsystem 655 may include intra-directional prediction analyzer and prediction generation module 124. Filtering_4 encoder subsystem 656, may include prediction analyzer and prediction fusion filtering module 126. Entropy encoder subsystem 660 may include adaptive entropy encoder module 110. Transform decoder subsystem 670 may include adaptive inverse quantize module 112 and/or adaptive inverse transform module 113. Unpartitioner_2 subsystem 680 may include coding partitions assembler module 114.

As illustrated by encoder 600, video to be compressed may be input to content pre-analyzer module 102 and then to adaptive picture organizer 104 (together referred to as preanalyzer subsystem 610). Content pre-analyzer module 102 may perform analysis of the scene being coded, providing at its output, information about scene changes (scnchg), temporal complexity (tpcpx), spatial complexity (spcpx), temporal prediction distance (pdist), and others. Further, the original video frames at the output of content pre-analyzer module 102 may be input to adaptive picture organizer 104 which may output control signals indicating picture group structure (pgst), and accordingly picture types (ptyp) of each picture in the group, as well as reordered pictures in encoding order as needed. For reference, the encoding of the present disclosure may use 3 picture types: I- (intra), P- (predictive), and F- (functional) pictures. F-pictures are noncausal and require reordering of frames for encoding at the encoder (and display at the decoder).

The next two blocks in encoder 600 may perform prediction and coding partitioning (together referred to as partitioner subsystem 520a in FIG. 5(*a*)). In the coding of the present disclosure, a frame to be coded may be divided into processing units called tiles. Coding in the present disclosure may support two tile sizes, 32×32 and 64×64. 64×64 size tiles may be used for standard definition and higher size video for coding of I-, P-, and F-picture types and for coding of I- and F-pictures of all sizes, while 32×32 size tiles may be used for P-pictures of lower resolution sequences.

If a picture being coded is an I-picture, every tile may be further divided in prediction partitions generator module 105 into KdTree based partitions that can divide a space (till smallest size is reached) in one dimension at a time, into either no further division, division into two equal halves, division into two parts ¼ and ¾ of the space, or division into two parts that are ¾ and ¼ of the space. So, with I-pictures using 64×64 as the largest size (and allowing smallest size of 4×4), a very large number of partitionings of a tile may be generated if no other constraints are imposed. For example, a constraint that may be placed on 64×64 tile is that the first pair of cuts are already pre-decided to halve the space in each dimension. This may amount to starting with a 64×64 and dividing it into 32×32 size subtiles and then subpartitioning each 32×32 by KdTree partitioning; other restrictions may also be possible to reduce the number of combinations. These partitions of an I-picture tile may be referred to as prediction partitions, as each tile partitioning may be used for spatial prediction (directional angular prediction or other types of prediction) and coding of prediction differences. Likewise P-picture tiles may also be partitioned in this manner for prediction. A caveat in case of P-pictures may be that for lower resolutions, P-picture partitions start with 32×32 tile and KdTree based partitions may not be used, but rather a simpler B-Tree partitioning may be used. Bi-Tree partitioning divides a space into 2 equal parts only, one dimension at a time, alternating between the two dimensions. Further P-picture partitions may mainly be predicted using motion (with one or more references) rather than spatial prediction, although some subpartitions may use intra spatial prediction to deal with, for instance, uncovered background. For standard definition to higher picture sizes, P-pictures may start with 64×64 tile sizes only. Finally, F-pictures also may use Bi-Tree partitioning of 64×64 tile sizes for generating prediction partitions that may mainly use motion (with one or more partitions), although some subpartitions may also use spatial prediction (for intra coding). In coding of the present disclosure, there may be much more to generation of inter prediction than simply using motion vectors to generate prediction. In P- and F-picture coding, each sub-partition's prediction may be identified by including a prediction mode (skip, auto, inter, multi, and intra). The output of prediction partitions generator 105 may be literally hundreds of potential partitionings (more or less depending on limits placed) of a tile. These partitionings may be indexed as 1 . . . m and may be provided to encode controller 103 to select the best possible prediction partitioning.

The partitioned original blocks are differenced with prediction blocks (the details of generation of prediction blocks are discussed later) to determine if there is any residual signal worth encoding. Thus not all subpartitions of a tile may actually need to be coded (using transform coding) as prediction may have been sufficient for certain subpartitions.

The partitions that can't be compensated by prediction alone may require further subpartitioning into smaller partitions for transform coding. For P- and F-pictures, this subpartitioning for coding may be accomplished using coding partitions generator 107 that may use Bi-tree partitioning for coding of prediction difference partitions that require further division; others may be simply coded by motion compensation. In P- or F-pictures, only in some cases (very simple content and/or large quantizer step sizes), the coding partitions may equal the size of the entire tile, which may be the same size used by prediction partitions in these cases. Thus, some P- and F-picture tiles may contain no coding partitioning, one coding partitioning, or multiple coding partitionings. These partitionings may be indexed as 1 . . . n and may be provided to encode controller 103 to select the best possible combination of prediction and coding partitioning from given choices. As regards I-picture tiles, there may be only prediction partitioning followed by actual transform coding with no further coding partitioning per se. In other words coding partitioning may be skipped.

The next two blocks (adaptive transform module 108 and adaptive quantize module 109) and portion of encode controller 103 that may perform quantizer adaptation are collectively referred to in FIG. 5(*a*) as transform encoder subsystem 540, and are described next.

The partitions (after prediction partitions for I-pictures, and coding partitions for P- and F-pictures) undergo transform coding in adaptive transform module 108 that may perform either forward hybrid PHT transform or forward DCT Transform on rectangular blocks. For HPHT transform, small to medium block sizes may be supported while for DCT transform a large number of block sizes may be supported. The choice of partition/block size, as well as the transform (HPHT vs DCT) employed, may be dependent on results of RDO analysis. For HPHT transform, some overhead may be needed to identify the direction, either horizontal or vertical, in which DCT may be applied, while PHT may be applied in the orthogonal direction, as well as the mode (at least for intra coding where mode may be based on decoded pixels or prediction difference pixels). The actual PHT transform basis used for transforming a particular block may be content adaptive as it may depend on decoded neighboring pixels. Because both encoder 100 and decoder 200 may require calculation of the same basis matrix, the complexity of calculation may be kept low by allowing a limited number of good transforms known (to both encoder 100 and decoder 200) from which to select. As regards adaptive quantize module 109, it may perform analysis of content to come up with locally adaptive quantization parameters that may then be represented by a multi-level map that may be efficiently coded and included in the bitstream. The computed quantizer set (qs, and a matrix applied to coefficient block) may be used by adaptive quantize module 109 unit to perform scaling of coefficients.

The various signals and data items that may need to be sent to the decoder, ie, pgst, ptyp, prp, pptn, cptn, modes, reftype, ethp, xmtyp, xmdir, xmmod, idir, mv, qs, mop, syp, ddi, qri, api, fii, quant coefficients and others may then be entropy encoded by adaptive entropy encoder 110 that may include different entropy coders collectively referred to as entropy encoder subsystem 660.

Encoder 600 may include a local decoding loop. Depending on how RDO is operating, not all of hundreds or more partitionings of a tile may need to be fully coded (sometimes lookup of bitcounts may be sufficient). After the best partitioning of a tile is however determined, certainly in that case fullcoding may be necessary. The first two units in the decoding loop may be adaptive inverse quantize module 122 and adaptive inverse transform module 113 (collectively referred to as transform decoder subsystem 670). The operation of adaptive inverse quantize module 112 may be opposite of adaptive quantize module 109 and basically it may unscale the scaled transform coefficients (a lossy process). Further, adaptive inverse transform module 113 may invert the dequantized transform coefficient blocks to generate blocks of reconstructed prediction difference pixels. For P- and F-pictures, the decoded pixel difference blocks may be re-assembled by coding partitions assembler 114 in the right order. For I-picture tile partitionings, the coding partitions re-assembly process may be skipped. Next in the local decoding loop, the prediction signal (inter or intra) may be added to decoded partitions, using adder 115, and the reconstructed partitions at the output of adder 115 may be assembled by prediction partitions assembler 116.

Next set of steps may involve filtering, and intermingling of filtering and prediction generation. Specifically, the reconstructed partitions may be deblocked and dithered by blockiness analyzer and deblock filtering module 117; the parameters for analysis ddi may be used for filtering operation and may be also coded and sent to the decoder via the bitstream. The deblocked recon output may be then handed over to quality analyzer and quality restoration filtering module 118, which may compute QR filtering parameters and may use them for filtering. These parameters may also be coded and sent via the bitstream to the decoder. The QR filtered output may be the final reconstructed frame that also may be used as a prediction for coding future frames.

The prediction process shown as prediction encoder subsystem 530b in FIG. 5(a) may include two main subsystems for inter prediction and intra prediction. The present disclosure may employ several types of morphing to generate local buffers/prediction pictures that allow compensation for gain, dominant motion, registration, and/or blur prior to motion compensated prediction, as well as several types of synthesized frames (SR (Super Resolution) Pictures, PI (Projected Interpolation) pictures among others) in which motion compensated prediction can result in even higher gains. Morphing analyzer and morphed picture generation module 120 may perform the task of analysis of current picture by computing parameters for changes in gain, changes in dominant motion, changes in registration, and changes in blur with respect to reference frame with which it is to be coded. The computed mop parameters may be quantized/dequantized and used to generate morphed reference frames that may be used by the motion estimator for computing motion vectors for efficient motion (and characteristics) compensated prediction of current frame. Likewise, synthesizing analyzer and synthesized picture generation 121 may perform the task of analysis for generating SR pictures and PI pictures for motion for use by the motion estimator for computing motion vectors for efficient motion compensated prediction in these frames.

One interesting thing to note is that prediction_1 and filtering_3 encoder subsystem 654 may intertwine filtering and prediction. Its filtering parameters, api, may be coded and sent to the decoder via the bitstream. One other thing to note is that prediction 2 encoder subsystem 655 refers to spatial directional prediction and uses decoded neighboring partitions, and since here both the analysis of direction and actual generation of prediction takes place it is referred to here as intra-directional prediction analyzer and prediction generation module 124.

Prediction modes and reference types analyzer 125 may allow for selection of prediction modes from among, "skip", "auto", "inter", "multi", and "intra", for each partition of tile, all of which apply to P- and F-pictures; this is shown in Table 1 below. In addition to prediction modes, it also allows for selection of reference types that can be different depending on "inter" or "multi" mode, as well as for P- and F-pictures; the detailed list of ref types is shown in Tables 2(a) and 2(b) for P-pictures, and Tables 3(a), 3(b), 3(c), and 3(d) for F-pictures.

Tables 1 through 3(d), shown below, illustrate one example of codebook entries. A full codebook of entries may provide a full or substantially full listing of all possible entries and coding thereof. In some examples, the codebook may take into account constraints as described above. In some examples, data associated with a codebook entry for prediction modes and/or reference types may be encoded in a bitstream for use at a decoder as discussed herein.

TABLE 1

Prediction modes for Partitions of a Tile in P-and F- pictures

| No. | Prediction mode |
|---|---|
| 0. | Intra |
| 1. | Skip |
| 2. | Split |
| 3. | Auto |
| 4. | Inter |
| 5. | Multi |

TABLE 2(a)

Ref Types for partitions of Tile that have "inter" mode in P-pictures

| No. | Ref Types for Partitions with "inter" mode |
|---|---|
| 0. | MR0n (=past SR0) |
| 1. | MR1n |
| 2. | MR2n |
| 3. | MR3n |
| 4. | MR5n (past SR1) |

TABLE 2(a)-continued

Ref Types for partitions of Tile that have
"inter" mode in P-pictures

| No. | Ref Types for Partitions with "inter" mode |
|---|---|
| 5. | MR6n (past SR2) |
| 6. | MR7n (past SR3) |
| 7. | MR0d |
| 8. | MR0g |

TABLE 2(b)

Ref Types for Partitions of Tile that have
"multi" mode in P-pictures

| No. | Ref Types for partitions with "multi" mode (first Ref Past none, second Ref:) |
|---|---|
| 0. | MR1n |
| 1. | MR2n |
| 2. | MR3n |

TABLE 3(a)

Ref Types for Partitions of Tile that have
"inter" mode in F-pictures

| No. | Ref Types for partitions with "inter" mode |
|---|---|
| 0. | MR0n |
| 1. | MR7n (=proj F) |
| 2. | MR3n (=future SR0) |
| 3. | MR1n |
| 4. | MR4n (=Future SR1) |
| 5. | MR5n (=Future SR2) |
| 6. | MR6n (=Future SR3) |
| 7. | MR3d |
| 8. | MR0g/MR3g |

TABLE 3(b)

Ref Types for Partitions of Tile that have "multi"
mode and Dir 0 in F-pictures

| No. | Ref Types for partitions with "multi" mode and Dir 0 (first Ref Past none, second Ref:) |
|---|---|
| 0. | MR3n (=future SR0) |
| 1. | MR1n |
| 2. | MR3n |
| 3. | MR4n (=Future SR1) |
| 4. | MR5n (=Future SR2) |
| 5. | MR6n (=Future SR3) |
| 6. | MR7n (=proj F) |
| 7. | MR3d |
| 8. | MR3g |

TABLE 3(c)

Ref Types for Partitions of Tile that have "multi"
mode and Dir 1 in F-pictures

| No. | Ref Types for partitions with "multi" mode and Dir 1 (first Ref MR0n, second Ref:) |
|---|---|
| 0. | MR7n (=proj F) |

TABLE 3(d)

Ref Types for Partitions of Tile that have "multi"
mode and Dir 2 in F-pictures

| No. | Ref Types for partitions with "multi" mode and Dir 2 (first Ref MR3n, second Ref:) |
|---|---|
| 0. | MR7n (=proj F) |

The prediction signal at the output of prediction modes and reference types analyzer 125 may be filtered by prediction fusion analyzer and filter generation module 126 (filtering_4 encoder subsystem 656) that may first determine parameters (filtering coefficients, frequency, overhead) to use for this filtering and then actually may perform this filtering. The purpose of filtering the prediction signal is to fuse different types of signal representing different modes, ie, intra, inter, multi, skip, and auto. Since typically, intra prediction signal looks very different than all other types of inter signal/s, properly filtering can be a big contributor to coding efficiency. The filtering parameters, fii, may be encoded in the bitstream for use by the decoder. The filtered prediction forms the second input to the differencer that computes the prediction difference signal for coding discussed earlier. Also, the same filtered prediction signal forms a second input to adder 115, the first input of which may be quantized/dequantized decoded difference signal.

Finally, adaptive entropy encoder 660 may be used to encode various types of control data/signals, parameters, modes and ref types, motion vectors, and transform coefficients. It is based on a generic class of low complexity entropy coders called adaptive variable length coders (vlc). The data to be entropy coded may be divided in to several categories (7 in some aspects of this disclosure), and starting from generic vlc coders, specialized coders may be developed for each category.

While subsystems 610 through 680 are illustrated as being associated with specific example functional modules of encoder 600 in FIG. 6, other implementations of encoder 600 herein may include a different distribution of the functional modules of encoder 600 among subsystems 610 through 680. The present disclosure is not limited in this regard and, in various examples, implementation of the example subsystems 610 through 680 herein may include the undertaking of only a subset of the specific example functional modules of encoder 600 shown, additional functional modules, and/or in a different arrangement than illustrated.

Figure 7:
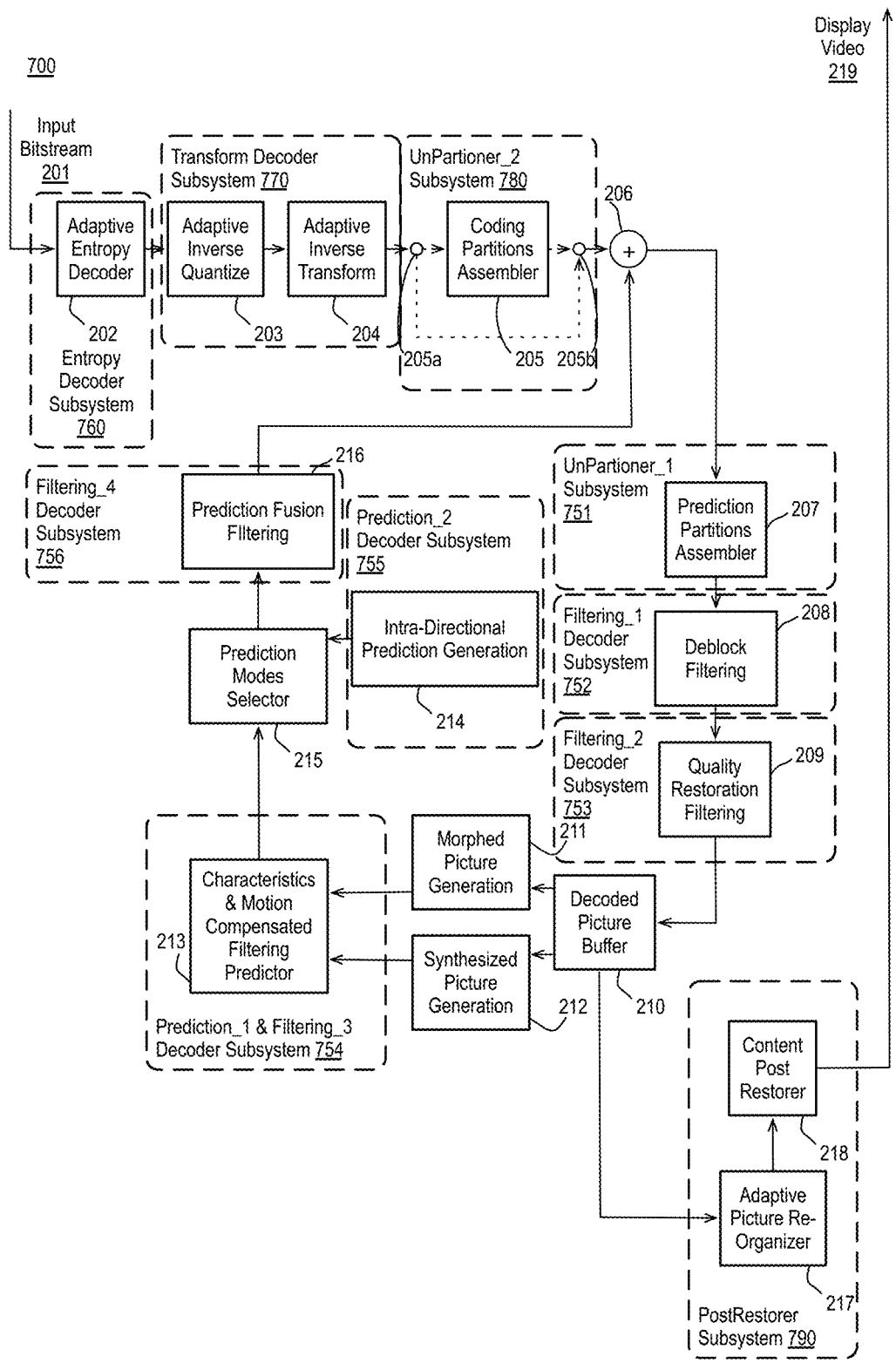
FIG. 7 is an illustrative diagram of an example next generation video coder and subsystems.

FIG. 7 is an illustrative diagram of an example next generation video decoder 700, arranged in accordance with at least some implementations of the present disclosure. FIG. 7 presents a similar decoder to that shown in FIG. 2, and similar elements will not be repeated for the sake of brevity. As shown in FIG. 7, decoder 700 may include entropy decoder subsystem 760, transform decoder subsystem 770, unpartitioner_2 subsystem 780, unpartitioner_1 subsystem 751, filtering_1 decoder subsystem 752, filtering_2 decoder subsystem 753, prediction_1 and filtering_3 decoder subsystem 754, prediction_2 decoder subsystem 755, filtering_4 decoder subsystem 756, and/or postrestorer subsystem 790. Entropy decoder subsystem 760 may include adaptive entropy decoder module 202. Transform decoder subsystem 770 may include adaptive inverse quantize module 203 and/or adaptive inverse transform module 204. Unpartitioner_2 subsystem 780 may include coding partitions assembler 205. Unpartitioner_1 subsystem 751 may include prediction partitions assembler 207. Filtering_1 decoder subsystem 752 may include deblock filtering module 208. Filtering_2 decoder subsystem 753 may include quality restoration filtering module 209. Prediction_1 and filtering_3 decoder subsystem 754 may include characteristics and motion compensated filtering predictor module 213. Prediction_2 decoder subsystem 755 may include intra-directional prediction generation module 214. Filtering_4 decoder subsystem 756 may include prediction fusion filtering module 216. Postrestorer subsystem 790 may include content post restorer module 218 and/or adaptive picture re-organizer 217.

The general operation of this decoder 700 may be similar to the local decoding loop in encoder 600 discussed earlier with the caveat that the motion compensation decoding loop in a decoder does not require any components that require analysis to determine parameters as the parameters may be actually sent via the bitstream 201 to decoder 700. The bitstream to be decoded may be input to adaptive entropy decoder module 202, which decodes headers, control signals and encoded data. For instance, it decodes ptyp, pgst, prp, pptn, cptn, ethp, mop, syp, mod, reftyp, idir, qs, xmtyp, xmdir, xmmod, ddi, qri, api, fii, mv, and quantized transform coefficients that constitute the overhead, control signals and data that may be distributed for use throughout the decoder. The quantized transform coefficients may be then inverse quantized by adaptive inverse quantize module 203 to produce rectangular partitions of decoded pixel differences that may be assembled as per coding partitioning used and to it may be added prediction resulting in generation of recon coded partitions that further undergo further reassembly as per motion partitioning to generate reconstructed tiles and frames that undergo deblocking and dithering in deblock filtering module 208 using decoded ddi parameters, followed by quality restoration filtering in quality restoration filtering module 209 using decoded qri parameters, a process that creates the final recon frames. The final recon frames may be saved in decoded picture buffer 210 using morphed pictures/local buffers created by applying decoded mop parameters. Likewise synthesized picture buffers may be created by applying decoded syp parameters to decoded picture buffer 210. The morphed local buffers, and synthesized frames may be used for motion compensated prediction that uses adaptive precision (AP) filtering based on api parameters and keeps either ¼ or ⅛ pel prediction depending on decoded ethp signal. In fact, the Char & Motion AP Filt ¼ & ⅛ pel Compensated Predictor depending on the mod generates "inter" multi" "skip" or "auto" partitions while intra-directional prediction generation module 214 generates "intra" partition and prediction modes selector module 215 may allow partition of the right mode to pass through. The next step involves selective use of prediction fusion filtering module 216 to filter and output the prediction as needed at the second input to adder 206.

The recon frames at the output of quality restoration filtering module 209 may be reordered (as F-frames are out of order) by adaptive picture re-organizer 217 in response to control parameters of ptyp and pgst, and further the output of adaptive picture re-organizer 217 may undergo optional processing in content postrestorer 218 that may be controlled by prp parameters sent by the encoder. This processing among other things includes deblocking and film grain addition.

While subsystems 751 through 790 are illustrated as being associated with specific example functional modules of decoder 700 in FIG. 7, other implementations of decoder 700 herein may include a different distribution of the functional modules of decoder 700 among subsystems 751 through 790. The present disclosure is not limited in this regard and, in various examples, implementation of the example subsystems 751 through 790 herein may include the undertaking of only a subset of the specific example functional modules of decoder 700 shown, additional functional modules, and/or in a different arrangement than illustrated.

Figure 8:
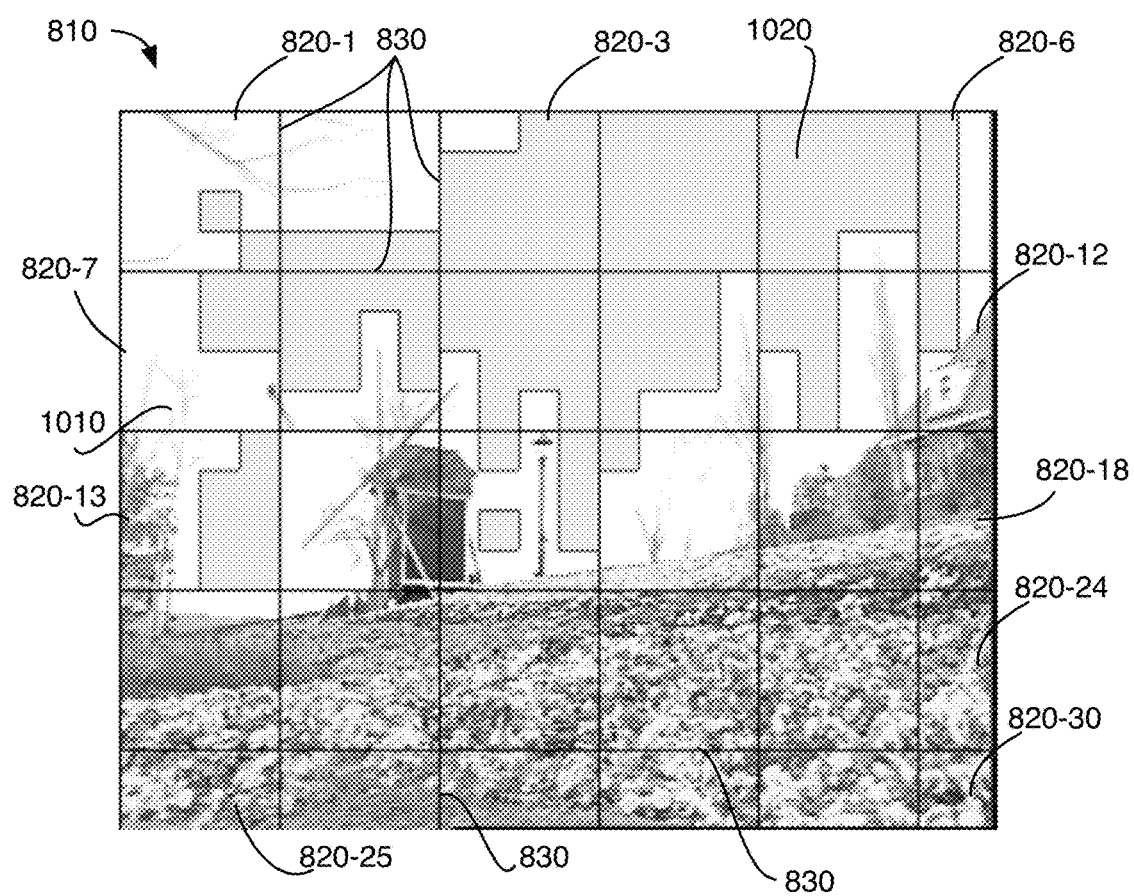
FIG. 8 illustrates an example video frame having example tiles and super-fragments for prediction partitioning.

FIG. 8 illustrates an example video frame 810 having example tiles or super-fragments for prediction partitioning, arranged in accordance with at least some implementations of the present disclosure. Video frame 810 may include any suitable video image, frame, picture, or data or the like for coding. In the illustrated example, video frame 810 includes a video frame from the "Flower" test sequence for illustrative purposes. As discussed, video frame 810 may be segmented into frame portions (e.g., tiles or super-fragments). The frame portions may then be partitioned as will be discussed further below. Video frame 810 may be divided into frame portions using any suitable technique or techniques. In some examples, video frame 810 may be divided into tiles 820-1 through 820-30 (in FIG. 8, not every tile is labeled for the sake of clarity of presentation) via tile boundaries 330 such that tiles 820-1 through 820-30 may be the video frame portions for partitioning. Video frame 810 may include any number of tiles 820 and tiles 820 may be any size. In some examples, tiles 820 may be 64×64 pixels. Further, tiles 820 may have any shape. In various examples, tiles 820 may be square or rectangular. Also, as shown, tiles 820 may be of different shapes and sizes within frame 810. For example, tile 820-3 may be square and 64×64 pixels, tile 820-12 may be rectangular and 32×64 pixels, tile 820-30 may be square and 32×32 pixels, and so on.

Figure 10:
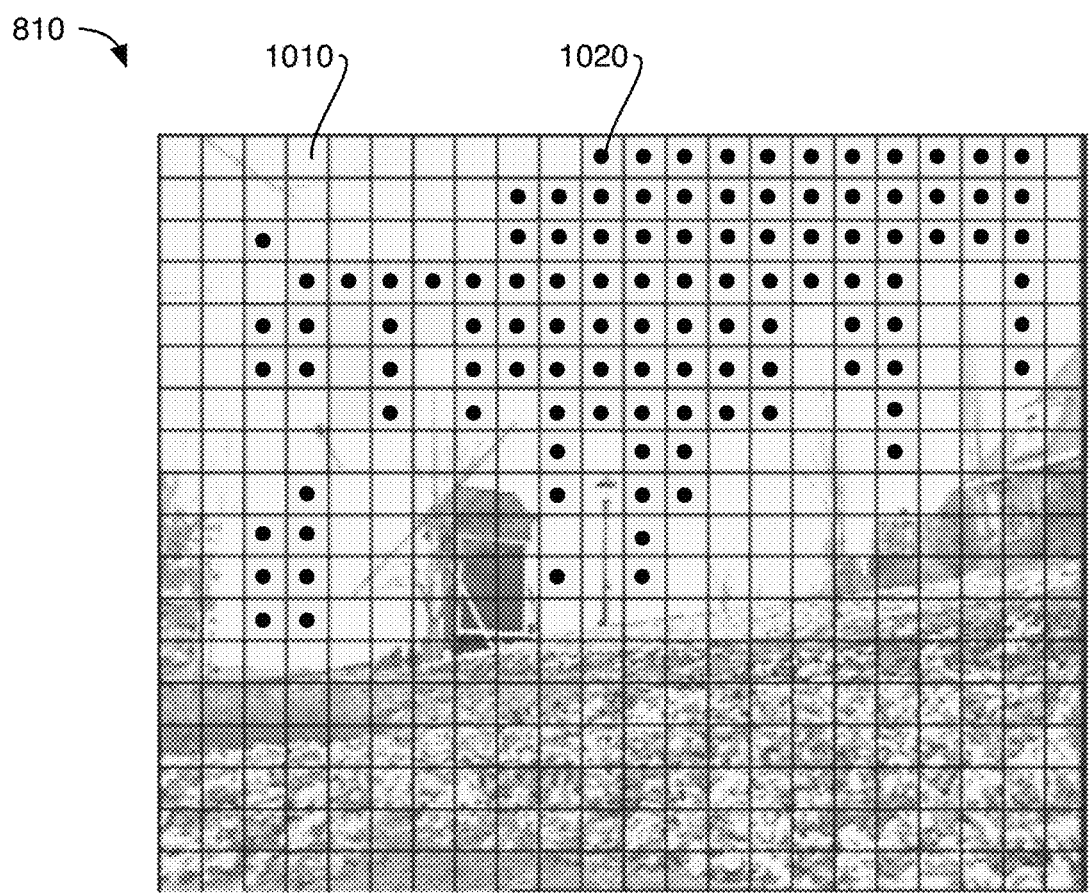
FIG. 10 illustrates example region layer segmentation of a video frame.

In other examples, the video frame portions for partitioning may be super-fragments. For example, to determine super-fragments, video frame 810 may be segmented into one or more region layers. The segmenting may be performed at any precision (e.g., pixel resolution) and quantized to any resolution based on efficiency constraints in terms of bit-cost. For example, the segmenting may be performed at 4-pel, 8-pel, or 16-pel precision (e.g., a precision of 4 pixels, 8, pixels, or 16 pixels), or the like. Turning now to FIG. 10, segmentation of a video frame into region layers is illustrated.

FIG. 10 illustrates example region layer segmentation of video frame 810, arranged in accordance with at least some implementations of the present disclosure. As shown in FIG. 10, video frame 810 may be segmented into one or more region layers. In the illustrated example of FIG. 10, video frame 810 may be segmented into two region layers: region layer 1010 and region layer 1020. In FIG. 10, region layer 1010 includes video frame segments without a marking and region layer 1020 includes video frame segments marked with a dot. For example, region layer 1010 may represent back-ground portions of video frame 810 and region layer 1020 may represent fore-ground portions of video frame 810. In some examples, the region layers may represent a fore-ground, a back-ground, and a middle-ground (or multiple middle-grounds) of a scene or the like. In some examples, video frame 810 may include a single region layer. In some examples, video frame 810 may include 3, 4, 5 or more region layers. In some examples, the segmentation of video frame 810 may be performed by prediction partitions generator module 105 (please refer to FIG. 1). In some examples, the segmentation of video frame 810 may be performed by another module (e.g., a tile or super-fragment generator module) inserted between adaptive picture organizer 104 prediction partitions generator 105. In some examples, the segmentation of video frame 810 may be performed by adaptive picture organizer module 104 (or a tile or super-fragment generator module of adaptive picture organizer module 104, for example). The segmentation may be performed using any suitable technique or techniques. In some examples, the segmentation may include a symbol-run coding technique.

Further, the region boundaries (e.g., boundaries between region layer 1010 and region layer 1020 or the like) may be coded for use at encoder 100 and/or decoder 200. The region boundary coding may be performed using any suitable technique or techniques. In some examples, the region boundary coding may include a symbol-run coding technique. In some examples, the region boundary coding may include generating a codebook that approximates the region boundaries on a tile grid. For example, the tile grid (which may or may not correspond to tiles 820 of FIG. 8) may be an equally spaced tile grid having a size of 32×32 pixels or 64×64 pixels or the like.

Returning to FIG. 8, region layer 1010 and region layer 1020 are shown such that region layer 1020 is shown by obscuring the imagery of video frame 810 and region layer 1010 is shown by not obscuring the imagery of video frame 810. Further, as discussed, video frame may be divided into tiles 820-1 through 820-30. In some examples, the frame portions for partitioning may include super-fragments that include an individual region layer portion of a tile, as illustrated in FIG. 9

Figure 9:
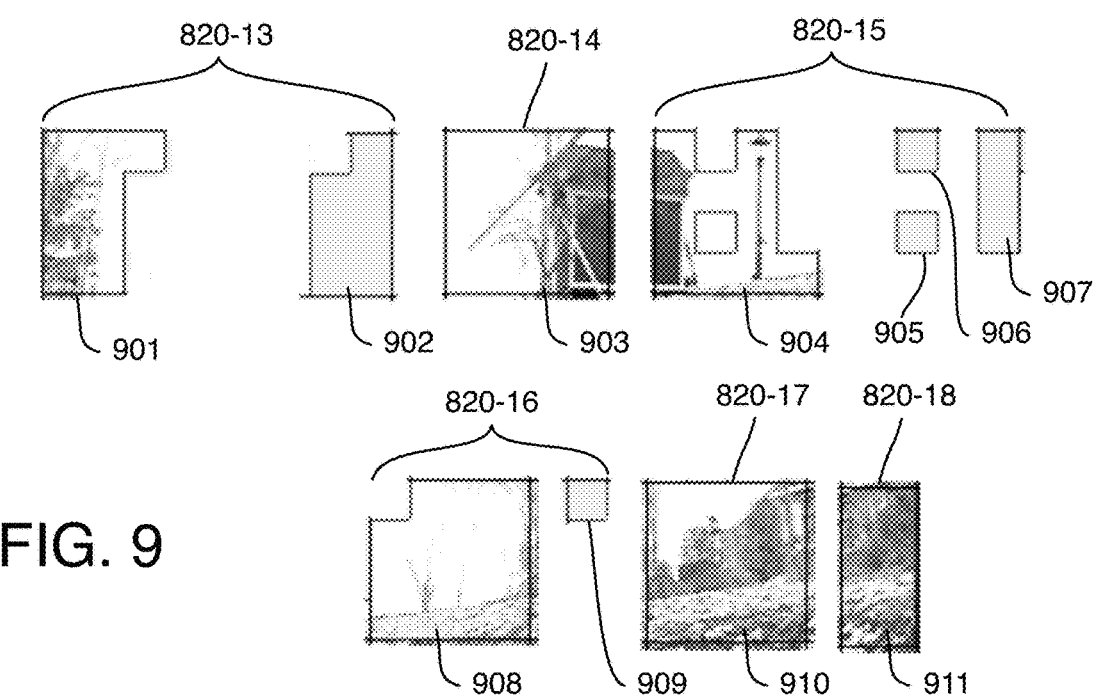
FIG. 9 illustrates example super-fragments of a row of tiles of an example video frame.

FIG. 9 illustrates example super-fragments 901 through 911 of a row of tiles 820-13 through 820-18 of example video frame 810, arranged in accordance with at least some implementations of the present disclosure. As shown, super-fragments 901 through 911 may include portions of a tile in a region layer. For example, super-fragment 901 may include the portion of tile 820-13 in region layer 1010, super-fragment 902 may include the portion of tile 820-13 in region layer 1020, super-fragment 903 may include the portion of tile 820-14 in region layer 1010, and so on. As shown, a super-fragment may have substantially any shape and size (limited only by the precision of the described segmenting operation). For example, super-fragments 903, 910, and 911 may be the entirety of tiles 820-14, 820-17, and 820-18, respectively, such that those super-fragments may be the same shape as their respective tiles. Further, super-fragments 901 and 904 through 909 illustrate a variety of possible shapes while many others are also possible. Further still, super-fragment 904 illustrates that a super-fragment need not be contiguous.

Figure 11A:
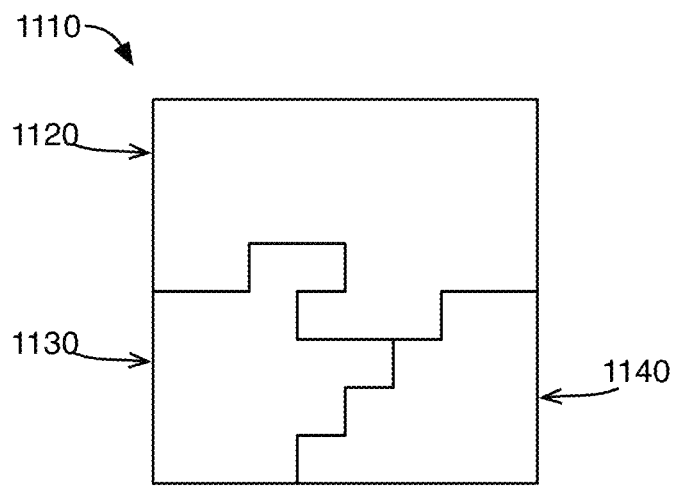
FIGS. 11(A) and 11(B) illustrate an example video frame segmented into region layers and partitioned according to tiles into super-fragments.
Figure 11B:
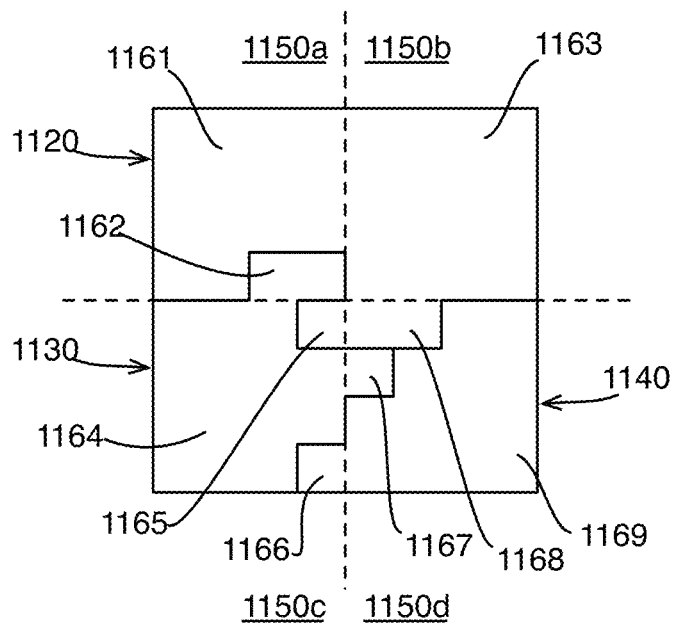

FIGS. 11(A) and 11(B) illustrate an example video frame 1110 segmented into region layers 1120, 1130, 1140, and partitioned according to tiles 1150a through 1150d into super-fragments 1161 through 1169, arranged in accordance with at least some implementations of the present disclosure. As shown in FIG. 11(A) and as discussed above, video frame 1110 (a portion of a video frame is illustrated for the sake of clarity of presentation) may be segmented into region layers 1120, 1130, 1140 as discussed above using any suitable technique, such as, for example, a symbol-run coding via partitions generator module 105 or adaptive picture organizer module 104. In some examples, region layers 1120, 1130, 1140 may represent a fore-ground, a back-ground, and a middle-ground of a scene or the like. As shown in FIG. 11(B), region layers 1120, 1130, 1140 may be overlaid or combined or the like with tiles 1150a through 1150d, which may be defined with respect to video frame 1110 as described above (e.g., video frame 1110 may be divided into ties 1150a through 1150d), to define super-fragments 1161 through 1169 such that each of super-fragments 1161 through 1169 may include portions of a tile in or within a region layer.

For example, super-fragment 1161 may include the portion of tile 1150a in or within region layer 1120, super-fragment 1162 may include the portion of tile 1150a in or within region layer 1130, super-fragment 1163 may include the portion of tile 1150b in or within region layer 1120 (e.g., all of tile 1150b), super-fragment 1164 may include the portion of tile 1150c in or within region layer 1130, super-fragment 1165 may include the portion of tile 1150c in or within region layer 1120, super-fragment 1166 may include the portion of tile 1150c in or within region layer 1140, super-fragment 1167 may include the portion of tile 1150d in or within region layer 1130, super-fragment 1168 may include the portion of tile 1150d in or within region layer 1120, and super-fragment 1169 may include the portion of tile 1150d in or within region layer 1140. It is noted that in FIG. 11(B), super-fragment boundaries are defined by both solid lines representing region layer boundaries and hatched lines representing tile boundaries.

As discussed, frame portions may be defined by dividing a video frame into tiles or defining super-fragments. In some examples, using tiles may offer the advantages of simplicity while super-fragments may be more complex but may offer the advantage of enhanced inter- or intra-prediction or image enhancement. In either case, the frame portions may be partitioned as discussed herein.

As is discussed further below, the segmentation of video frame 810 into tiles or super-fragments may be performed by prediction partitions generator module 105 (or a tile or super-fragment generator module of prediction partitions generator module 105, for example), another module (e.g., a tile or super-fragment generator module) inserted between adaptive picture organizer 104 prediction partitions generator 105, or by adaptive picture organizer module 104 (or a tile or super-fragment generator module of adaptive picture organizer module 104, for example).

Figure 12A:
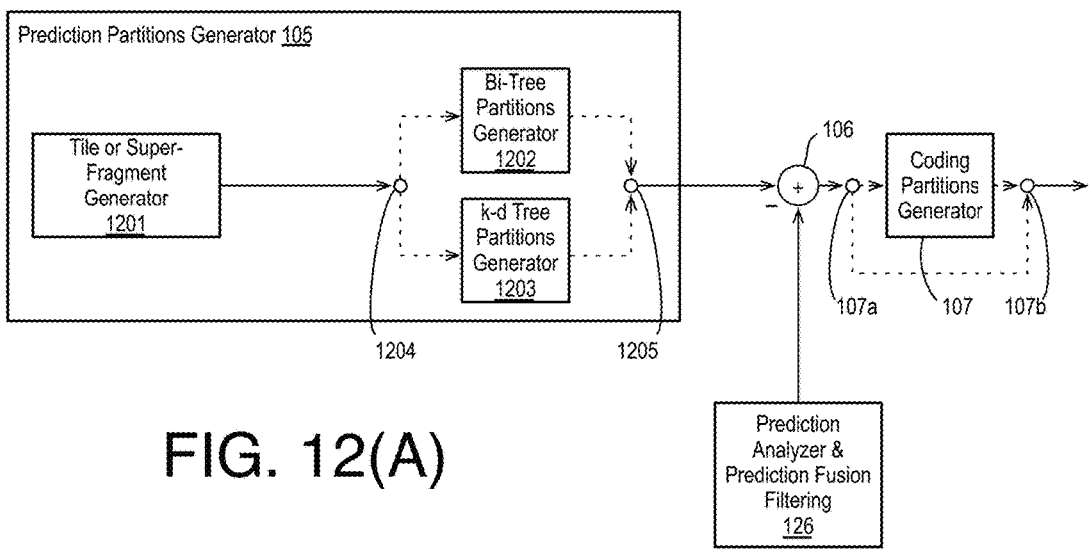
FIGS. 12(A) and 12(B) are illustrative diagrams of example encoder subsystems.
Figure 12B:
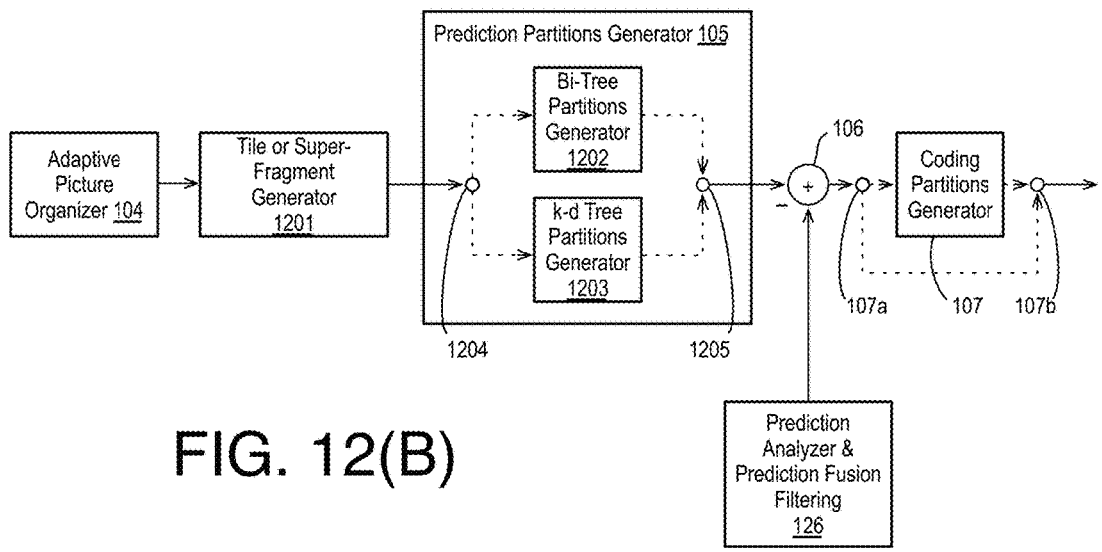

FIGS. 12(A) and 12(B) are illustrative diagrams of example encoder subsystems 1200 and 1210, arranged in accordance with at least some implementations of the present disclosure. In some examples, encoder subsystem 1200 or 1210 may be implemented via encoder 100 as shown in FIG. 1. As shown in FIG. 12(A), encoder subsystem 1200 may include prediction partitions generator module 105, as discussed above. As shown, in some examples, prediction partitions generator module 105 may include a tile or super-fragment generator module 1201, which may generate tiles or super-fragments as discussed herein.

As shown in FIG. 12(B), encoder subsystem 1210 may include a separate tile or super-fragment generator module 1201 implemented between adaptive picture organizer 104 (which may not be considered a part of encoder subsystem 1210 in some implementations) and prediction partitions generator 105. In other examples, separate tile or superfragment generator module 1201 may be implemented via adaptive picture organizer 104 and adaptive picture organizer 104 may be considered a part of the encoder subsystem.

As discussed, in some examples, super-fragments may be coded. In some examples, the super-fragments may be coded by symbol run coding that that may utilize correlation among neighboring blocks along a one-dimensional (1D) scan as likely the neighboring blocks belong to the same region. In other examples, a codebook may be used to approximate the frame portion boundaries on an equally or substantially equally spaced tile grid of 32×32 pixels or 64×64 pixels or the like. In such examples, the main boundaries through each tile may be approximated with a closest pattern available from a codebook and a code corresponding to the pattern may be included in a bitstream for use by a decoder. In some examples, such boundary representations may be lossy in order to minimize the bit cost.

In various implementation, frame portions (e.g., tiles or super-fragments) may be generated by or transmitted to prediction partitions generator module 105, which may include bi-tree partitions generator module 1202 and k-d tree partitions generator module 1203. As shown, frame portions may be input into either bi-tree partitions generator module 1202 or k-d tree partitions generator module 1203 depending on the operation of switches 1204, 1205. In some examples, switches 1204, 1205 may operate based on a picture type of the frame of the frame portions. For example, if the frame is an I-Picture, the received frame portion may be input into k-d tree partitions generator module 1203 via switches 1204, 1205. If the frame is a P- or F/B-picture, the received frame portion may be input into bi-tree partitions generator module 1202 via switches 1204, 1205, for example. In other examples, switches 1204, 1205 may operate based on a characteristic of the received frame portion. For example, if the expected amount of intra-blocks of the frame portion is greater than a threshold, the frame portion may be input into k-d tree partitions generator module 1203 and if the expected amount of intra-blocks of the frame portion is less than the threshold, the frame portion may be input into bi-tree partitions generator module 1202. In various examples, the threshold may be predefined, or heuristically determined or the like.

As shown, the output of prediction partitions generator module 105 (as controlled via switch 1205) may be input into differencer 106, where processing may continue as discussed above with respect to FIG. 1, such that the second input into differencer 106 is the output of prediction fusion analyzer and prediction fusion filtering module 126 and such that the output of differencer 106 (e.g., prediction error data partitions or residuals or the like) may be optionally input into coding partitions generator 107 as controlled via switches 107a, 107b as discussed herein. In some examples, for inter-prediction in FB-pictures or P-pictures, prediction error data partitions may be transmitted to coding partitions generator module 107 for further partitioning into coding partitions (e.g., via a bi-tree portioning technique). In some examples, for intra-prediction in I-pictures, prediction error data partitions (or original pixel data) may bypass coding partitions generator module 107 such that no additional partitioning is performed prior to transform coding (e.g., via adaptive transform module 108). In such examples, frame portions (e.g., tiles or super-fragments) may be partitioned only once and such partitions may be described as prediction partitions or coding partitions or both depending on context. For example, as output from prediction partitions generator, such partitions may be considered prediction partitions (as they are being used for prediction) while at adaptive transform module 108, such partitions may be considered coding partitions (as such partitions are being transform coded).

Figure 13:
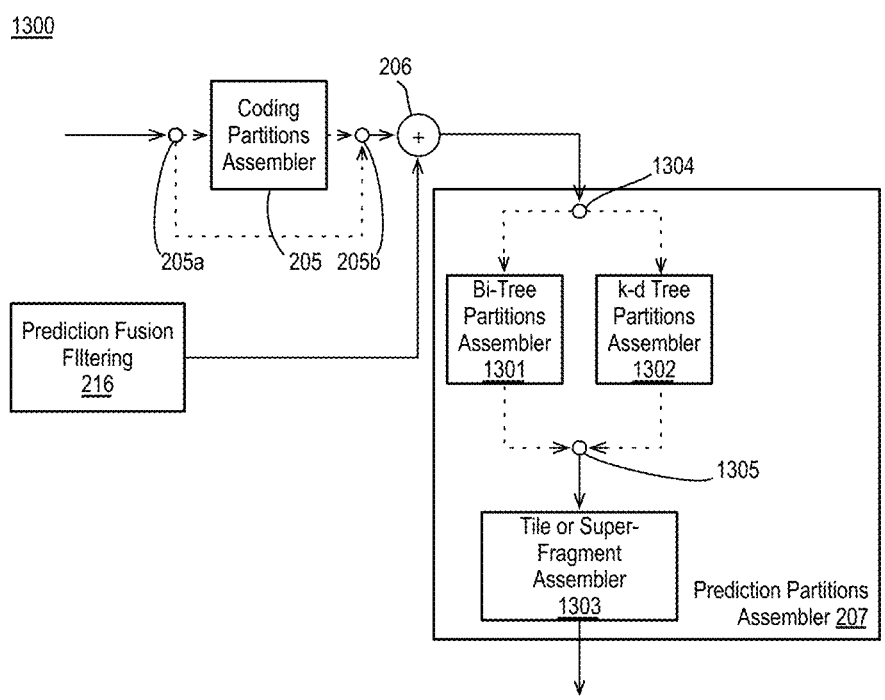
FIG. 13 is an illustrative diagram of an example decoder subsystem.

FIG. 13 is an illustrative diagram of an example decoder subsystem 1300, arranged in accordance with at least some implementations of the present disclosure. In some examples, decoder subsystem 1300 may be implemented via decoder 200 as shown in FIG. 2. As shown in FIG. 13, decoder subsystem 1300 may include coding partitions assembler module 205, which may optionally receive input from adaptive inverse transform module 204 (not shown, please refer to FIG. 2) as controlled via switches 205a, 205b. The output of coding partitions assembler module 205 or the bypassed data (e.g., prediction error data partitions) may be provided as an input to adder 206. As discussed, in some examples, prediction error data partitions may have been transform encoded without further partitioning (e.g., in intra-prediction of I-pictures) and coding partitions assembler module 205 may be bypassed and, in some examples, prediction error data partitions may have been further partitioned into coding partitions for transform coding and coding partitions assembler module 205 may assemble such coding partitions into prediction error data partitions.

The second input to adder 206 (e.g., decoded prediction partitions) may be provided from the output of prediction fusion filtering module 216, as discussed above with respect to FIG. 2. As shown, decoder subsystem 1300 may also include prediction partitions assembler module 207, which may include bi-tree partitions assembler module 1301 and k-d tree partitions assembler module 1302. The output of adder 206 (e.g., reconstructed prediction partitions) may be input into either bi-tree partitions assembler module 1301 or k-d tree partitions assembler module 1302 based on the control of switches 1304, 1305. For example, bi-tree partitions may be input into bi-tree partitions assembler module 1301 for assembly into frame portions and k-d tree partitions may be input into k-d tree partitions assembler module 1302 for assembly into frame portions (e.g., according to the type of partitioning performed at the encoder).

Also as shown, in some examples, prediction partitions assembler module 207 may include a tile or super-fragment assembler module 1303, which may be configured to assemble the assembled frame portions (e.g., tiles or super-fragments) into video frames. The output video frames of partitions assembler module 207 may be input into deblock filtering module 208 (not shown, please refer to FIG. 2) for further processing as discussed herein. In other examples, tile or super-fragment assembler module 1303 may be implemented separately between prediction partitions assembler module 207 and deblock filtering module 208 (please refer to FIG. 2).

Figure 14:
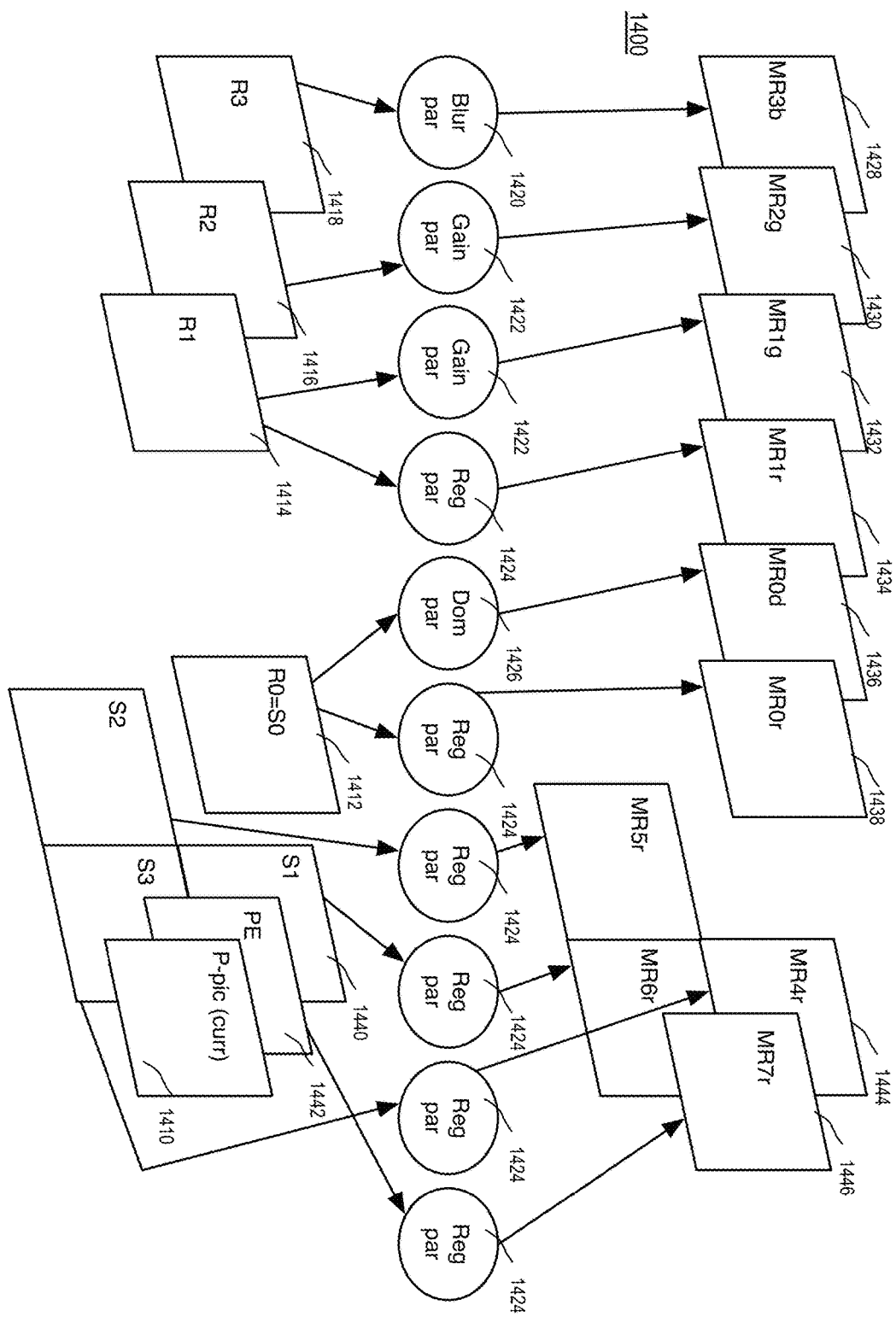
FIG. 14 is an illustrative diagram of modified prediction reference pictures.

FIG. 14 is an illustrative diagram of modified prediction reference pictures 1400, arranged in accordance with at least some implementations of the present disclosure. As shown, the output of quality analyzer and quality restoration filtering may be a final reconstructed frame that may be used for prediction for coding other frames (e.g., the final reconstructed frame may be a reference frame or the like).

The proposed implementation of the NGV coder (e.g., encoder 100 and/or decoder 200) may implement P-picture coding using a combination of Morphed Prediction References 1428 through 1438 (MR0 through 3) and/or Synthesized Prediction References 1412 and 1440 through 1446 (S0 through S3, MR4 through 7). NGV coding involves use of 3 picture types referred to as I-pictures, P-pictures, and F/B-pictures. In the illustrated example, the current picture to be coded (a P-picture) is shown at time t=4. During coding, the proposed implementation of the NGV coder (e.g., encoder 100 and/or decoder 200) may and use one or more of 4 previously decoded references R0 1412, R1 1414, R2 1416, and R3 1418. Unlike other solutions that may simply use these references directly for prediction, the proposed implementation of the NGV coder (e.g., encoder 100 and/or decoder 200) may generate modified (morphed or synthesized) references from such previously decoded references and then use motion compensated coding based on such generated modified (morphed or synthesized) references.

As will be described in greater detail below, in some examples, the proposed implementation of the NGV coder (e.g., encoder 100 and/or decoder 200) may incorporate a number of components and the combined predictions generated by these components in an efficient video coding algorithm. For example, proposed implementation of the NGV coder may include one or more of the following features: 1. Gain Compensation (e.g., explicit compensation for changes in gain/brightness in a scene); 2. Blur Compensation: e.g., explicit compensation for changes in blur/sharpness in a scene; 3. Dominant/Global Motion Compensation (e.g., explicit compensation for dominant motion in a scene); 4. Registration Compensation (e.g., explicit compensation for registration mismatches in a scene); 5. Super Resolution (e.g., explicit model for changes in resolution precision in a scene); 6. Projection (e.g., explicit model for changes in motion trajectory in a scene); the like, and/or combinations thereof.

In the illustrated example, if inter-prediction is applied, a characteristics and motion filtering predictor module may apply motion compensation to a current picture 1410 (e.g., labeled in the figure as P-pic (curr)) as part of the local decode loop. In some instances, such motion compensation may be based at least in part on future frames (not shown) and/or previous frame R0 1412 (e.g., labeled in the figure as R0), previous frame R1 1414 (e.g., labeled in the figure as R1), previous frame R2 1416 (e.g., labeled in the figure as R2), and/or previous frame R3 1418 (e.g., labeled in the figure as R3).

For example, in some implementations, prediction operations may include inter- and/or intra-prediction. Inter-prediction may be performed by one or more modules including a morphing analyzer and generation module and/or a synthesizing analyzer and generation module. Such a morphing analyzer and generation module may analyze a current picture to determine parameters for changes in blur 1420 (e.g., labeled in the figure as Blur par), changes in gain 1422 (e.g., labeled in the figure as Gain par), changes in registration 1424 (e.g., labeled in the figure as Reg par), and changes in dominant motion 1426 (e.g., labeled in the figure as Dom par), or the like with respect to a reference frame or frames with which it is to be coded.

The determined morphing parameters 1420, 1422, 1424, and/or 1426 may be used to generate morphed reference frames. Such generated morphed reference frames may be stored and may be used for computing motion vectors for efficient motion (and characteristics) compensated prediction of a current frame. In the illustrated example, determined morphing parameters 1420, 1422, 1424, and/or 1426 may be used to generate morphed reference frames, such as blur compensated morphed reference frame 1428 (e.g., labeled in the figure as MR3*b*), gain compensated morphed reference frame 1430 (e.g., labeled in the figure as MR2*g*), gain compensated morphed reference frame 1432 (e.g., labeled in the figure as MR1*g*), registration compensated morphed reference frame 1434 (e.g., labeled in the figure as MR1*r*), dominant motion compensated morphed reference frame 1436 (e.g., labeled in the figure as MR0*d*), and/or registration compensated morphed reference frame 1438 (e.g., labeled in the figure as MR0*r*), the like or combinations thereof, for example.

Similarly, a synthesizing analyzer and generation module may generate super resolution (SR) pictures 1440 (e.g., labeled in the figure as S0 (which is equal to previous frame R0 1412), S1, S2, S3) and projected interpolation (PI) pictures 1442 (e.g., labeled in the figure as PE) or the like for determining motion vectors for efficient motion compensated prediction in these frames. Such generated synthesized reference frames may be stored and may be used for computing motion vectors for efficient motion (and characteristics) compensated prediction of a current frame.

Additionally or alternatively, the determined morphing parameters 1420, 1422, 1424, and/or 1426 may be used to morph the generate synthesis reference frames super resolution (SR) pictures 1440 and/or projected interpolation (PI) pictures 1442. For example, a synthesizing analyzer and generation module may generate morphed registration compensated super resolution (SR) pictures 1444 (e.g., labeled in the figure as MR4*r*, MR5*r*, and MR6*r*) and/or morphed registration compensated projected interpolation (PI) pictures 1446 (e.g., labeled in the figure as MR7*r*) or the like from the determined registration morphing parameter 1424. Such generated morphed and synthesized reference frames may be stored and may be used for computing motion vectors for efficient motion (and characteristics) compensated prediction of a current frame.

In some implementations changes in a set of characteristics (such as gain, blur, dominant motion, registration, resolution precision, motion trajectory, the like, or combinations thereof, for example) may be explicitly computed. Such a set of characteristics may be computed in addition to local motion. In some cases previous and next pictures/slices may be utilized as appropriate; however, in other cases such a set of characteristics may do a better job of prediction from previous picture/slices. Further, since there can be error in any estimation procedure, (e.g., from multiple past or multiple past and future pictures/slices) a modified reference frame associated with the set of characteristics (such as gain, blur, dominant motion, registration, resolution precision, motion trajectory, the like, or combinations thereof, for example) may be selected that yields the best estimate. Thus, the proposed approach that utilizes modified reference frames associated with the set of characteristics (such as gain, blur, dominant motion, registration, resolution precision, motion trajectory, the like, or combinations thereof, for example) may explicitly compensate for differences in these characteristics. The proposed implementation may address the problem of how to improve the prediction signal, which in turn allows achieving high compression efficiency in video coding.

For instance, with ever increasing resolution of video to be compressed and expectation of high video quality, the corresponding bitrate/bandwidth required for coding using existing video coding standards such as H.264 or even evolving standards such as H.265/HEVC, is relatively high. The aforementioned standards use expanded forms of traditional approaches to implicitly address the insufficient compression/quality problem, but often the results are limited.

The proposed implementation improves video compression efficiency by improving interframe prediction, which in turn reduces interframe prediction difference (error signal) that needs to be coded. The less the amount of interframe prediction difference to be coded, the less the amount of bits required for coding, which effectively improves the compression efficiency as it now takes less bits to store or transmit the coded prediction difference signal. Instead of being limited to motion predictions only, the proposed NCV codec may be highly adaptive to changing characteristics (such as gain, blur, dominant motion, registration, resolution precision, motion trajectory, the like, or combinations thereof, for example) of the content by employing, in addition or in the alternative to motion compensation, approaches to explicitly compensate for changes in the characteristics of the content. Thus by explicitly addressing the root cause of the problem the NGV codec may address a key source of limitation of standards based codecs, thereby achieving higher compression efficiency.

This change in interframe prediction output may be achieved due to ability of the proposed NCV codec to compensate for a wide range of reasons for changes in the video content. Typical video scenes vary from frame to frame due to many local and global changes (referred to herein as characteristics). Besides local motion, there are many other characteristics that are not sufficiently addressed by current solutions that may be addressed by the proposed implementation.

The proposed implementation may explicitly compute changes in a set of characteristics (such as gain, blur, dominant motion, registration, resolution precision, motion trajectory, the like, or combinations thereof, for example) in addition to local motion, and thus may do a better job of prediction from previous picture/slices than only using local motion prediction from previous and next pictures/slices. Further, since there can be error in any estimation procedure, from multiple past or multiple past and future pictures/slices the NGV coder may choose the frame that yields the best by explicitly compensating for differences in various characteristics.

In particular, the proposed implementation of the NGV coder may include features: i. explicit compensation for changes in gain/brightness in a scene; ii. explicit compensation for changes in blur/sharpness in a scene; iii. explicit compensation for dominant motion in a scene; iv. explicit compensation for registration mismatches in a scene; v. explicit model for changes in resolution precision in a scene; and/or vi. explicit model for changes in motion trajectory in a scene.

Tables 4 and 5, shown below, illustrate one example of codebook entries. A full codebook of entries may provide a full or substantially full listing of all possible entries and coding thereof. In some examples, the codebook may take into account constraints as described above. In some examples, data associated with a codebook entry for prediction modes and/or reference types may be encoded in a bitstream for use at a decoder as discussed herein.

TABLE 4

Example Prediction References in P-pictures

| No. | Ref Types for P-picture for Inter-Prediction mode |
|---|---|
| 0. | MR0r (=past SR0) |
| 1. | MR1r |
| 2. | MR2r |
| 3. | MR2g |
| 4. | MR4r (past SR1) |
| 5. | MR5r (past SR2) |
| 6. | MR6r (past SR3) |

TABLE 4-continued

Example Prediction References in P-pictures

| No. | Ref Types for P-picture for Inter-Prediction mode |
|---|---|
| 7. | MR0d |
| 8. | MR1g |
| 9. | MR3b |

TABLE 5

Example Prediction References in F-pictures

| No. | Ref Types for F-picture for Inter-Prediction mode |
|---|---|
| 0. | MR0r |
| 1. | MR7r (=Proj Interpol) |
| 2. | MR3r (=future SR0) |
| 3. | MR1r |
| 4. | MR4r (=Future SR1) |
| 5. | MR5r (=Future SR2) |
| 6. | MR6r (=Future SR3) |
| 7. | MR0d |
| 8. | MR3d |
| 9. | MR0g/MR3g |
| 10. | MR3b |

In operation, the proposed implementation of the NGV coder (e.g., encoder 100 and/or decoder 200) may operate so that prediction mode and/or reference type data may be defined using symbol-run coding or a codebook or the like. The prediction mode and/or reference type data may be transform encoded using content adaptive or discrete transform in various examples to generate transform coefficients. Also as discussed, data associated with partitions (e.g., the transform coefficients or quantized transform coefficients), overhead data (e.g., indicators as discussed herein for transform type, adaptive transform direction, and/or a transform mode), and/or data defining the partitions and so on may be encoded (e.g., via an entropy encoder) into a bitstream. The bitstream may be communicated to a decoder, which may use the encoded bitstream to decode video frames for display. On a local basis (such as block-by-block within a macroblock or a tile, or on a partition-by-partition within a tile or a prediction unit, or fragments within a superfragment or region) the best mode may be selected for instance based on Rate Distortion Optimization (RDO) or based on pre-analysis of video, and the identifier for the mode and needed references may be encoded within the bitstream for use by the decoder.

In operation, the proposed implementation of the NGV coder (e.g., encoder 100 and/or decoder 200) may use one or more of the above components besides the usual local motion compensation with respect to decoded past and/or future, picture/slices. As such the implementation does not mandate a specific solution for instance for Gain compensation, or for any other characteristics compensated reference frame generation.

Figure 15:
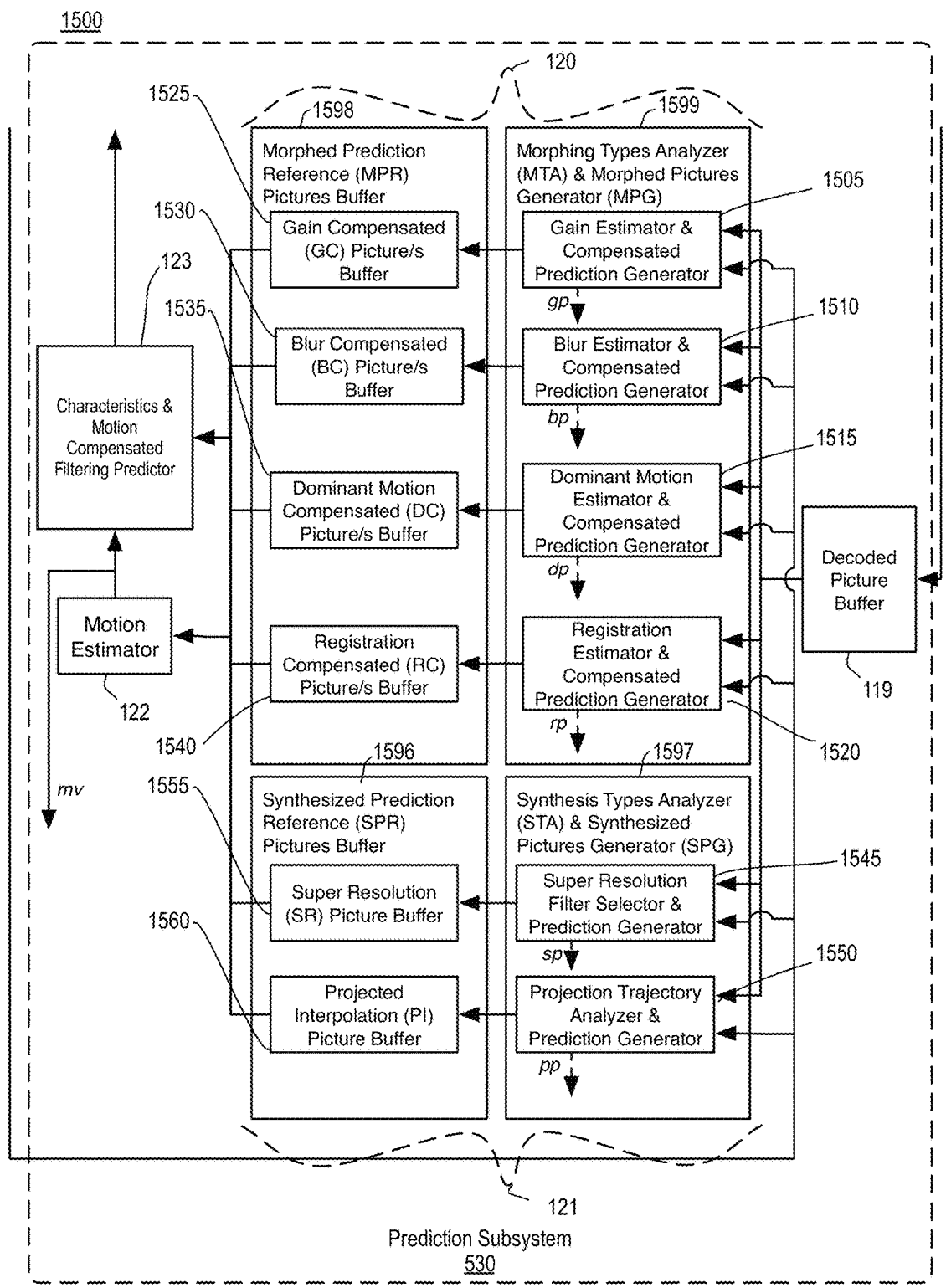
FIG. 15 is an illustrative diagram of an example encoder subsystem.

FIG. 15 is an illustrative diagram of another example encoder prediction subsystem 530 for performing characteristics and motion compensated prediction, arranged in accordance with at least some implementations of the present disclosure. As illustrated, encoder prediction subsystem 530 of encoder 1500 may include decoded picture buffer 119, morphing analyzer and morphed picture generation module 120, synthesizing analyzer and generation module 121, motion estimator module 122, and/or characteristics and motion compensated filtering predictor module 123.

As shown, the output of quality analyzer and quality restoration filtering may be transmitted to decoded picture buffer 119. In some examples, the output of quality analyzer and quality restoration filtering may be a final reconstructed frame that may be used for prediction for coding other frames (e.g., the final reconstructed frame may be a reference frame or the like). In encoder 1500, prediction operations may include inter- and/or intra-prediction. As shown in FIG. 15, inter-prediction may be performed by one or more modules including morphing analyzer and morphed picture generation module 120, synthesizing analyzer and generation module 121, and/or characteristics and motion compensated filtering predictor module 123.

Morphing analyzer and morphed picture generation module 120 may include a morphing types analyzer (MTA) and a morphed pictures generator (MPG) 1599 as well as a morphed prediction reference (MPR) pictures buffer 520. Morphing types analyzer (MTA) and a morphed pictures generator (MPG) 1599 may be configured to analyze and/or generate one or more types of modified prediction reference pictures.

For example, morphing types analyzer (MTA) and a morphed pictures generator (MPG) 1599 may include Gain Estimator and Compensated Prediction Generator 1505, Blur Estimator and Compensated Prediction Generator 1510, Dominant Motion Estimator and Compensated Prediction Generator 1515, Registration Estimator and Compensated Prediction Generator 1520, the like and/or combinations thereof. Gain Estimator and Compensated Prediction Generator 1505 may be configured to analyze and/or generate morphed prediction reference pictures that are adapted to address changes in gain. Blur Estimator and Compensated Prediction Generator 1510 may be configured to analyze and/or generate morphed prediction reference pictures that are adapted to address changes in blur. Dominant Motion Estimator and Compensated Prediction Generator 1515 may be configured to analyze and/or generate morphed prediction reference pictures that are adapted to address changes in dominant motion. Registration Estimator and Compensated Prediction Generator 1520 may be configured to analyze and/or generate morphed prediction reference pictures that are adapted to address changes in registration.

Morphing types analyzer (MTA) and a morphed pictures generator (MPG) 1599 may store such generated morphed reference frames in morphed prediction reference (MPR) pictures buffer 520. For example, morphed prediction reference (MPR) pictures buffer 1598 may include Gain Compensated (GC) Picture/s Buffer 1525, Blur Compensated (BC) Picture/s Buffer 1530, Dominant Motion Compensated (DC) Picture/s Buffer 1535, Registration Compensated (RC) Picture/s Buffer 1540, the like and/or combinations thereof. Gain Compensated (GC) Picture/s Buffer 1525 may be configured to store morphed reference frames that are adapted to address changes in gain. Blur Compensated (BC) Picture/s Buffer 1530 may be configured to store morphed reference frames that are adapted to address changes in blur. Dominant Motion Compensated (DC) Picture/s Buffer 1535 may be configured to store morphed reference frames that are adapted to address changes in dominant motion. Registration Compensated (RC) Picture/s Buffer 1540 may be configured to store morphed reference frames that are adapted to address changes in registration.

Synthesizing analyzer and generation module 121 may include a synthesis types analyzer (STA) and synthesized pictures generator (SPG) 1597 as well as a synthesized prediction reference (SPR) pictures buffer 540. Synthesis types analyzer (STA) and synthesized pictures generator (SPG) 1597 may be configured to analyze and/or generate one or more types of synthesized prediction reference pictures. For example, synthesis types analyzer (STA) and synthesized pictures generator (SPG) 1597 may include Super Resolution Filter Selector & Prediction Generator 1545, Projection Trajectory Analyzer & Prediction Generator 1550, the like and/or combinations thereof. Super Resolution Filter Selector & Prediction Generator 1545 may be configured to analyze and/or generate a super resolution (SR) type of synthesized prediction reference pictures. Projection Trajectory Analyzer & Prediction Generator 1550 may be configured to analyze and/or generate a projected interpolation (PI) type of synthesized prediction reference pictures.

Synthesis types analyzer (STA) and synthesized pictures generator (SPG) 1597 may generate super resolution (SR) pictures and projected interpolation (PI) pictures or the like for efficient motion compensated prediction in these frames. Such generated synthesized reference frames may be stored in synthesized prediction reference (SPR) pictures buffer 1596 and may be used by motion estimator module 122 for computing motion vectors for efficient motion (and characteristics) compensated prediction of a current frame.

For example, synthesized prediction reference (SPR) pictures buffer 1596 may include Super Resolution (SR) Picture Buffer 1555, Projected Interpolation (PI) Picture Buffer 1560, the like and/or combinations thereof. Super Resolution (SR) Picture Buffer 1555 may be configured to store synthesized reference frames that are generated for super resolution (SR) pictures. Projected Interpolation (PI) Picture Buffer 1560 may be configured to store synthesized reference frames that are generated for projected interpolation (PI) pictures.

Motion estimator module 122 may generate motion vector data based on morphed reference frame(s) and/or super resolution (SR) pictures and projected interpolation (PI) pictures along with the current frame. In some examples, motion estimator module 122 may be considered an inter-prediction module. For example, the motion vector data may be used for inter-prediction. If inter-prediction is applied, characteristics and motion compensated filtering predictor module 123 may apply motion compensation as part of the local decode loop as discussed.

Figure 16:
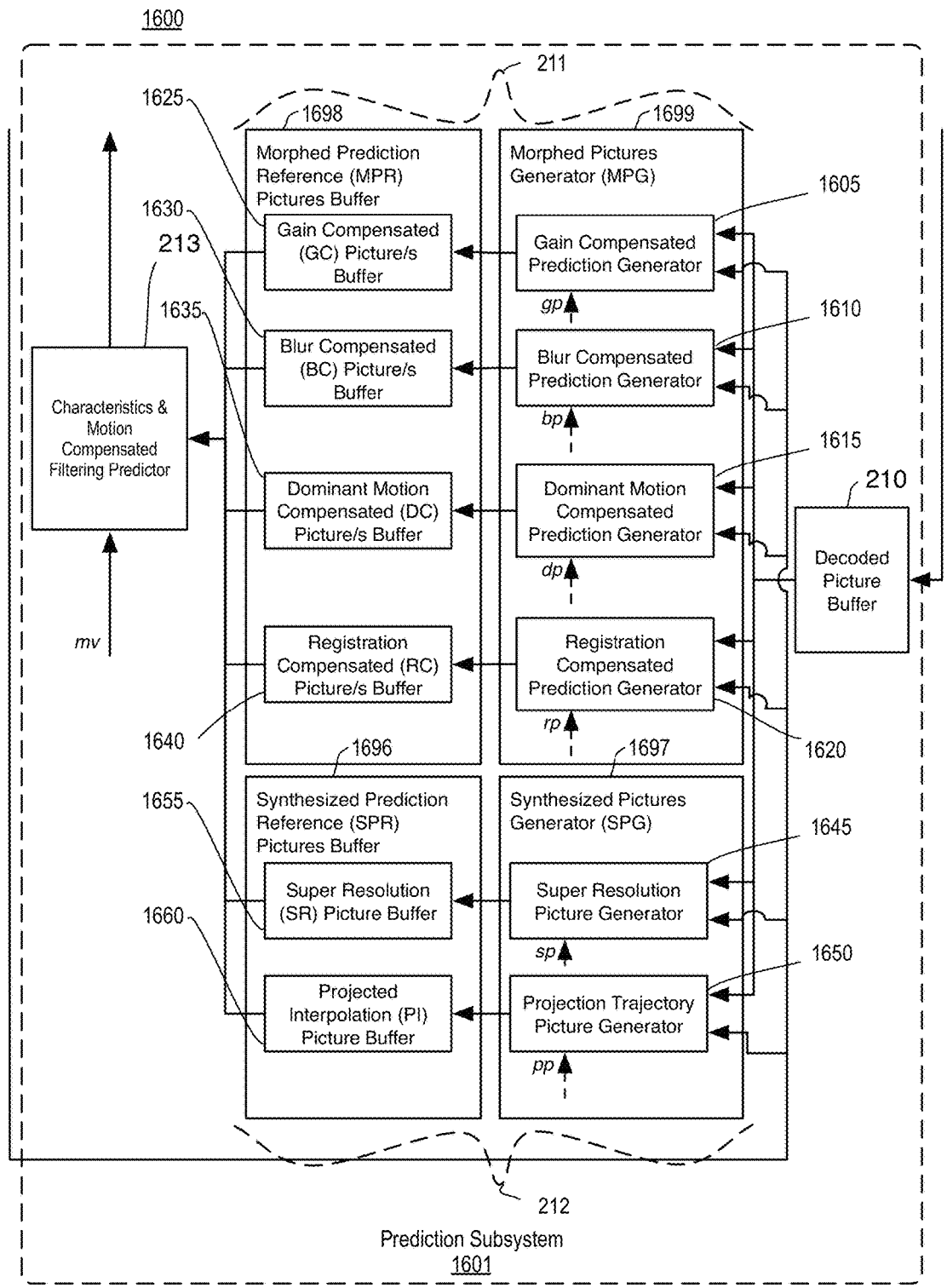
FIG. 16 is an illustrative diagram of an example decoder subsystem.

FIG. 16 is an illustrative diagram of another example decoder prediction subsystem 1601 for performing characteristics and motion compensated prediction, arranged in accordance with at least some implementations of the present disclosure. As illustrated, decoder prediction subsystem 1601 may include decoded picture buffer 210, morphed picture generation module 211, synthesized picture generation module 212, and/or characteristics and motion compensated filtering predictor module 213.

As shown, the output of quality restoration filtering module may be transmitted to decoded picture buffer 210. In some examples, the output of quality restoration filtering module may be a final reconstructed frame that may be used for prediction for coding other frames (e.g., the final reconstructed frame may be a reference frame or the like). As discussed, compensation due to prediction operations may include inter- and/or intra-prediction compensation. As shown, inter-prediction compensation may be performed by one or more modules including morphed picture generation module 211, synthesized picture generation module 212, and/or characteristics and motion compensated filtering predictor module 213.

Morphed picture generation module 211 may include a morphed pictures generator (MPG) 1699 as well as a morphed prediction reference (MPR) pictures buffer 1698. Morphed pictures generator (MPG) 1699 may use de-quantized morphing parameters (e.g., determined from input bitstream) to generate morphed reference frames. For example, morphed pictures generator (MPG) 1699 may include Gain Compensated Prediction Generator 1605, Blur Compensated Prediction Generator 1610, Dominant Motion Compensated Prediction Generator 1615, Registration Compensated Prediction Generator 1620, the like and/or combinations thereof. Gain Compensated Prediction Generator 1605 may be configured to generate morphed prediction reference pictures that are adapted to address changes in gain. Blur Compensated Prediction Generator 1610 may be configured to generate morphed prediction reference pictures that are adapted to address changes in blur. Dominant Motion Compensated Prediction Generator 1615 may be configured to generate morphed prediction reference pictures that are adapted to address changes in dominant motion. Registration Compensated Prediction Generator 1620 may be configured to generate morphed prediction reference pictures that are adapted to address changes in registration.

Morphed pictures generator (MPG) 1699 may store such generated morphed reference frames in morphed prediction reference (MPR) pictures buffer 1698. For example, morphed prediction reference (MPR) pictures buffer 1698 may include Gain Compensated (GC) Picture/s Buffer 1625, Blur Compensated (BC) Picture/s Buffer 1630, Dominant Motion Compensated (DC) Picture/s Buffer 1635, Registration Compensated (RC) Picture/s Buffer 1640, the like and/or combinations thereof. Gain Compensated (GC) Picture/s Buffer 1625 may be configured to store morphed reference frames that are adapted to address changes in gain. Blur Compensated (BC) Picture/s Buffer 1630 may be configured to store morphed reference frames that are adapted to address changes in blur. Dominant Motion Compensated (DC) Picture/s Buffer 1635 may be configured to store morphed reference frames that are adapted to address changes in dominant motion. Registration Compensated (RC) Picture/s Buffer 1640 may be configured to store morphed reference frames that are adapted to address changes in registration.

Synthesized picture generation module 212 may include a synthesized pictures generator (SPG) 1697 as well as a synthesized prediction reference (SPR) pictures buffer 1696. Synthesized pictures generator (SPG) 1697 may be configured to generate one or more types of synthesized prediction reference pictures such as super resolution (SR) pictures and projected interpolation (PI) pictures or the like based on parameters determined from input bitstream 201. Such generated synthesized reference frames may be stored in synthesized prediction reference (SPR) pictures buffer 1696 and may be used by characteristics and motion compensated filtering predictor module 213. For example, synthesized pictures generator (SPG) 1697 may include Super Resolution Picture Generator 1645, Projection Trajectory Picture Generator 1650, the like and/or combinations thereof. Super Resolution Picture Generator 1645 may be configured to generate a super resolution (SR) type of synthesized prediction reference pictures. Projection Trajectory Picture Generator 1650 may be configured to generate a projected interpolation (PI) type of synthesized prediction reference pictures.

Synthesized pictures generator (SPG) 1697 may generate super resolution (SR) pictures and projected interpolation (PI) pictures or the like for efficient motion compensated prediction in these frames. Such generated synthesized reference frames may be stored in synthesized prediction reference (SPR) pictures buffer 1696 and may be used by characteristics and motion compensated filtering predictor module 213 for efficient motion (and characteristics) compensated prediction of a current frame.

For example, synthesized prediction reference (SPR) pictures buffer 1696 may include Super Resolution (SR) Picture Buffer 1655, Projected Interpolation (PI) Picture Buffer 1660, the like and/or combinations thereof. Super Resolution (SR) Picture Buffer 1655 may be configured to store synthesized reference frames that are generated for super resolution (SR) pictures. Projected Interpolation (PI) Picture Buffer 1660 may be configured to store synthesized reference frames that are generated for projected interpolation (PI) pictures.

If inter-prediction is applied, characteristics and motion compensated filtering predictor module 213 may apply motion compensation based on morphed reference frame(s) and/or super resolution (SR) pictures and projected interpolation (PI) pictures along with the current frame.

Figure 17:
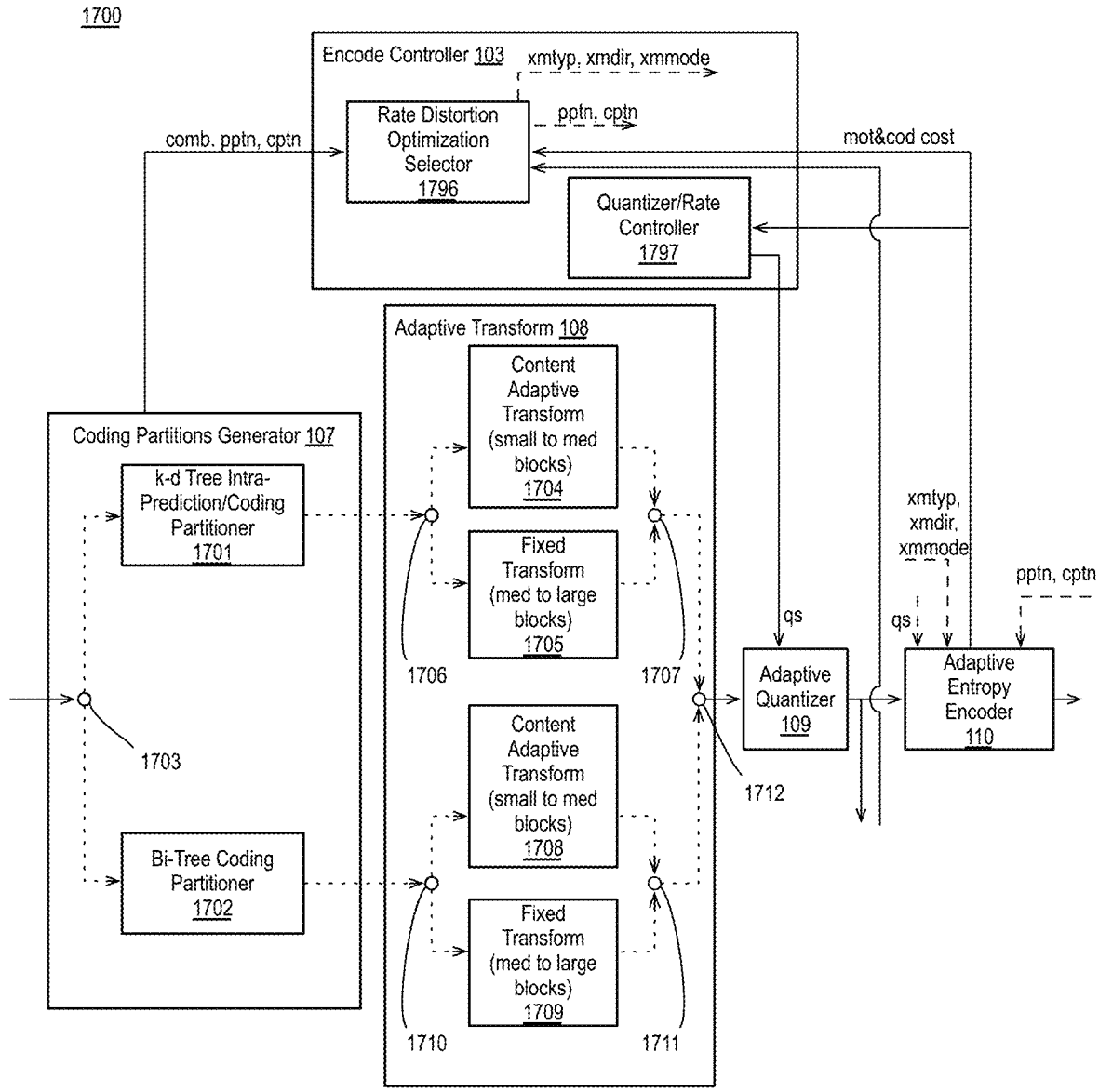
FIG. 17 is an illustrative diagram of an example encoder filter subsystem.

FIG. 17 is an illustrative diagram of an example encoder subsystem 1700, arranged in accordance with at least some implementations of the present disclosure. As shown, encoder subsystem 1700 may include coding partitions generator module 107, encode controller module 103, adaptive transform module 108, adaptive quantizer module 109, and/or adaptive entropy encoder module 110. Although not shown in FIG. 17, for the sake of clarity of presentation, video data may be input to coding partitions generator module 107 from differencer 106, prediction partitions generator module 105, or the like. The video data received by coding partitions generator module 107 may be any suitable video data such as, for example, prediction error data partitions, prediction partitions, tiles or super-fragments, original pixel data, wavelet data, residual data, or any other video data as discussed herein. The video data may provide or represent luma data or chroma data, for example. As shown, in example encoder subsystem 1700, the video data may be received by coding partitions generator module 107.

As shown, coding partitions generator module 107 may include a k-d tree infra-prediction/coding partitioner module 1701 and a bi-tree coding partitioner module 1702. Under the control of switch 1703, received video data may be transmitted to either k-d tree infra-prediction/coding partitioner module 1701 or bi-tree coding partitioner module 1702. For example, switch 1703 may route the video data based on a picture type of the video data and/or a prediction type associated with the video data. For example, when the picture type is an F/B-picture or a P-picture and the prediction type is inter-prediction or the like, the video data may include prediction error data partitions (e.g., error data or residuals for prediction partitions) and switch 1703 may route the video data to bi-tree coding partitioner module 1702 for partitioning into coding partitions. For example, when the picture type is an F/B-picture or a P-picture and the prediction type is intra-prediction, the video data may include tiles or super-fragments video and switch 1703 may route the video data to bi-tree coding partitioner module 1702 for partitioning into partitions that may be labeled as prediction partitions or coding partitions (since only one level of partitioning may be performed). As discussed, in such examples, the partitioning may be performed by bi-tree coding partitioner module 1702 or prediction partitions generator module 105. When the picture type is an I-picture (e.g., which may be coded entirely using intra-prediction)

the video data may include tiles or super-fragments and switch 1703 may route the video data to k-d tree coding partitioner module 1701 for partitioning into partitions that may be labeled as prediction partitions or coding partitions (since only one level of partitioning may be performed). As discussed, in such examples, the partitioning maybe performed by k-d tree coding partitioner module 1701 or prediction partitions generator module 105.

Although illustrated with bi-tree coding partitioner module 1702, in some examples, coding partitions generator module 107 may implement a k-d tree coding partitioner module in place of module 1701 that may partition the prediction partitions using a k-d tree partitioning technique. Similarly, although illustrated with k-d tree intra-prediction/coding partitioner module 1701, in some examples, coding partitions generator module 107 may implement a bi-tree coding partitioner module in place of module 1702 that may partition the prediction partitions using a bi-tree partitioning technique.

As discussed, in some examples, such as in I-picture intra-coding, only one layer of partitioning may be applied, which may be labeled either as prediction partitioning or coding partitioning. In some examples, coding partitions generator 107 may therefore receive I-picture tiles or super-fragments or frames for partitioning using a k-d tree partitioning technique via k-d tree intra-prediction/coding partitioner module 1701. In other examples, I-pictures may have previously been partitioned via prediction partitions generator 105, and no further partitioning may be required. In such examples, k-d tree intra-prediction/coding partitioner module 1701 may be bypassed. In either case, the I-picture partitions (labeled as prediction partitions or coding partitions) may be transmitted to adaptive transform module 108.

Also as discussed, in some examples, in P- or F/B-picture intra-coding, only one layer of partitioning may be applied, which may be labeled either as prediction partitioning or coding partitioning. In some examples, coding partitions generator 107 may therefore receive P- or F/B-picture tiles or super-fragments or frames for partitioning using a bi-tree partitioning technique via bi-tree coding partitioner module 1702 (in such instances bi-tree coding partitioner module 1701 may be considered a bi-tree prediction/coding partitioner module). In other examples, P- or F/B-pictures may have previously been partitioned via prediction partitions generator 105, and no further partitioning may be required. In such examples bi-tree coding partitioner module 1702 may be bypassed. In either case, the P- or F/B-picture partitions (labeled as prediction partitions or coding partitions) may be transmitted to adaptive transform module 108.

In some examples, for each intra prediction partition a prediction direction (e.g., 1 out of 9 or 31 prediction directions) may be associated with the intra prediction partition such that using a past decoded causal area, pixels of previous neighboring tiles and/or neighboring partitions in the same tile of current frame, intra prediction may be made for each prediction partition.

Bi-tree coding partitioner module 1702 may partition the video data into multiple partitions using a bi-tree partitioning technique as is discussed further herein below with respect to FIG. 19. Bi-tree coding partitioner module 1702 may provide for flexible partitioning that may allow for alternatively splitting into partitions in the horizontal and vertical directions. Such a technique may allow for cuts in either the horizontal or vertical direction, or in both directions, and may thereby allow for multiple, flexible partitions. K-d tree intra-prediction/coding partitioner module 1701 may partition the video data into multiple partitions using a k-d tree partitioning technique as is discussed further herein below with respect to FIG. 20. For example, k-d tree intra-prediction/coding partitioner module 1701 may provide for even greater flexibility in partitioning that may allow for alternatively splitting into partitions in the horizontal and vertical directions at both the midpoint of a partition and at ¼ and ¾ points along a partition. Such increases may cause increased overhead and computing, which may be justified for I-pictures, for example. As shown, partitions or sub-partitions (e.g., coding partitions of previously defined partitions for prediction) may be transmitted from coding partitions generator module 107 to adaptive transform module 108.

Taking first the example of k-d tree partitions (e.g., for I-pictures), partitions (e.g., either prediction or coding) may be transmitted to adaptive transform module 108 from either k-d tree intra-prediction/coding partitioner module 1701 or prediction partitions generator module 105. For example, a tile or super-fragment may be partitioned using a k-d tree partitioning technique to generate partitionings (e.g., partitions for prediction). Intra-prediction may be performed for the partitions for prediction to generate prediction partitions, which may be differenced with original pixel data to generate prediction error data partitions. As discussed, a selected partitioning may be determined based on a rate distortion optimization or the like. The prediction error data partitions (and/or prediction partitions) associated with the selected partitioning may be transmitted to adaptive transform module 108. As discussed, such prediction partitions may be alternatively be labeled as coding partitions since only a single level of partitioning may be performed.

As shown, adaptive transform module 108 may include a content adaptive transform module 1704 and a fixed transform module 1705, which may be operated selectively based on the operation of switches 1706, 1707. For example, a content adaptive transform may include a transform with content dependent basis functions that may be determined from decoding neighboring video data (e.g., neighboring blocks, partitions, or the like) or a transform with associated transform data that must be transmitted from an encoder (e.g., via a bitstream) to a decoder for decoding, and a fixed transform may include a fixed transform having fixed basis functions and in which only transform coefficients must be transmitted for decoding, as discussed above.

In some examples, content adaptive transform module 1704 may apply an adaptive transform such as, for example, a parametric transform, a parametric Haar transform, a hybrid parametric Haar transform (e.g., a parametric Haar transform in one direction and a discrete transform in the orthogonal direction), a parametric slant transform, a hybrid parametric slant transform, or the like. In some examples, adaptive transform module 1704 may apply a closed-form hybrid parametric transform or a closed-form hybrid parametric Haar transform. As shown, in some examples content adaptive transform module 1704 may be applied to small to medium sized partitions. For example, small to medium sized partitions may include partitions or blocks having a height of less than or equal to 16 pixels and a width less than or equal to 16 pixels. For example, small to medium sized partitions or blocks may include partitions having a size of 4×4 pixels, 4×8 pixels, 8×4 pixels, 8×8 pixels, 4×16 pixels, 16×4 pixels, 8×16 pixels, 16×8 pixels, 16×16 pixels, or the like.

In some examples, fixed transform module 1705 may apply a discrete transform such as, for example, a discrete cosine transform, a discrete cosine transform approximator, or the like. As shown, in some examples, fixed transform module 1705 may be applied to medium to large sized partitions or blocks. For example, medium to large sized partitions or blocks may include partitions having a height of greater than or equal to 16 pixels and a width greater than or equal to 16 pixels. For example, medium to large sized partitions or blocks may include a wide array of partitions having each side of at least 16 pixels (including square and rectangular partitions), including 16×16 pixels, 16×32 pixels, 32×16 pixels, 32×32 pixels, 32×64 pixels, 64×32 pixels, 64×64 pixels, and so on. In some examples, fixed transform module 1705 may apply a discrete cosine transform using a high precision integer approximation. As discussed, in some examples, there may be overlap between the partitions provided to content adaptive transform module 1704 and those provided to fixed transform module 1705. In such examples, the partitions provided to both content adaptive transform module 1704 and fixed transform module 505 may be evaluated to determine which transform to use. In other examples, there may be no overlap. For example, small to medium sized partitions or blocks may include partitions or blocks having a width less than 16 pixels and a height less than 16 pixels or the like, and medium to large sized pixels may include partitions having a width greater than 16 pixels and a height greater than 16 pixels or the like. In other examples, a heuristic technique may be used to determine when module medium size blocks are transmitted to for transform processing.

As discussed, switches 1706, 1707 may operate to select a transform module for k-d tree partitions (e.g., partitions of I-pictures). In some examples, switches 1706, 1707 and/or coding partitions generator 107 may operate under the control of a rate distortion optimization selector module 1796 of encode controller 103. Rate distortion optimization selector module 1796 may determine optimum choices such as, for example, for a given partition, how may further partitions (e.g., divisions) and associated transform sizes may result in optimum encoding based on providing small to medium partitions to content adaptive transform (small to med blocks) 1704, 1708 of adaptive transform module 108 and medium to large partitions to fixed transform (med to large blocks) 1705, 1709 of adaptive transform module 108. For example, some overhead (e.g., additional encoded bits) may be associated with an adaptive transform such as transform data, which may be needed by a decoder to construct adaptive basis functions or the like. However, such overhead may be reduced by transmitting essential information, such as, for example, a set of indicators including transform type (e.g., xmtyp; e.g., whether the transform for a partition is adaptive or discrete), transform direction (e.g., xmdir; describing whether the parametric transform is horizontal or vertical in hybrid transforms), and/or transform mode (e.g., xmmode; used only for intra coding signals between mode choices of using a prediction difference signal or an original signal) to adaptive transform module 108. Quantizer/Rate Controller 1797 may be configured to adjust the quantization parameters to change the lossyness of the encoding process in response to changing bandwidth restrictions.

Turning now to the example of bi-tree partitions, coding partitions (e.g., coding partitions for F/B- and P-pictures) may be transmitted to adaptive transform module 108, which, as shown, may include a content adaptive transform module 1708 and a fixed transform module 1709, which may be operated selectively based on the operation of switches 1710, 1711. Content adaptive transform module 1708, fixed transform module 1709, and switches 1710, 1711 may operate similarly to content adaptive transform module 1704, fixed transform module 1705, and switches 1706, 1707, and the operations will not be repeated for the sake of brevity. As shown, content adaptive transform module 108 may also include switch 1712, which may be operated in conjunction with switch 1703 to select the proper route for various video data (e.g., video data partitions related to I-pictures or F/B- and P-pictures) as discussed above.

In encoder subsystem 1700 of FIG. 17, in some examples, such as hybrid parametric Haar transforms, the content adaptive transform may only be performed for partitions having a power of 2. In such examples, constraints may be imposed via k-d tree infra-prediction/coding partitioner module 1701 such that partitions may only be powers of 2 to accommodate the available transform. In some examples, if small to medium partitions may not be kept at sizes that are powers of 2, a fixed transform (e.g., a discrete cosine transform or the like) may be used for such partitions without the need for additional signaling overhead.

Figure 18:
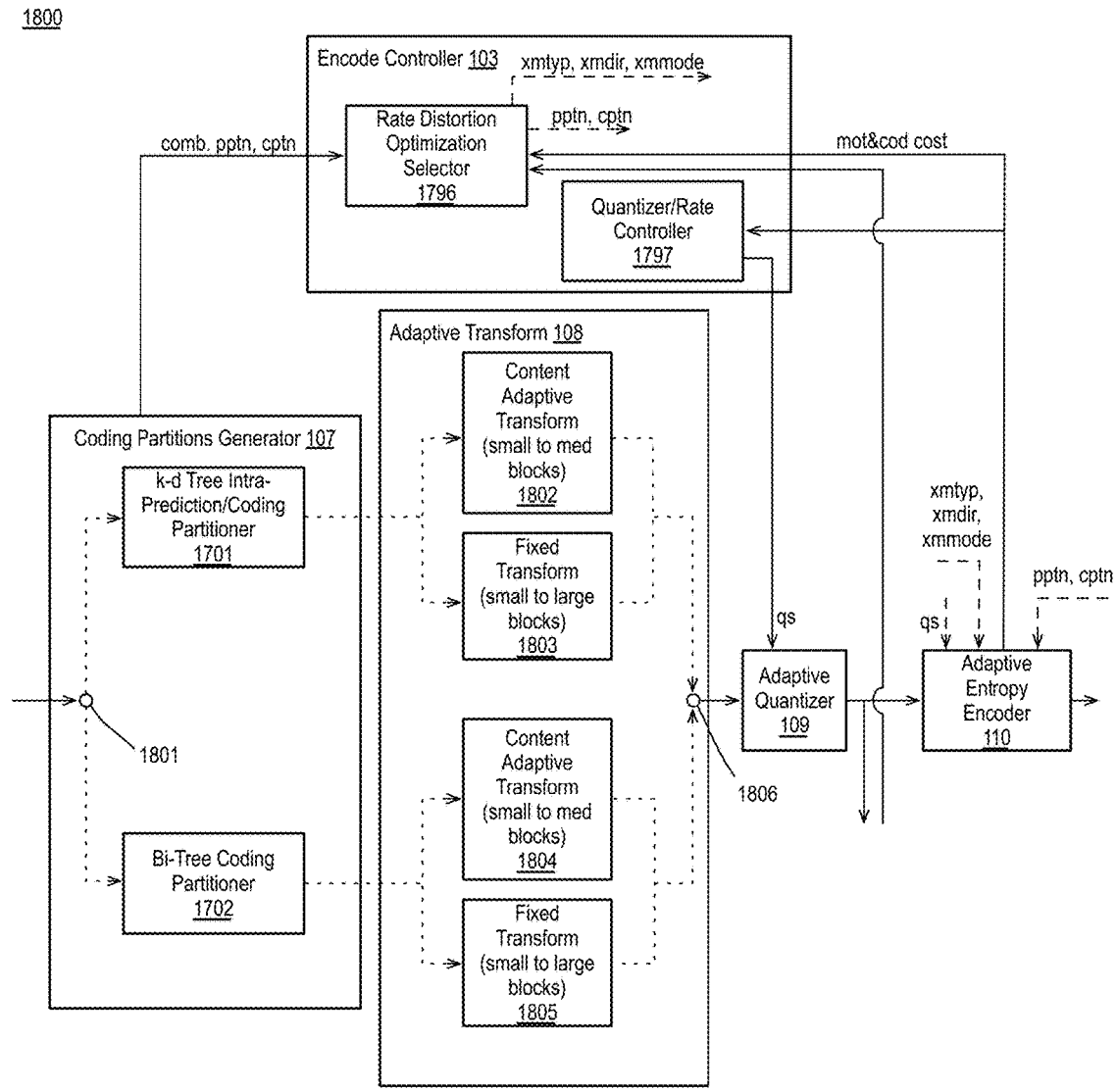
FIG. 18 is an illustrative diagram of an example encoder filter subsystem.

FIG. 18 is an illustrative diagram of an example encoder subsystem 1800, arranged in accordance with at least some implementations of the present disclosure. As shown, encoder subsystem 1800 may include coding partitions generator module 107, encode controller module 103, adaptive transform module 108, adaptive quantizer module 109, and/or adaptive entropy encoder module 110. Although not shown in FIG. 18 for the sake of clarity of presentation, video data may be input to coding partitions generator module 107 from differencer 106, prediction partitions generator module 105, or the like. The video data received by coding partitions generator module 107 may be any suitable video data such as, for example, prediction error data partitions, prediction partitions, tiles or super-fragments, original pixel data, wavelet data, residual data, or any other video data as discussed herein. The video data may provide or represent luma data or chroma data, for example. As shown, in example encoder subsystem 1700, the video data may be received by coding partitions generator module 107.

As shown, coding partitions generator module 107 may include k-d tree infra-prediction/coding partitioner module 1701 and bi-tree coding partitioner module 1702, as discussed above with respect to FIG. 17, operated under the control of switch 1801. Under the control of switch 1801, received video data may be transmitted to either k-d tree infra-prediction/coding partitioner module 1701 or bi-tree coding partitioner module 1702. For example, switch 1801 may route the video data based on a picture type of the video data and/or a prediction type associated with the video data. For example, when the picture type is an F/B-picture or a P-picture and the prediction type is inter-prediction or the like, the video data may include prediction error data partitions (e.g., error data or residuals for prediction partitions) and switch 1801 may route the video data to bi-tree coding partitioner module 1702 for partitioning into coding partitions. For example, when the picture type is an F/B-picture or a P-picture and the prediction type is intra-prediction, the video data may include tiles or super-fragments video and switch 1801 may route the video data to bi-tree coding partitioner module 1702 for partitioning into partitions that may be labeled as prediction partitions or coding partitions (since only one level of partitioning may be performed). As discussed, in such examples, the partitioning may be performed by bi-tree coding partitioner module 1702 or prediction partitions generator module 105. When the picture type is an I-picture (e.g., which may be coded entirely using intra-prediction) the video data may include tiles or super-fragments and switch 1703 may route the video data to k-d tree coding partitioner module 1701 for partitioning into partitions that may be labeled as prediction partitions or coding partitions (since only one level of partitioning may be performed). As discussed, in such examples, the partitioning maybe performed by k-d tree coding partitioner module 1701 or prediction partitions generator module 105.

As discussed, although illustrated with bi-tree coding partitioner module 1702, in some examples, coding partitions generator module 107 may implement a k-d tree coding partitioner module in place of module 1701 that may partition the prediction partitions using a k-d tree partitioning technique. Similarly, although illustrated with k-d tree intra-prediction/coding partitioner module 1701, in some examples, coding partitions generator module 107 may implement a bi-tree coding partitioner module in place of module 1702 that may partition the prediction partitions using a bi-tree partitioning technique.

As discussed, in some examples, such as in I-picture intra-coding, only one layer of partitioning may be applied, which may be labeled either as prediction partitioning or coding partitioning. In some examples, coding partitions generator 107 may therefore receive I-picture tiles or super-fragments or frames for partitioning using a k-d tree partitioning technique via k-d tree intra-prediction/coding partitioner module 1701. In other examples, I-pictures may have previously been partitioned via prediction partitions generator 105, and no further partitioning may be required. In such examples, k-d tree intra-prediction/coding partitioner module 1701 may be bypassed. In either case, the I-picture partitions (labeled as prediction partitions or coding partitions) may be transmitted to adaptive transform module 108.

Also as discussed, in some examples, in P- or F/B-picture intra-coding, only one layer of partitioning may be applied, which may be labeled either as prediction partitioning or coding partitioning. In some examples, coding partitions generator 107 may therefore receive P- or F/B-picture tiles or super-fragments or frames for partitioning using a bi-tree partitioning technique via bi-tree coding partitioner module 1702 (in such instances bi-tree coding partitioner module 1701 may be considered a bi-tree prediction/coding partitioner module). In other examples, P- or F/B-pictures may have previously been partitioned via prediction partitions generator 105, and no further partitioning may be required. In such examples bi-tree coding partitioner module 1702 may be bypassed. In either case, the P- or F/B-picture partitions (labeled as prediction partitions or coding partitions) may be transmitted to adaptive transform module 108.

Bi-tree coding partitioner module 1702 may partition the video data into multiple partitions using a bi-tree partitioning technique as is discussed further herein below with respect to FIG. 19. K-d tree intra-prediction/coding partitioner module 1701 may partition the video data into multiple partitions using a k-d tree partitioning technique as is discussed further herein below with respect to FIG. 20. Bi-tree coding partitioner module 1702 may partition prediction error data partitions (for example) into multiple coding partitions using a bi-tree partitioning technique and k-d tree intra-prediction/coding partitioner module 1701 may partition the video data (e.g., I-picture tiles or super-fragments) into multiple partitions using a k-d tree partitioning technique, as discussed herein. As shown in FIG. 18, coding partitions or, in the case of I-pictures, coding partitions or prediction partitions (as labeled) may be transmitted from coding partitions generator module 107 to adaptive transform module 108.

Taking first the example of k-d tree partitions, partitions (e.g., for I-pictures) may be transmitted to a content adaptive transform module 1802 and a fixed transform module 1803 of adaptive transform module 108. For example, a tile or super-fragment may be partitioned using a k-d tree partitioning technique to generate partitionings (e.g., partitions for prediction). Intra-prediction may be performed for the partitions for prediction to generate prediction partitions, which may be differenced with original pixel data to generate prediction error data partitions. As discussed, a selected partitioning may be determined based on a rate distortion optimization or the like. The prediction error data partitions (and/or prediction partitions) associated with the selected partitioning may be transmitted to adaptive transform module 108. As discussed, such prediction partitions may be alternatively be labeled as coding partitions since only a single level of partitioning may be performed.

As shown, adaptive transform module 108 may include content adaptive transform module 1802 and fixed transform module 1803. For example, a content adaptive transform may include a transform with content dependent basis functions that may be determined from decoding neighboring video data (e.g., neighboring blocks or partitions or the like) or a transform with associated transform data that must be transmitted from an encoder (e.g., via a bitstream) to a decoder for decoding, and a fixed transform may include a transform having fixed basis functions and in which only transform coefficients must be transmitted for decoding, as discussed above.

In some examples, content adaptive transform module 1802 may apply an adaptive transform such as, for example, a parametric transform, a parametric Haar transform, a hybrid parametric Haar transform (e.g., a parametric Haar transform in one direction and a discrete transform in the orthogonal direction), a parametric slant transform, a hybrid parametric slant transform, or the like. In some examples, adaptive transform module 1802 may apply a closed-form hybrid parametric transform or a closed-form hybrid parametric Haar transform. As shown, in some examples content adaptive transform module 1802 may be applied to small to medium sized partitions or blocks. For example, small to medium sized partitions or blocks may include partitions or blocks having a height of less than or equal to 16 pixels and a width less than or equal to 16 pixels. For example, small to medium sized partitions or blocks may include partitions or blocks having a size of 4×4 pixels, 4×8 pixels, 8×4 pixels, 8×8 pixels, 4×16 pixels, 16×4 pixels, 8×16 pixels, 16×8 pixels, 16×16 pixels, or the like.

In some examples, fixed transform module 1803 may apply a discrete transform such as, for example, a discrete cosine transform, a discrete cosine transform approximator, or the like. As shown, in some examples, fixed transform module 1803 may be applied to medium to large sized partitions or blocks. For example, medium to large sized partitions or blocks may include partitions or blocks having a height of greater than or equal to 16 pixels and a width greater than or equal to 16 pixels. For example, medium to large sized partitions or blocks may include wide array of partitions or blocks having each side of at least 16 pixels (including square and rectangular partitions), including 16×16 pixels, 16×32 pixels, 32×16 pixels, 32×32 pixels, 32×64 pixels, 64×32 pixels, 64×64 pixels, and so on. In some examples, fixed transform module 1803 may apply a discrete cosine transform using a high precision integer approximation.

Turning now to the example of bi-tree partitions, coding partitions (e.g., coding partitions for F/B- and P-pictures) may be transmitted to an adaptive transform module 1804 and a discrete transform module 1805 of adaptive transform module 108. Adaptive transform module 1804 and discrete transform module 1805 may operate similarly to adaptive transform module 1802 and discrete transform module 1804, and the operations will not be repeated for the sake of brevity. As shown, adaptive transform module 108 may also include switch 1806, which may be operated in conjunction with switch 1801 to select the proper route for various video data.

For partitions provided to both content adaptive transform module 1802 and fixed transform module 1803 or to both content adaptive transform module 1804 and discrete transform module 1805 (e.g., small to medium sized partitions), a decision may be made as to which transform module result to use based on a trade-off analysis via rate distortion optimization selector module 1796. For medium to large size partitions, there is substantially no change in performance with respect to encoder subsystem 1700 since a fixed transform may still be applied to such partitions. Encoder subsystem 1800 may provide the ability to make optimal decisions from a coding efficiency/bits savings perspective with respect to small to medium sized partitions at the cost of additional computations and decision overhead. Such overhead may be encoded as a set of indicators including transform type (e.g., xmtyp; e.g., whether the transform for a partition is adaptive or discrete), transform direction (e.g., xmdir; describing whether the parametric transform is horizontal or vertical in hybrid transforms), and/or transform mode (e.g., xmmode; used only for intra coding signals between mode choices of using a prediction difference signal or an original signal). As shown in FIG. 18, such indicators or flags or data or the like may be provided to adaptive entropy encoder module 110 for encoding in a bitstream such as output bitstream 111.

As discussed with respect to FIGS. 17 through 18, various partitions (e.g., coding partitions of F/B- or P-pictures for inter-prediction or prediction/coding partitions of I-, F/B-, or P-pictures for intra-prediction) may be transform coded. In such examples, data associated with the partitions (e.g., data describing the size or location or the like of the partitions) may also be provided via a bitstream such as output bitstream 111 or the like.

Further, as discussed, the concepts of small, medium, and large partitions have been discussed in various contexts (e.g., picture types and/or luma or chroma). The following tables illustrate example block sizes and associated transform types in some implementations.

For example, Table 6 illustrates example partition or block sizes for content adaptive transforms such as a hybrid parametric Haar transform (e.g., small to medium sized prediction/coding partitions) for intra-coding (e.g., for I-pictures) of luma (e.g., for k-d tree partitions).

TABLE 6

Example Partitions for Content Adaptive
Transforms for Intra-Coding of Luma

| No. | Partition Sizes |
|---|---|
| 0 | 4 × 4 |
| 1 | 4 × 8 |
| 2 | 4 × 16 |
| 3 | 8 × 4 |
| 4 | 16 × 4 |
| 5 | 8 × 8 |
| 6 | 8 × 16 |
| 7 | 16 × 8 |
| 8 | 16 × 16 |

For example, Table 7 illustrates example partitions for content adaptive transforms such as a hybrid parametric Haar transform (e.g., small to medium sized prediction/coding partitions) for intra-coding (e.g., for I-pictures) of chroma (e.g., for k-d tree partitions).

TABLE 7

Example Partitions for Content Adaptive
Transforms for Intra-Coding of Chroma

| No. | Partition Sizes |
|---|---|
| 0 | 2 × 2 |
| 1 | 2 × 4 |
| 2 | 2 × 8 |
| 3 | 4 × 2 |
| 4 | 8 × 2 |
| 5 | 4 × 4 |
| 6 | 4 × 8 |
| 7 | 8 × 4 |
| 8 | 8 × 8 |

For example, Table 8 illustrates example partitions for content adaptive transforms such as a hybrid parametric Haar transform (e.g., small to medium sized coding partitions) for inter-coding (e.g., for F/B- and P-pictures) of luma (e.g., for bi-tree partitions).

TABLE 8

Example Partitions for Content Adaptive
Transforms for Inter-Coding of Luma

| No. | Partition Sizes |
|---|---|
| 0 | 4 × 4 |
| 1 | 8 × 8 |
| 2 | 16 × 16 |

For example, Table 9 illustrates example partitions for content adaptive transforms such as a hybrid parametric Haar transform (e.g., small to medium sized coding partitions) for inter-coding (e.g., for F/B- and P-pictures) of chroma (e.g., for bi-tree partitions).

TABLE 9

Example Partitions for Content Adaptive
Transforms for Inter-Coding of Chroma

| No. | Partition Sizes |
|---|---|
| 0 | 2 × 2 |
| 1 | 4 × 4 |
| 2 | 8 × 8 |

For example, for fixed transforms such as a discrete cosine transform (e.g., all coding partitions) for intra-coding (e.g., for I-pictures using k-d tree partitions) and for inter-coding (e.g., for F/B- and P-pictures using bi-tree partitions), all combinations of sizes having a factor of 4 from 4×4 to 64×64 may have an applicable transform. Similarly, for fixed transforms or luma, all combinations of sizes having a factor of 2 from 2×2 to 32×32 may have an applicable transform.

Figure 19:
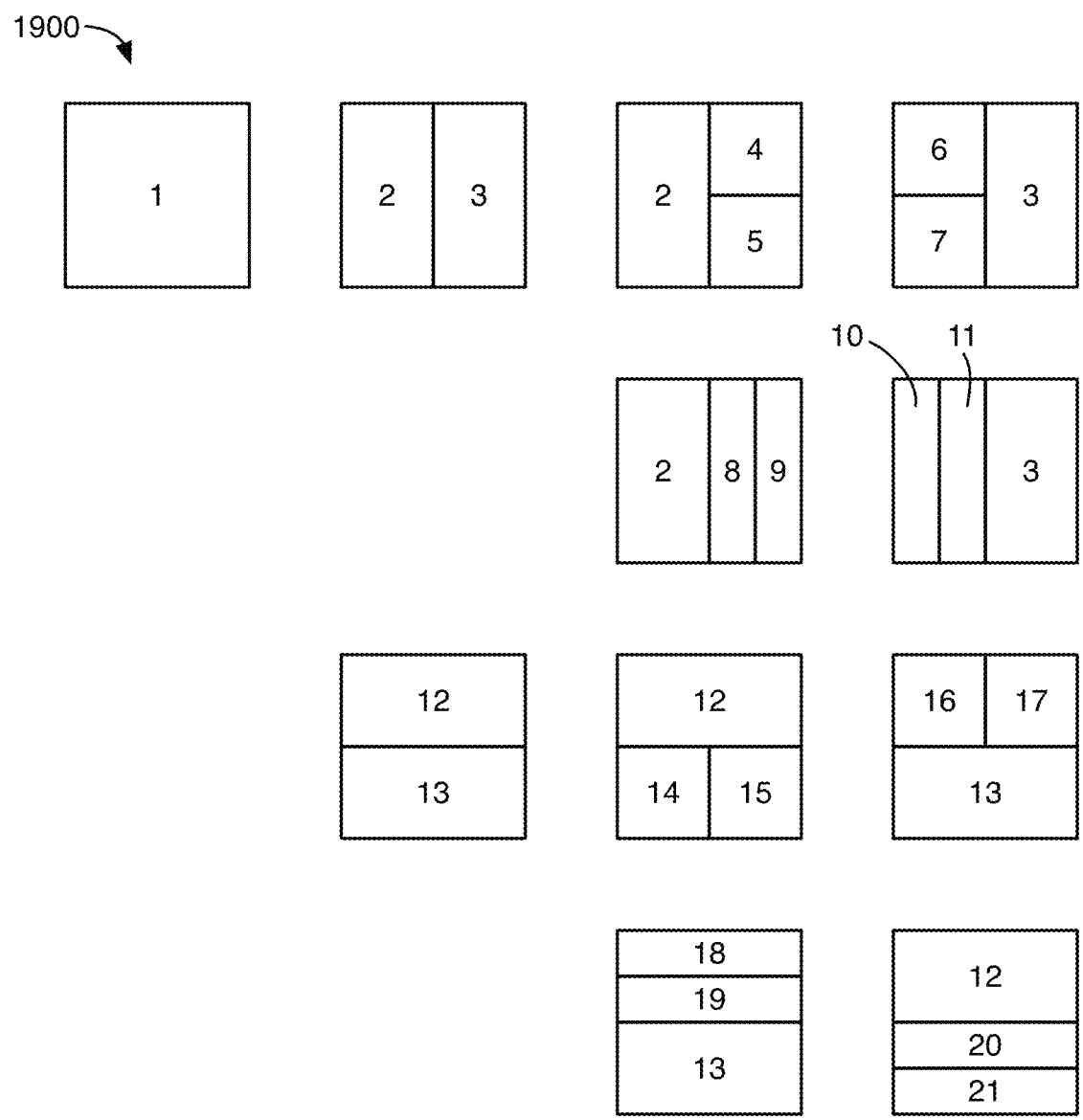
FIG. 19 illustrates example partitioning using a bi-tree partitioning technique.

FIG. 19 illustrates example partitioning of a frame portion 1900 using a bi-tree partitioning technique, arranged in accordance with at least some implementations of the present disclosure. As shown, in some examples, frame portion 1900 may include a square shape. As discussed, in various examples, frame portion 1900 may include any suitable shape. Further, frame portion 1900 may include a tile or a super-fragment or the like as discussed herein. Further, in some examples, frame portion 1900 may itself be a partition such that the illustrated partitions may be considered sub-partitions. Such examples may occur when partitions are further partitioned for coding (e.g., transform coding) via sub-partitions generator module 107 as will be further discussed herein below.

As shown in FIG. 19, bi-tree partitioning may include a progression of partitioning. Beginning with frame portion 1900, a partition 1 may be defined as frame portion 1900 itself. Partition 1 may be vertically partitioned into two partitions 2, 3. Each of partitions 2, 3, may be further partitioned, this time vertically into partitions 4, 5 (e.g., partitions of partition 3) and partitions 6, 7 (e.g., partitions of partition 2). The second row (from the top) of FIG. 19 illustrates further vertical partitioning of partition 3 into partitions 8, 9 and further vertical partitioning of partition 2 into partitions 10, 11. The third row (from the top) of FIG. 19 illustrates horizontal partitioning (e.g., instead of the vertical partitioning of the first row (from the top)) to generate partitions 12, 13 from partition 1. The third row (from the top) of FIG. 19 also illustrates further vertical partitioning of partitions 12, 13 to generate partitions 14, 15 (e.g., partitions of partition 13) and partitions 16, 17 (e.g., from partitions of partition 12). The fourth or bottom row illustrates further horizontal partitioning of partition 12 to generate partitions 18, 19 and of partition 13 to generate partitions 20, 21. As illustrated, bi-tree partitioning may be used recursively, one dimension at a time (e.g., horizontally and vertically) to subdivide or partition each partition into two equal partitions until the smallest partition size may be reached. Bi-tree partitioning may partition a frame portion into a wide number of combinations and may provide for a smooth progression of partitions.

Figure 20:
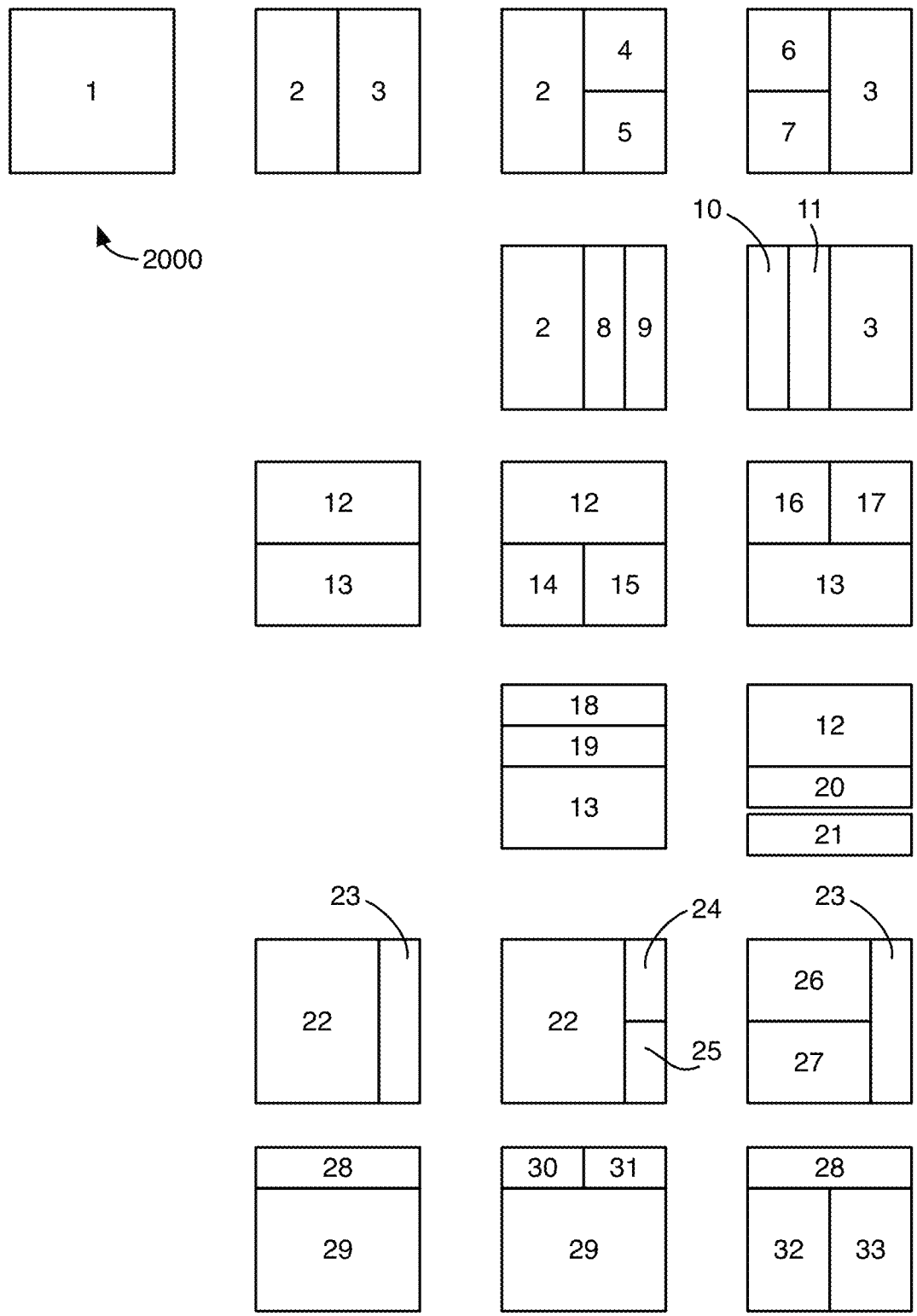
FIG. 20 illustrates example partitioning using a k-d tree partitioning technique.

FIG. 20 illustrates example partitioning of a frame portion 2000 using a k-d tree partitioning technique, arranged in accordance with at least some implementations of the present disclosure. As shown, in some examples, frame portion 2000 may include a square shape. As discussed, in various examples, frame portion 2000 may include any suitable shape. Further, frame portion 2000 may include a tile, or a super-fragment or the like as discussed herein.

As shown in FIG. 20, k-d tree partitioning may include a progression of partitioning. Further, as illustrated, k-d tree partitioning may be a superset of bi-tree partitioning such that rows 1-4 of FIG. 20 (beginning from the top of FIG. 20) may match rows 1-4 of FIG. 19. In some examples, the process of k-d tree partitioning illustrated in FIG. 20 may divide frame portion 2000 iteratively into four rectangular partitions in a particular dimension (e.g., vertical or horizontal). Beginning with frame portion 2000, a partition 1 may be defined as frame portion 2000 itself. Partition 1 may be vertically partitioned into two partitions 2, 3. Each of partitions 2, 3, may be further partitioned, this time vertically into partitions 4, 5 (e.g., partitions of partition 3) and partitions 6, 7 (e.g., partitions of partition 2). The second row (from the top) of FIG. 20 illustrates further vertical partitioning of partition 3 into partitions 8, 9 and further vertical partitioning of partition 2 into partitions 10, 11. The third row (from the top) of FIG. 20 illustrates horizontal partitioning (e.g., instead of the vertical partitioning of the first row (from the top)) to generate partitions 12, 13 from partition 1. The third row (from the top) of FIG. 20 also illustrates further vertical partitioning of partitions 12, 13 to generate partitions 14, 15 (e.g., partitions of partition 13) and partitions 16, 17 (e.g., from partitions of partition 12). The fourth row (from the top) illustrates further horizontal partitioning of partition 12 to generate partitions 18, 19 and of partition 13 to generate partitions 20, 21.

As discussed, through the fourth row, k-d tree partitioning may substantially match bi-tree partitioning. As illustrated at the fifth row (from the top) of FIG. 20, frame portion 2000 may be partitioned into ¼ and ¾ size partitions vertically to generate partitions 22, 23. Further, partition 23 may be partitioned in half vertically to generate partitions 24, 25 and partition 22 may be partitioned in half vertically to form partitions 26, 27. As illustrated at the sixth or bottom row of FIG. 20, frame portion 2000 may be partitioned into ¼ and ¾ size partitions horizontally to generate partitions 28, 29. Further, partition 28 may be partitioned in half horizontally to generate partitions 30, 31 and partition 29 may be partitioned in half horizontally to form partitions 32, 33. Such a partitioning process may be repeated recursively, alternating dimensions (e.g., horizontal and vertical) to subdivided or partition each partition into 2 equal parts (halves) and 2 unequal parts (e.g., at a ratio of 1:3) until the smallest partition size may be reached. K-d tree partitioning may partition a frame portion into a wide number of combinations not only at a midpoint of the partitions and sub-partitions (and so on) but also with further accuracy on each access. In the illustrated example, one-quarter accuracy is used. In other examples, any accuracy may be used such as one-third, one fifth, or the like may be used.

As discussed with respect to FIGS. 19 and 20, frame portions may be partitioned into a wide range of partitions. The partitions may each be indexed with an index value and transmitted to encode controller 103 (please refer to FIG. 1). The indexed and transmitted partitions may include hundreds of partitions, for example. One or more partitions may be used as discussed with respect to FIG. 1 for prediction and/or coding (e.g., transform coding; in some examples, partitions for coding may be further partitioned into sub-partitions). For example, I-pictures may be predicted entirely using intra-prediction, P-pictures may use inter- and intra-prediction, although inter-prediction may be the main source of prediction for P-pictures, and F/B-pictures may also use both inter- and intra-prediction. For example, encode controller 103 may select partitions for use in inter-prediction and intra prediction operations. Data associated with the inter- and/or intra-prediction and data defining the utilized partitions may be encoded in a bitstream, for example, as is discussed further herein below.

In some examples, the wide range of partitioning options may be limited or constrained. Such a constraint may be applied in either bi-tree or k-d tree partitioning examples. For example, partitioning the frame portion (e.g., the tile or super-fragment) may include pre-defining a first partition as halving frame portion in a first dimension (e.g., horizontal or vertical) and pre-defining a second partition as halving the at least one frame portion in a second dimension (e.g., the opposite of the first halving). Further partitions may be made only after such initial constrained partitioning, for example, such that other optional partitions based on the initial frame portion will no longer be available. Such constraints may provide for beginning with 64×64 pixel frame portions and dividing the frame portion into 32×32 size sub-portions and then partitioning each sub-portion by k-d tree or bi-tree partitioning, which may limit or the number of partitions.

The prediction partitions and/or coding partitions may be defined (e.g., their shape and/or location may be defined) for use by the encoder and/or decoder. In some examples, an individual prediction partition of a frame portion or a coding partition of a prediction partition may be defined using symbol-run coding based on pixel blocks. In other examples, an individual prediction partition of a frame portion or a coding partition of a prediction partition may be defined using a code book. Table 10 illustrates an example bi-tree partitioning codebook of entries with fragment size of 32×32 pixels for use in defining a partition of a tile or a super-fragment. In Table 10, the large X's represent nonterminating partitions.

TABLE 10

Example of bi-tree partitioning codebook entries

| Index | Shape | Number of Partitions |
|---|---|---|
| 0 |  | 1 |
| 1 | 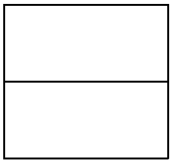 | 2 |
| 2 | 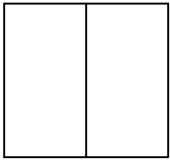 | 2 |
| 3 | 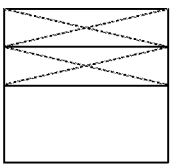 | 3 |
| 4 | 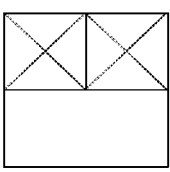 | 3 |
| 5 | 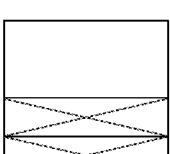 | 3 |
| 6 | 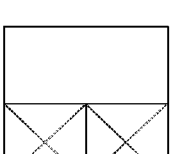 | 3 |

TABLE 10-continued

Example of bi-tree partitioning codebook entries

| Index | Shape | Number of Partitions |
|---|---|---|
| 7 | 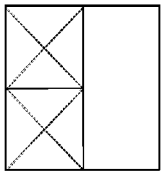 | 3 |
| 8 | 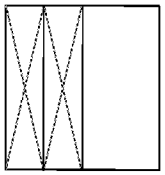 | 3 |
| 9 | 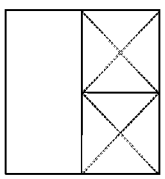 | 3 |
| 10 | 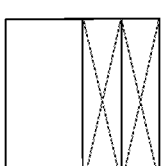 | 3 |

Table 11 illustrates an example k-d tree partitioning codebook of entries with fragment size of 32×32 pixels for use in defining a partition of a tile or a super-fragment.

TABLE 11

Example of k-d tree partitioning codebook entries

| Index | Shape | Number of Partitions |
|---|---|---|
| 0 | 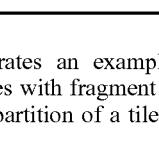 | 1 |
| 1 | 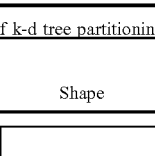 | 2 |
| 2 |  | 2 |

TABLE 11-continued

Example of k-d tree partitioning codebook entries

| Index | Shape | Number of Partitions |
|---|---|---|
| 3 | 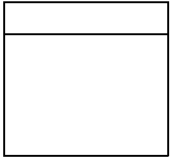 | 2 |
| 4 | 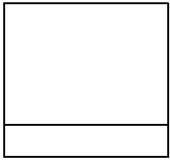 | 2 |
| 5 | 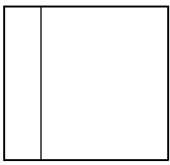 | 2 |
| 6 | 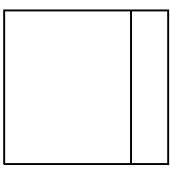 | 2 |
| 7 | 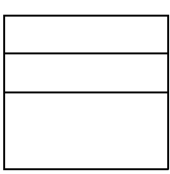 | 3 |
| 8 | 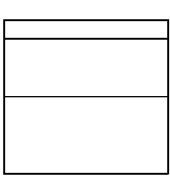 | 3 |
| 9 | 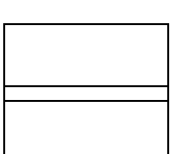 | 3 |
| 10 | 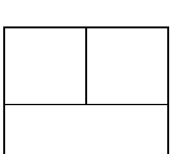 | 3 |
| 11 | 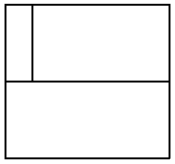 | 3 |
| 12 | 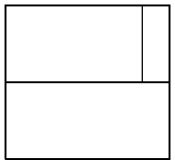 | 3 |

Tables 10 and 11 only show example codebook entries. A full codebook of entries may provide a full or substantially full listing of all possible entries and coding thereof. In some examples, the codebook may take into account constraints as described above. In some examples, data associated with a codebook entry for a partition (or sub-partition) may be encoded in a bitstream for use at a decoder as discussed herein.

As discussed, frame portions (e.g., tiles or super-fragments) may be partitioned based on a chosen partitioning technique (e.g., bi-tree partitioning or k-d tree partitioning) to generate prediction partitions. The prediction partitions may be used for encoding based on inter-prediction techniques and/or intra-prediction techniques. A local decode loop implemented via the encoder may generate prediction partitions, which may be used to generate prediction error data partitions or residuals (e.g., differences between prediction partitions and original pixel data). In some instances, the prediction partitions may be coded and they may therefore be described as prediction partitions or coding partitions substantially interchangeably. Such instances may occur in the context of intra-prediction in I-pictures (or, in some implementations in the context of intra-prediction in P- and F/B-pictures) for example. In other instances (e.g., in P- and FB-pictures), the prediction error data partitions may be evaluated to determine whether they need to be encoded and, if so, the associated partitions may be further partitioned into coding partitions for coding. Further, the prediction partitions and/or coding partitions may be characterized or defined using symbol-run coding or a codebook or the like. Also as discussed, data associated with the described prediction partitions and/or coding partitions, prediction data and so on may be encoded (e.g., via an entropy encoder) into a bitstream. The bitstream may be communicated to a decoder, which may use the encoded bitstream to decode video frames for display.

Figure 21:
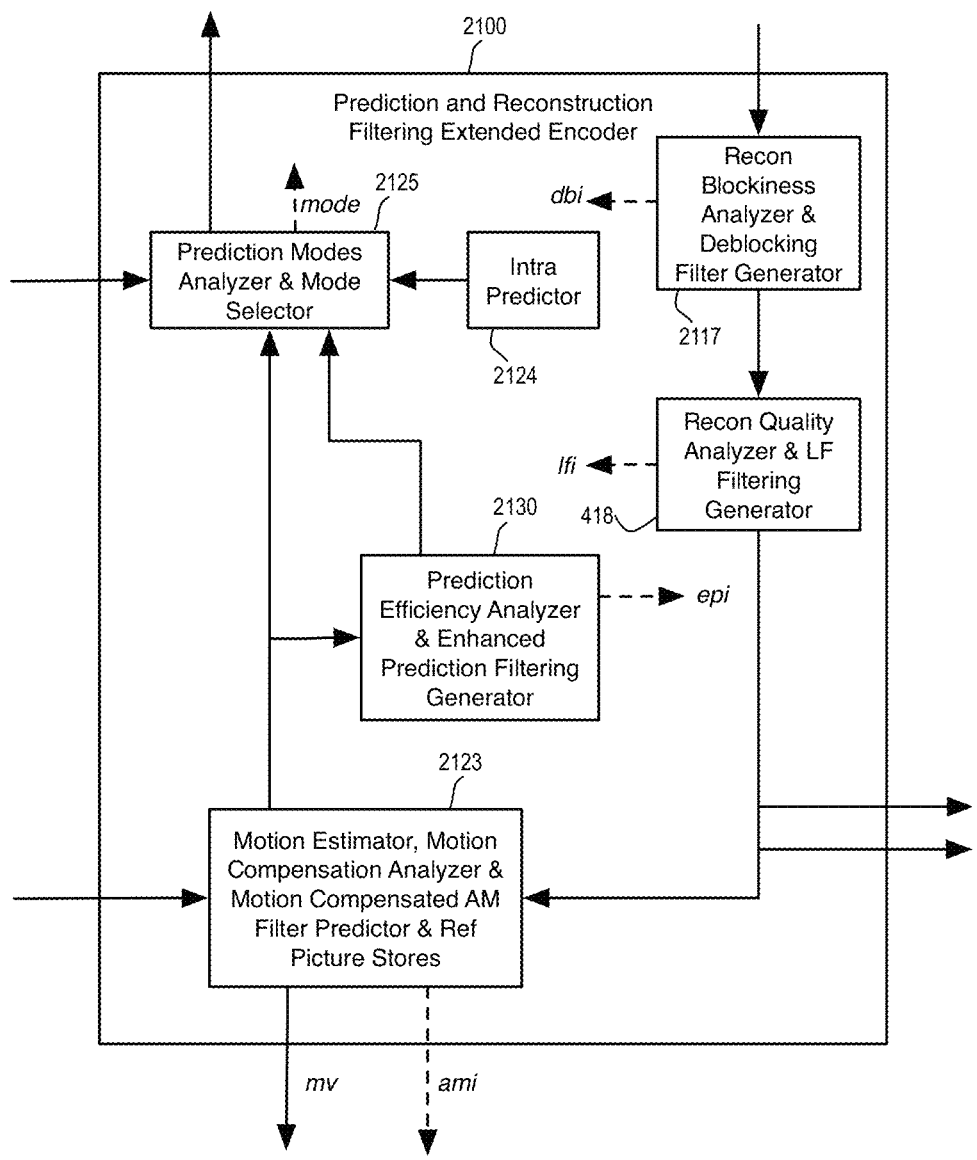
FIG. 21 is an illustrative diagram of an example encoder filter subsystem.

FIG. 21 is an illustrative diagram of an example encoder filtering subsystem 2100, arranged in accordance with at least some implementations of the present disclosure. As illustrated, filtering subsystem 2100 may include recon blockiness analyzer & deblocking filter generator 2117, recon quality analyzer & LF filtering generator 2118, motion estimator, motion compensation analyzer & motion compensated AM filter predictor & ref picture stores 2123, intra predictor 2124, prediction modes analyzer & mode selector 2125, and/or prediction efficiency analyzer & enhanced prediction filtering generator 2130.

In the illustrated implementation, recon blockiness analyzer & deblocking filter generator 2117 may be capable of analysis of blocking produced during coding, determining dbi parameters to control how deblocking is applied.

In the illustrated implementation, recon quality analyzer & LF filtering generator 2118 may be capable of analyzing and performing loop filtering, determining lfi parameters (e.g., filter coefficients, filter index, filter block map, or the like).

In the illustrated implementation, motion estimator, motion compensation analyzer & motion compensated AM filter predictor & ref picture stores 2123 may be capable of improving motion compensated prediction, determining ami parameters.

In the illustrated implementation, intra predictor 2124 may be capable of performing intra prediction.

In the illustrated implementation, prediction modes analyzer & mode selector 2125 may be capable of selecting between various motion prediction modes and intra prediction modes available on a block basis, and selecting prediction references.

In the illustrated implementation, prediction efficiency analyzer & enhanced prediction filtering generator 2130 may be capable of optionally filtering the prediction signal so that both the filtered version as well as not filtered version can be provided to prediction modes analyzer & mode selector 2125, determining epi parameters.

Figure 22:
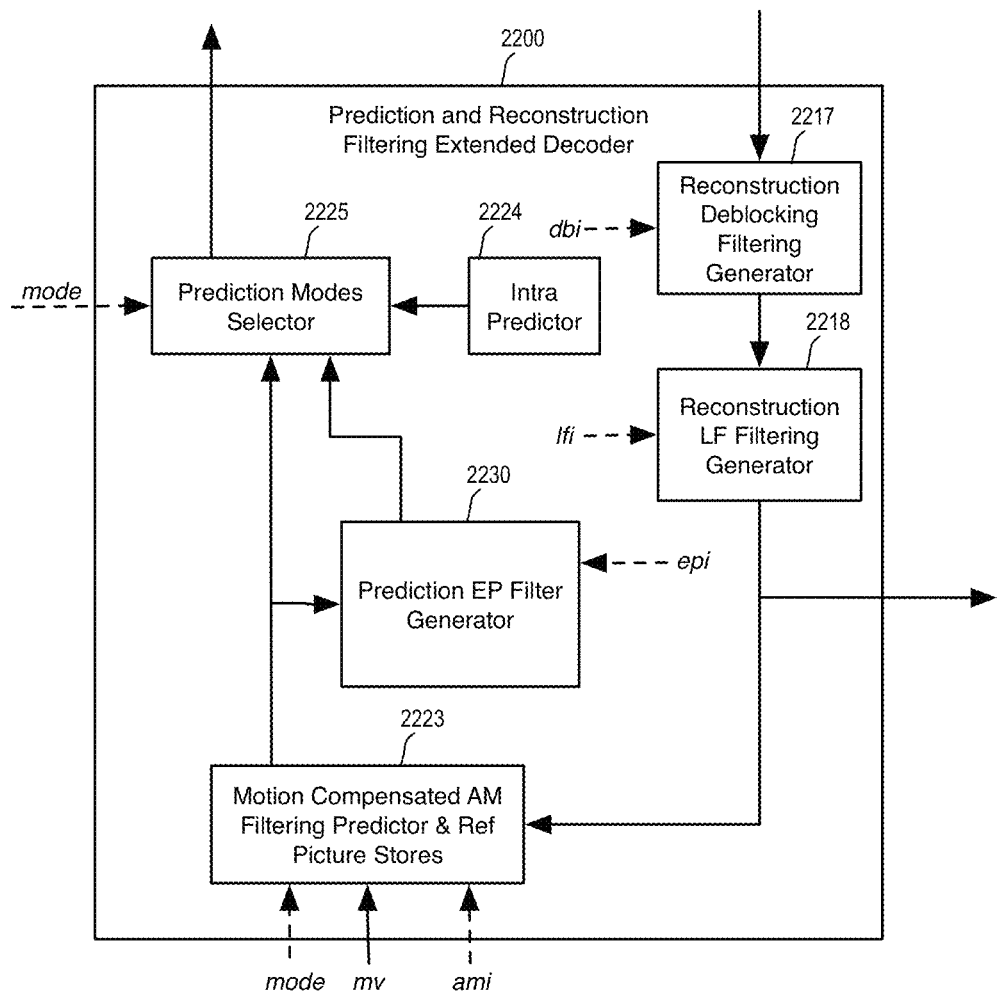
FIG. 22 is an illustrative diagram of an example decoder filter subsystem.

FIG. 22 is an illustrative diagram of an example decoder subsystem 2200, arranged in accordance with at least some implementations of the present disclosure. As shown, decoder subsystem 2200 may include reconstruction deblocking filtering generator 2217, reconstruction LF filtering generator 2218, motion compensated AM filtering predictor & ref picture stores 2223, intra predictor 2224, prediction modes selector 2225, and/or prediction EP filter generator 2230.

In the illustrated implementation, reconstruction deblocking filter generator 2217 may be capable of deblocking. The operation of reconstruction deblocking filter generator 2217 may be controlled by dbi parameters received from, for example, encoder 100 of FIG. 1.

In the illustrated implementation, reconstruction LF filtering generator 2218 may be capable of performing loop filtering. The operation of reconstruction LF filtering generator 2218 may be controlled by lfi parameters received from, for example, encoder 100 of FIG. 1.

In the illustrated implementation, motion compensated AM filtering predictor & ref picture stores 2223 may be capable of AM filtering. The operation of motion compensated AM filtering predictor & ref picture stores 2223 may be controlled by ami parameters received from, for example, encoder 100 of FIG. 1.

In the illustrated implementation, intra predictor 2224 may be capable of performing intra prediction.

In the illustrated implementation, prediction modes selector 2225 may be capable of determining a prediction mode selection from among, "skip", "auto", "inter", "multi", and "intra", for each prediction partition of a tile, all of which may apply to P- and F/B-pictures, based on mode selection data in, for example, input bitstream 201. In addition to prediction modes, prediction modes selector 2225 also allows for selection of reference types that can be different depending on "inter" or "multi" mode, as well as for P- and FB-pictures.

2300, arranged in accordance with at least some implementations of the present disclosure. As shown, encoder subsystem 2300 may include recon blockiness analyzer & DD filter generator 2317, recon quality analyzer & QR filter generator 2318, motion estimator, motion compensation analyzer & characteristics & motion compensated AP filter predictor & morphed/synthesized ref picture stores 2323, intra predictor 2324, prediction modes analyzer & mode selector 2325, prediction efficiency analyzer & EI filtering generator 2330, and/or prediction fusion analyzer & FI filter generator 2335.

In the illustrated implementation, recon blockiness analyzer & DD filter generator 2317 may be capable of analysis of blocking produced during coding, determining ddi parameters to control how deblocking may be applied. Recon blockiness analyzer & DD filter generator 1617 may operate on 4 pixels at a time to remove blockiness from encoded video that may use a variety of block sizes for motion compensation and transform coding. Recon blockiness analyzer & DD filter generator 2317 may also use a dithering operation that may further reduces the appearance of blockiness without reducing statistical (PSNR) metrics.

In the illustrated implementation, recon quality analyzer & QR filter generator 2318 may be capable of performing quality restoration filtering, outputting qri parameters that may be sent to the decoder via the bitstream. Recon quality analyzer & QR filter generator 2318 may use a Wiener filter that may be nonsymmetric, point symmetric or hybrid (party symmetric partly nonsymmetric) of 9×9 square or shapes that are a subset of 9×9 or 11×9 coefficients. Recon quality analyzer & QR filter generator 2318 may minimize filtering overhead by use of a codebook search, so either the computed coefficients (after prediction) may be encoded and sent to the decoder or an index to a history filter or codebook filter may be sent to the decoder. Recon quality analyzer & QR filter generator 2318 may correct filter coefficients from a codebook by sending a correction term, and the codebook may be updated while encoding progresses. Both luma and chroma signals may be filtered and may use different shapes and filter sizes.

In the illustrated implementation, motion estimator, motion compensation analyzer & characteristics & motion compensated AP filter predictor & morphed/synthesized ref picture stores 2323 may be capable of performing adaptive precision filtering and outputting api parameters that may be sent to the decoder via the bitstream. Motion estimator, motion compensation analyzer & characteristics & motion compensated AP filter predictor & morphed/synthesized ref picture stores 2323 may use a Wiener filter that may use explicitly computed filters for each of 16, ¼ pel location. Motion estimator, motion compensation analyzer & characteristics & motion compensated AP filter predictor & morphed/synthesized ref picture stores 2323 may generate filtering combinations using a series of available filters in the codebook by using a mix and match approach, allowing for different types of content, such as slow motion to high motion (blurry content) with corresponding filters. Motion estimator, motion compensation analyzer & characteristics & motion compensated AP filter predictor & morphed/synthesized ref picture stores 2323 may create new filter combinations from mixing and matching specific ¼ pel locations from multiple filters.

In the illustrated implementation, intra predictor 2324 may be capable of performing intra prediction.

In the illustrated implementation, prediction modes analyzer & mode selector 2325 may be capable of may be capable of selecting between various motion prediction modes and intra prediction modes available on a block basis, and selecting prediction references.

In the illustrated implementation, prediction efficiency analyzer & EI filtering generator 2330 may be capable of outputting filtered prediction signals and eii filter parameters that may be sent to the decoder via bitstream.

In the illustrated implementation, prediction fusion analyzer & FI filter generator 2335 may be capable of receiving output from prediction modes analyzer & mode selector 2325 and performing an analysis of predicted picture (region, or 1 or more slices) to determine how filtering may improve the prediction signal and thereby reduce prediction errors in the actual signal that is coded. The filtering information, including whether one filter or multiple filters (on one or more block types) may be used, along with actual filter coefficients, index to history or codebook based prediction, and associated coefficient prediction differences, may be sent as fii information. Prediction fusion analyzer & FI filter generator 2335 may use a Wiener filter that may be nonsymmetric, point symmetric or hybrid (party symmetric partly nonsymmetric) of 9×9 square or shapes that are a subset of 9×9 or 11×9 coefficients. Prediction fusion analyzer & FI filter generator 2335 may minimize filtering overhead by use of a codebook search, so either the computed coefficients (after prediction) may be encoded and sent to the decoder or an index to a history filter or codebook filter may be sent to the decoder. Prediction fusion analyzer & FI filter generator 2335 may correct filter coefficients from a codebook by sending a correction term, and the codebook may be updated while encoding progresses. Both luma and chroma signals may be filtered and may use different shapes and filter sizes.

Figure 24:
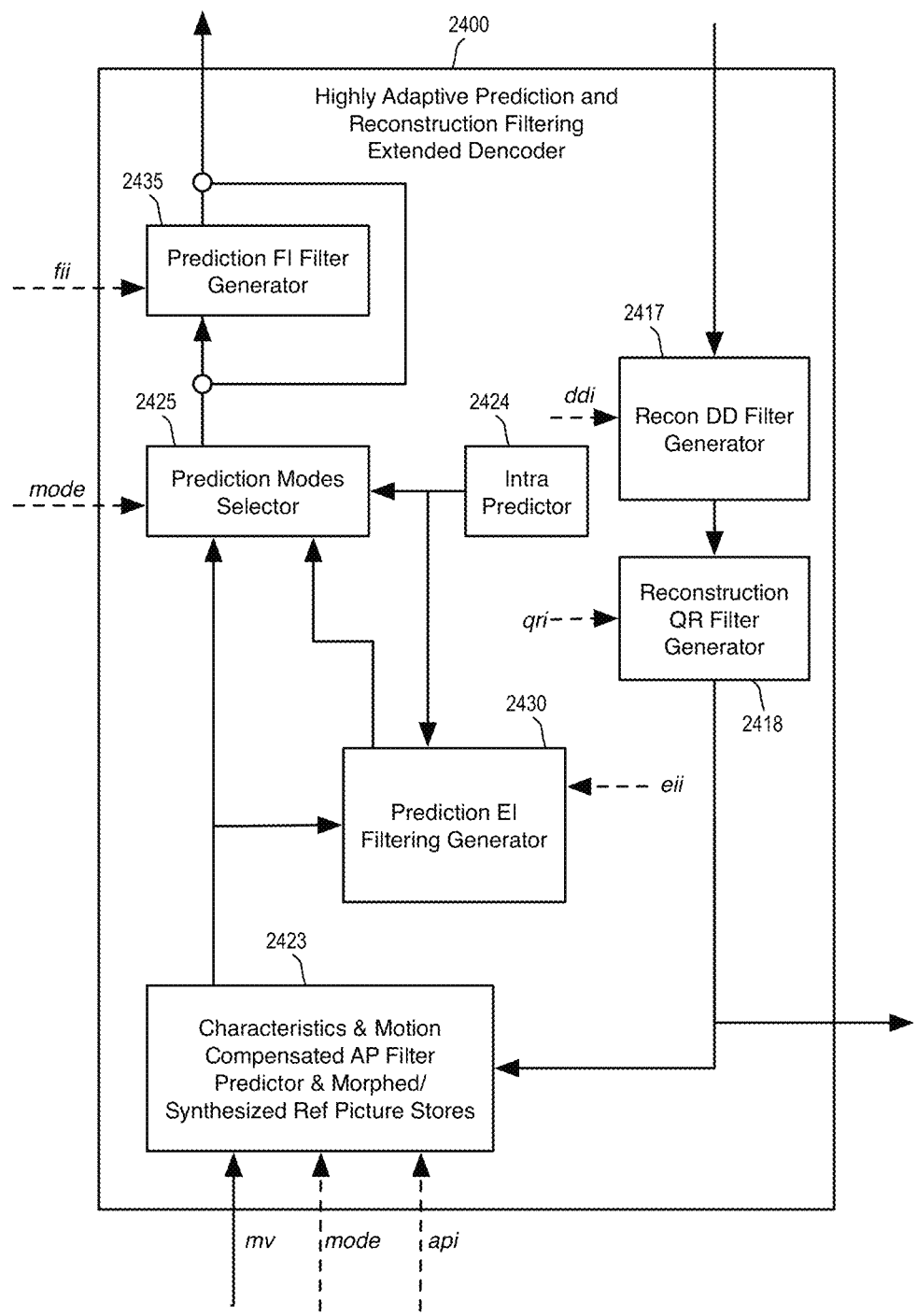
FIG. 24 is an illustrative diagram of an example decoder filter subsystem.

FIG. 24 is an illustrative diagram of an example decoder subsystem 2400, arranged in accordance with at least some implementations of the present disclosure. As shown, decoder subsystem 2400 may include reconstruction DD filter generator 2417, reconstruction QR filter generator 2418, characteristics & motion compensated AP filter predictor & morphed/synthesized ref picture stores 2423, intra predictor 2424, prediction modes selector 2425, prediction EI filtering generator 2430, and/or prediction FI filter generator 2435.

In the illustrated implementation, reconstruction DD filter generator 2417 may be capable of deblocking and de-dithering the reconstructed signal, guided by the ddi parameters that are decoded at the decoder from the bitstream.

In the illustrated implementation, reconstruction QR filter generator 2418 may be capable of performing QR filtering, guided by qri filtering parameters decoded from the bitstream.

In the illustrated implementation, characteristics & motion compensated AP filter predictor & morphed/synthesized ref picture stores 2423 may be capable of performing adaptive precision filtering, guided by api filtering parameters decoded from the bitstream.

In the illustrated implementation, intra predictor 2424 may be capable of performing intra prediction.

In the illustrated implementation, prediction modes selector 2425 may be capable of selecting between various motion prediction modes and intra prediction modes available on a block basis, and selecting prediction references.

In the illustrated implementation, prediction EI filtering generator 2430 may be capable of generating filtered prediction for selection by prediction modes analyzer & mode selector 2425 based on the prediction mode information sent in the bitstream by the encoder. Prediction efficiency analyzer & EI filtering generator 2430 may perform filtering which may be locally block adaptive and responsive to the mode information carried via the bitstream to the decoder.

In the illustrated implementation, prediction FI filter generator 2435 may be capable of performing fusion improvement filtering by receiving output from prediction modes selector 2425 and, under guidance from the fii information, performing actual filtering.

Figure 25:
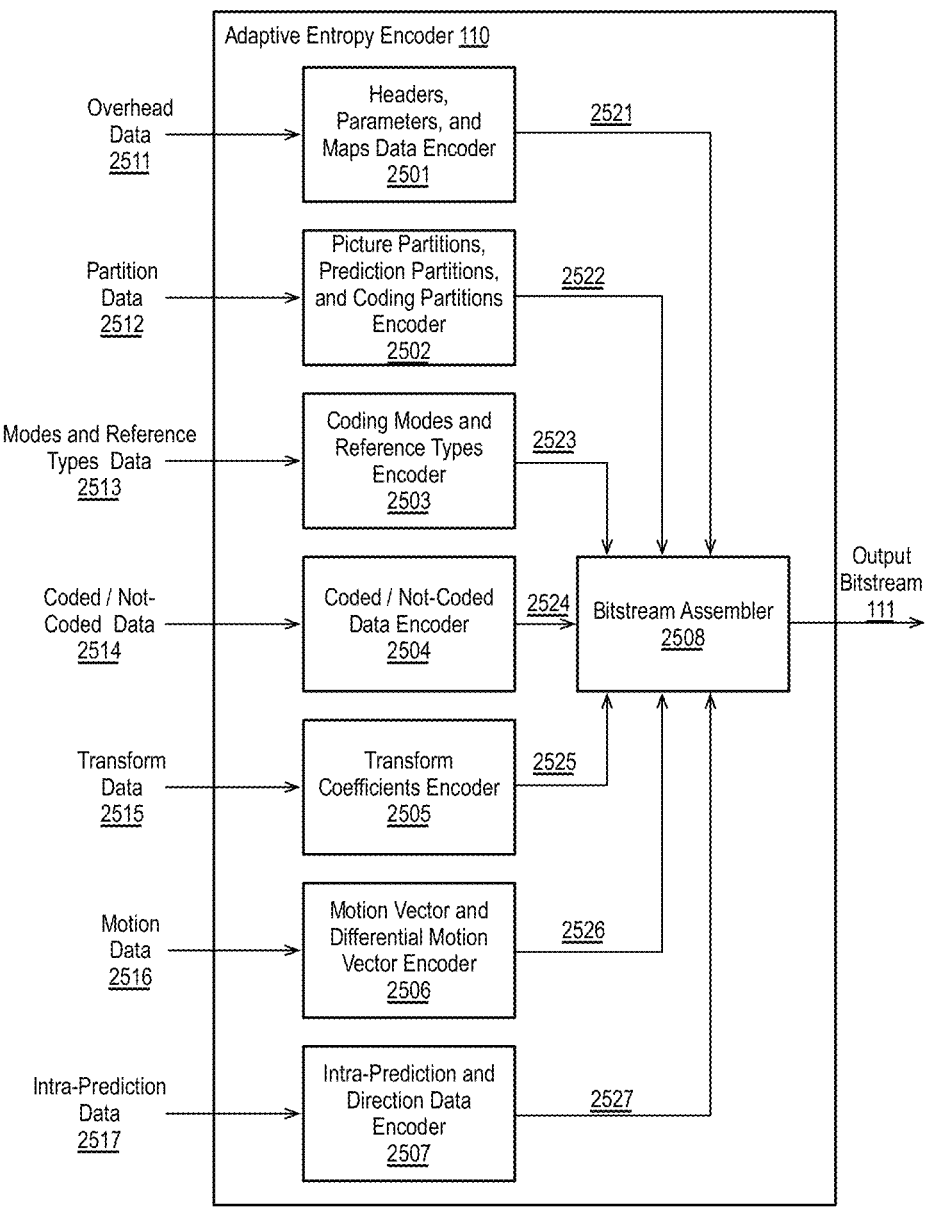
FIG. 25 is an illustrative diagram of an example entropy encoder module.

FIG. 25 is an illustrative diagram of an example entropy encoder module 110, arranged in accordance with at least some implementations of the present disclosure. As shown, entropy encoder module 110 may include headers, parameters and maps data encoder module 2501, picture partitions, prediction partitions, and coding partitions encoder module 2502, coding modes and reference types encoder module 2503, coded/not-coded data encoder module 2504, transform coefficients encoder module 2505, motion vector and differential motion vector encoder module 2506, intra-prediction and direction data encoder module 2507, and/or bitstream assembler module 2508. In the discussion herein, each of modules 2501 through 2507 may be shortened to encoder module 2501, encoder module 2504, or the like for the sake of brevity.

As shown, encoder modules 2501 through 2507 may receive video data 2511 through 2517 (e.g., overhead data 2511, partitioning data 2512, modes and reference type data 2513, coded/not-coded data 2514, transform data 2515, motion data 2516, and/or intra prediction data 2517), respectively, via adaptive entropy encoder 110. In some examples, received video data 2511 through 2517 may be received from various modules of encoder 100 as discussed herein. As shown, encoder modules 2501 through 2507 may compress the received video data 2511 through 2517 to generated compressed video data 2521 through 2527. Compressed video data 2521 through 2527 may be provided to bitstream assembler 2508, which may assemble compressed video data 2521 through 2527 to generate output bitstream 111.

In some examples, encoder modules 2501 through 2507 may each include one or more specialized component(s) for efficiently encoding the type of data associated with received video data 2511 through 2517. In some examples, one or more of encoder modules 2501 through 2507 may preprocess the received video data 2511 through 2517 and/or select an entropy coding technique based on a parameter, parameters, or characteristics of the received video data 2511 through 2517 or other system information.

For example, encoder module 2501 may receive video data 2511, which may include header data (e.g., sequence and/or picture level bitstream headers), morphing parameters, synthesizing parameters, or global maps data (e.g., quantizer maps of pictures indicating quantizers to be used on a partition basis). In some examples, encoder module 2501 may implement an adaptive symbol-run variable length coding technique, an adaptive proxy variable length coding technique, or a variable length coding table or tables compression of video data 2511. In some examples, encoder module 2511 may determine which technique provides the greatest compression efficiency (e.g., the fewest bits for compressed video data 2521) such that the parameter(s) associated with partitioning data 2511 may be the number of bits needed for each coding technique or the like. Encoder module 2511 may entropy encode partitioning data 2511 to generate compressed video data 2521, which may be transmitted to bitstream assembler 2508 as shown.

As discussed, in some examples, the parameter associated with the video data (e.g., any of video data 2511 through 2517) may be a fewest number of attainable bits, most efficient encoding technique, or the like. In other examples, the parameter associated with the video data may be a predefined or predetermine parameter such that encoding technique is predetermined. In some examples, the parameter associated with the video data may be based on a characteristic of the video data such that the determined encoding technique may be adaptive to the received video data as is discussed further herein.

As shown, in some examples, encoder module 2502 may receive video data 2512, which may include picture slices or regions data, intra-prediction partition data, and/or inter-prediction partition and coding partition data. In some examples, encoder module 2502 may implement an adaptive symbol-run variable length coding technique or an adaptive proxy variable length coding technique for the compression of the intra-prediction partition data and/or inter-prediction partition data portions of video data 2512 based on a parameter associated with the intra-prediction partition data and/or inter-prediction partition data (e.g., a fewest number of attainable bits, most efficient encoding technique, a predetermined parameter, characteristics of video data 2512, or the like), and encoder module 2512 may implement adaptive codebook variable length coding for the slices or regions data portions of video data 2512 to generate compressed video data 2522, which may be transmitted to bitstream assembler 2508 as shown. In some examples, the intra-prediction partition data and/or inter-prediction partition data may include data indicating the partitioning of tiles into partitions, partitions into sub-partitions, or the like. In some examples, the partitions and/or sub-partitions may include prediction partitions and/or sub-partitions. In some examples, partitions and/or sub-partitions may include coding partitions and/or sub-partitions.

Further as shown, in some examples, encoder module 2503 may receive video data 2513, which may include modes (e.g., intra, split, skip, auto, inter, or multi) data and/or references data for each prediction partition. For example, the mode split information may indicate whether a partition is further divided or not. If a partition is further divided, the mode data may further include direction information indicating whether the split is a horizontal split (e.g., hor) or a vertical split (e.g., vert). In some examples, encoder module 2503 may implement an adaptive symbol-run variable length coding technique or an adaptive proxy variable length coding technique for separate coding of split/non-split partition information data, separate coding of split/non-split split information data, or prediction reference information data based on a parameter associated with the data (e.g., a fewest number of attainable bits, most efficient encoding technique, a predetermined parameter, characteristics of the pertinent portions of video data 2513, or the like), and encoder module 2503 may implement adaptive variable length coding for joint coding of modes and split information to generate compressed video data 2523, which may be transmitted to bitstream assembler 2508 as shown.

Further, in some examples, encoder module 2504 may receive video data 2514, which may include coded/not-coded data. For example, a partition (or sub-partition) may be coded if it has any nonzero transform coefficients and a partition (or sub-partition) may be not-coded if it has all zero transform coefficients. In some examples, coded/not-coded data may not be needed for partitions having an intra or skip mode. In some examples, coded/not-coded data may be needed for partitions having an auto, inter, or multi mode. In some examples, encoder module 2504 may implement an adaptive symbol-run variable length coding technique or an adaptive proxy variable length coding technique for coded/not-coded data based on a parameter associated with the coded/not-coded data (e.g., a fewest number of attainable bits, most efficient encoding technique, a predetermined parameter, characteristics of video data 2514, or the like) to generate compressed video data 2524, which may be transmitted to bitstream assembler 2508 as shown.

In some examples, encoder module 2505 may receive video data 2515, which may include transform coefficient data. For example, for blocks or partitions or sub-partitions that are coded (e.g., have one or more nonzero transform coefficients), transform coefficient data may be received for entropy encoding. Encoder module 2505 may implement adaptive vector variable length coding for blocks or partitions or sub-partitions having a block or partition or sub-partition size of 2 in one dimension (e.g., 2×K partitions or K×2 sized partitions). Further, encoder module 2505 may implement adaptive 1-dimensional variable length coding for blocks or partitions or sub-partitions of size 4×4 and adaptive 2-dimensional variable length coding for all other block or partition or sub-partition sizes (e.g., 4×8, 8×4, 8×8, 16×16, 32×32, 64×64, and so on). The generated compressed video data 2525 may be transmitted to bitstream assembler 2508 as shown.

For example, the transform coefficient data may result from a forward transform of rectangular (or square or the like) partitions of pixel data or rectangular (or square or the like) of pixel difference values implemented via adaptive transform module 108 followed by a quantization of the resulting coefficients via adaptive quantize module 109. In some examples, the transform coefficient data may be scanned to convert it to a 1-dimensional frequency ordered partition via encoder module 2505. Such conversion may be highly adaptive any partition size (e.g., 24 or more or 32 or more partition sizes), different data types (e.g., discrete cosine transform coefficients or hybrid parametric Haar transform coefficients or the like of either intra or inter partitions), and/or different quantizer set characteristics (e.g., various combinations of quantizer parameters and/or matrices). Further, a block or partition or sub-partition may belong to different picture types: I-picture (e.g., intra compensation only), P-picture (e.g., predictive) or F-picture (e.g., functional) and/or may represent different types of signal or data (e.g., luma or chroma or the like), which may be quantized with different quantizer setting.

Further, in some examples, encoder module 2506 may receive video data 2516, which may include motion vector data. Motion vector prediction may be performed based on video data 2516 to generate one or more predicted motion vectors. A predicted motion vector may be differenced with an original motion data of video data 2516 to generate a difference motion vector. In some examples, encoder module 2516 may implement an adaptive classified variable length coding for the difference motion vector(s) to generate compressed video data 2526, which may be transmitted to bitstream assembler 2508 as shown.

Further, in some examples, encoder module 2507 may receive video data 2517, which may include intra-prediction type or intra-prediction direction data. For example, as discussed, intra coding may use prediction, which may use neighboring past decoded partition(s) within the same frame to generate spatial prediction. In such examples, there may be predictors for indicating a past decoded partition or partitions. For example, the predictors may include dc, slope, directional, BTPC, feature matching, or the like. Further, in some examples, the directional predictor may be adaptive for different partition sizes. For example, specifying a directional predictor may include providing an technique for determining angular prediction pixel partition(s)

for coding using causal neighboring decoded partitions and/or specifying a technique for entropy coding spatial prediction directions. In some examples, such techniques may be performed via encoder module 2507. In some examples, encoder module 2507 may implement an adaptive variable length coding technique or an arithmetic coding technique for intra-prediction type or intra-prediction direction data based on a parameter associated with the intra-prediction type or intra-prediction direction data (e.g., a fewest number of attainable bits, most efficient encoding technique, a predetermined parameter, characteristics of video data 2517, or the like) to generate compressed video data 2527, which may be transmitted to bitstream assembler 2508 as shown.

As shown in FIG. 25, adaptive entropy encoder 110 may include bitstream assembler 2508. In some examples, some or all of encoder modules 2501 through 2507 may provide entropy coded compressed video data 2521 through 2527 at different instances in time. Further, in some examples, one or some of compressed video data 2521 through 2527 may be picture based, region or slice based, tile based, prediction partition based, coding partition based, or any combination thereof. In some examples, bitstream assembler may multiplex (the potentially different) compressed video data 2521 through 2527 to create a valid bitstream such as, for example, output bitstream 111. For example, the valid bitstream may be a valid next generation video (NGV) coded bitstream, which may following a NGV bitstream syntax specification. In some examples, output bitstream 111 may be a video only bitstream. In some examples, output bitstream 111 may be multiplexed (e.g., Transport or a Media File Format) with uncoded or coded audio to create a multiplexed audio-visual stream. In any event, the bitstream may be used local decode, storage, or transmission to a decoder as discussed herein.

Figure 26:
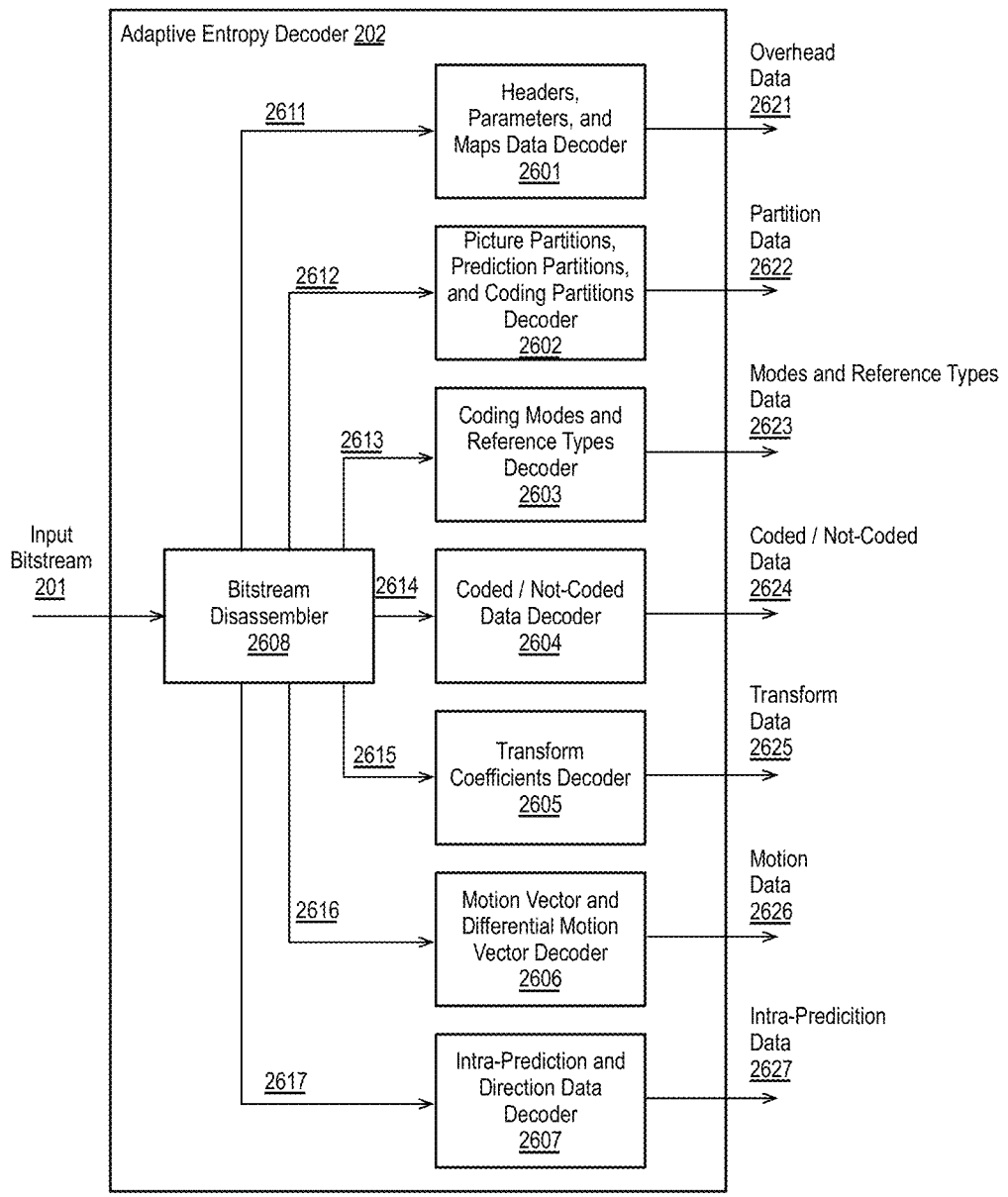
FIG. 26 is an illustrative diagram of an example entropy decoder module.

FIG. 26 is an illustrative diagram of an example entropy decoder module 202, arranged in accordance with at least some implementations of the present disclosure. As shown, entropy decoder module 202 may include headers, parameters and maps data decoder module 2601, picture partitions, prediction partitions, and coding partitions decoder module 2602, coding modes and reference types decoder module 2603, coded/not-coded data decoder module 2604, transform coefficients decoder module 2605, motion vector and differential motion vector decoder module 2606, intra-prediction and direction data decoder module 2607, and/or bitstream disassembler module 2608. In the discussion herein, each of modules 2601 through 2607 may be shortened to decoder module 2601, decoder module 2605, or the like for the sake of brevity.

As shown, bitstream disassembler module 2608 may receive input bitstream 201. In some examples, input bitstream 201 may be a valid bitstream such as, for example, a valid next generation video (NGV) coded bitstream, which may follow a NGV bitstream syntax specification. In some examples, input bitstream 201 may be a video only bitstream. In some examples, input bitstream 201 may be a multiplexed audio-visual stream as discussed herein. Bitstream disassembler module 2608 may disassemble input bitstream 201 to determine compressed video data 2611 through 2617 as shown. For example, bitstream disassembler module 2608 may use a predefined syntax or specification to divide input bitstream 201 into component compressed video data 2611 through 2617 by data type for decompression via decoder modules 2601 through 2607. In some examples, bitstream disassembler module 2608 may perform an inverse operation with respect to bitstream assembler module 2508.

As shown in FIG. 26, decoder modules 2601 through 2607 may receive compressed video data 2611 through 2617, respectively, and generate video data 2621 through 2627. Video data 2621 through 2627 may be transmitted to various components of decoder 200 for further decoding as discussed herein. Decoder 200 may thereby generate video frame(s) for presentment to a user via a display device (not shown). In some examples, decoder modules 2601 through 2607 may each perform an inverse operation with respect to encoder modules 2501 through 2507. In some examples, decoder modules 2601 through 2607 may each include one or more specialized component(s) for efficiently entropy decoding the type of data associated with compressed video data 2611 through 2617.

For example, decoder module 2601 may receive compressed video data 2611, which may include compressed header data (e.g., sequence and/or picture level bitstream headers), morphing parameters, synthesizing parameters, or global maps data (e.g., quantizer maps of pictures indicating quantizers to be used on a partition basis). In some examples, decoder module 2611 may implement an adaptive symbol-run variable length coding technique, an adaptive proxy variable length coding technique, or a variable length coding table or tables for decompression of compressed video data 2611 to generate video data 2621. In some examples, decoder module 2601 may determine which coding technique to implement based on a parameter or indicator provided via bitstream 201.

As shown, in some examples, decoder module 2602 may receive compressed video data 2612, which may include compressed picture slices or regions data, intra-prediction partition data, and/or inter-prediction partition data. In some examples, decoder module 2602 may implement an adaptive symbol-run variable length coding technique or an adaptive proxy variable length coding technique for the decompression of the intra-prediction partition data and/or inter-prediction partition data portions of compressed video data 2612, and decoder module 2602 may implement an adaptive codebook variable length coding for the decompression of the slices or regions data portions of compressed video data 2612 to generate video data 2622. In some examples, the intra-prediction partition data and/or inter-prediction partition data may include data indicating the partitioning of tiles into partitions, partitions into sub-partitions, or the like. In some examples, the partitions and/or sub-partitions may include prediction partitions and/or sub-partitions. In some examples, partitions and/or sub-partitions may include coding partitions and/or sub-partitions. In some examples, decoder module 2602 may determine which coding technique to implement for the decompression of the intra-prediction partition data and/or inter-prediction partition data portions of compressed video data 2612 based on a parameter or indicator provided via bitstream 201.

Further, in some examples, decoder module 2603 may receive compressed video data 2613, which may include compressed modes (e.g., intra, split, skip, auto, inter, or multi) data and/or references data for each prediction partition. For example, the mode split information may indicate whether a partition is further divided or not. If a partition is further divided, the mode data may further include direction information indicating whether the split is a horizontal split (e.g., hor) or a vertical split (e.g., vert). In some examples, decoder module 2603 may implement an adaptive symbol-run variable length coding technique or an adaptive proxy variable length coding technique for decompression of separate coding of split/non-split partition information data, separate coding of split/non-split split information data, or prediction reference information data, and decoder module 2603 may implement an adaptive variable length coding for decompression of joint coding of modes and split information to generate video data 2623. In some examples, decoder module 2603 may determine which coding technique to implement for decompression of separate coding of split/non-split partition information data, separate coding of split/non-split split information data, or prediction reference information data based on a parameter or indicator provided via bitstream 201.

Further, in some examples, decoder module 2604 may receive compressed video data 2614, which may include coded/not-coded data. For example, a partition (or sub-partition) may be coded if it has any nonzero transform coefficients and a partition (or sub-partition) may be not-coded if it has all zero transform coefficients. In some examples, coded/not-coded data may not be needed for partitions having an intra or skip mode. In some examples, coded/not-coded data may be needed for partitions having an auto, inter, or multi mode. In some examples, decoder module 2604 may implement an adaptive symbol-run variable length coding technique or an adaptive proxy variable length coding technique for decompression of coded/not-coded data to generate video data 2624. In some examples, decoder module 2604 may determine which coding technique to implement for decompression based on a parameter or indicator provided via bitstream 201.

As shown, in some examples, decoder module 2605 may receive compressed video data 2615, which may include transform coefficient data. For example, for blocks or partitions or sub-partitions that are coded (e.g., have one or more nonzero transform coefficients) compressed video data 2615 may include transform coefficient data. In some examples, decoder module 2605 may implement an adaptive vector variable length coding for decompression of blocks or partitions or sub-partitions having a block or partition or sub-partition size of 2 in one dimension (e.g., 2×K partitions or K×2 sized partitions. Further, decoder module 2605 may implement an adaptive 1-dimensional variable length coding for decompression of blocks or partitions or sub-partitions of size 4×4 and adaptive 2-dimensional variable length coding for decompression of all other block or partition or sub-partition sizes (e.g., 4×8, 8×4, 8×8, 16×16, 32×32, 64×64, and so on). The generated video data 2625 may be transmitted to other module(s) of decoder 200 as shown.

Further, in some examples, decoder module 2606 may receive compressed video data 2616, which may include motion vector data. In some examples, compressed video data 2616 may be decompressed using an adaptive classified variable length coding technique to generate predicted difference motion vectors. The predicted difference motion vectors may be added to motion vector prediction to generate reconstructed motion vectors. The motion vector prediction may be generated based on previously decoded motion vectors of neighboring blocks or partitions using the inverse of the technique implemented via encoder module 2506, for example, and/or motion vectors. The reconstructed motion vectors may be transmitted to other module(s) of decoder 200 via video data 2626 as shown.

Further, in some examples, decoder module 2607 may receive compressed video data 2617, which may include intra-prediction type or intra-prediction direction data. For example, as discussed, intra coding may use prediction, which may use neighboring past decoded partition(s) within the same frame to generate spatial prediction. In such examples, there may be predictors for indicating a past decoded partition or partitions. For example, the predictors may include dc, slope, directional, BTPC, feature matching, or the like. Further, in some examples, the directional predictor may be adaptive for different partition sizes. For example, specifying a directional predictor may include providing an technique for determining angular prediction pixel partition(s) for coding using causal neighboring decoded partitions and/or specifying a technique for entropy coding spatial prediction directions. In some examples, decoder module 2617 may implement an adaptive variable length coding technique or an arithmetic coding technique for decompression of intra-prediction type or intra-prediction direction data to generate video data 2627. In some examples, decoder module 2607 may determine which coding technique to implement for decompression based on a parameter or indicator provided via bitstream 201.

As discussed above, a variety of entropy coding techniques may be implemented on various data types for lossless compression of video data to generate compressed video data at an entropy encoder and for decompression of the compressed video data to generate duplicate video data at an entropy decoder.

In some examples, an adaptive symbol-run variable length coding technique may be implemented. For example, encoder and decoder modules 2501, 2601, 2502, 2602, 2503, 2603, and/or 2504, 2604 may implement an adaptive symbol-run variable length coding technique on some or all of the video data or compressed video data received.

In some examples, an adaptive symbol-run variable length coding technique may include coding of relative difference in addresses between non-skipped blocks within a frame in video coding that allows one to determine the number of consecutive skipped blocks. For example, in the context of coded/not-coded data as encoded and decoded via encoder and decoder modules 2504, 404, instead of sending one bit (e.g., bit-map) for each block to signal coded/not-coded (e.g., skipped) blocks, encoder module 2504, for example, may encode a run of skipped blocks. In such implementations, the longer the run of skipped blocks, the more efficiently the data may be compressed.

Further, several types of adaptivity may be added to adaptive symbol-run variable length coding technique as described herein: adaptivity that may allow for use of multiple tables, adaptivity that may allow for use of either performing this type of coding on original bit map data, inverted bitmap, differential bitmap, or gradient predictive bitmap, or the like. For example, adaptive symbol-run variable length coding technique may be used to entropy encode substantially any type of event (e.g., symbol/run combination). Further, symbol/run events may be used to code multi-level (e.g., 0, 1, 2, 3, etc.) or binary (e.g., 0,1) events. In examples where multi-level events are encoded, adaptive symbol-run variable length coding technique may be applied a number of consecutive times, breaking a multi-level map into a number of binary sub-maps, with each previous sub-map, excluded from next level's sub-map, or the like.

In some examples, an adaptive proxy variable length coding technique may be implemented. For example, encoder and decoder modules 2501, 401, 2502, 402, 2503, 403, and/or 2504, 404 may implement an adaptive proxy variable length coding technique on some or all of the video data or compressed video data received.

In some examples, an adaptive proxy variable length coding technique may include substitution of original fixed length 1D blocks (e.g., groups) of bits with variable length codes (e.g., patterns of sequence of bits) such that after the replacement the resulting bitstream may be smaller in size. In some examples, at the decoder, the process may be repeated (or inversed) resulting in original intended bitstream. In some examples, the original blocks of bits replaced may be of fixed small sizes (e.g., groups of 2 bits, groups of 3 bits, or groups of 4 bits, or the like). In some examples, the replacement codes may be of small size and variable length in nature. In some examples, the adaptive proxy variable length coding discussed herein may be characterized as Short VLCs (e.g., variable length codes). Further, the adaptive proxy variable length coding technique described herein may be adaptive to content by providing multiple replacement options. In some examples, 1-dimensional blocks/groups of 2 bits may be replaced with 1-3 bit long codes. In some examples, 1-dimensional blocks/groups (or collections of blocks/groups) of 3 bits with codes may be replaced with 1-5 bit long codes. In some examples, the adaptive proxy variable length coding technique may exploit statistical redundancy within a bitstream. In some examples, the adaptive proxy variable length coding technique may provide a compression gain of about 1-1.3. In some examples, adaptive proxy variable length coding technique may offer the advantage of being amenable to application to short sequence of bits.

In some examples, an adaptive block-of-symbols variable length coding technique may be implemented. For example, encoder and decoder modules 305, 405 may implement an adaptive block-of-symbols variable length coding technique on some or all of the video data or compressed video data received.

In some examples, an adaptive block-of-symbols variable length coding technique may include two sub-coding techniques. For example, the adaptive block-of-symbols variable length coding technique may include an adaptive vector variable length coding technique and an adaptive 1D/2D (1-dimensional/2-dimensional) variable length coding technique. In some examples, the adaptive block-of-symbols variable length coding technique may be used to encode blocks of closely related symbols such as blocks of transform coefficients as discussed herein.

In some examples, the adaptive vector variable length coding technique of the adaptive block-of-symbols variable length coding technique may encode relatively small 2D blocks or partitions of symbols by use of a joint single codeword such that coding a block of symbols may result in a VLC (variable length coding) codebook. In some examples, the larger the size of the block or partition, the larger the size of the codebook. In some examples, the adaptive vector variable length coding technique may be applied to block or partition sizes having a size 2 in one dimension (e.g., 2×K or K×2 blocks or partitions). By applying the adaptive vector variable length coding technique to blocks or partitions of such sizes, the size of the VLC codebook may be advantageously limited.

In some examples, the adaptive 1D variable length coding technique of the adaptive block-of-symbols variable length coding technique may be used for coding 4×4 transform coefficient block or partition sizes. is essentially same as the CAVLC coder. This coder is primarily used for coding 4×4. In some examples, the adaptive 1D variable length coding technique may be implemented via a content adaptive variable length coding technique with a number of different VLC Tables used based on the context of the coefficient(s) being coded. For example, based on the context of the coefficient(s) being coded encoder and/or decoder modules 305, 405 may switch VLC Tables.

In some examples, the adaptive 2D variable length coding technique of the adaptive block-of-symbols variable length coding technique may utilize two dimensional properties of a block of symbols to switch based on context between a number of different VCL Tables. In some examples, the adaptive 2D variable length coding technique may be characterized as a CA2DVLC (Content Adaptive 2D Variable Length) coder. In some examples, In some examples, the adaptive 2D variable length coding technique may be used to encode all remaining transform coefficient block or petition sizes besides 2×K, K×2 blocks and 4×4 blocks (e.g., 4×8, 8×4, 8×8, 16×16, 32×32, 64×64, and so on).

Figure 27:
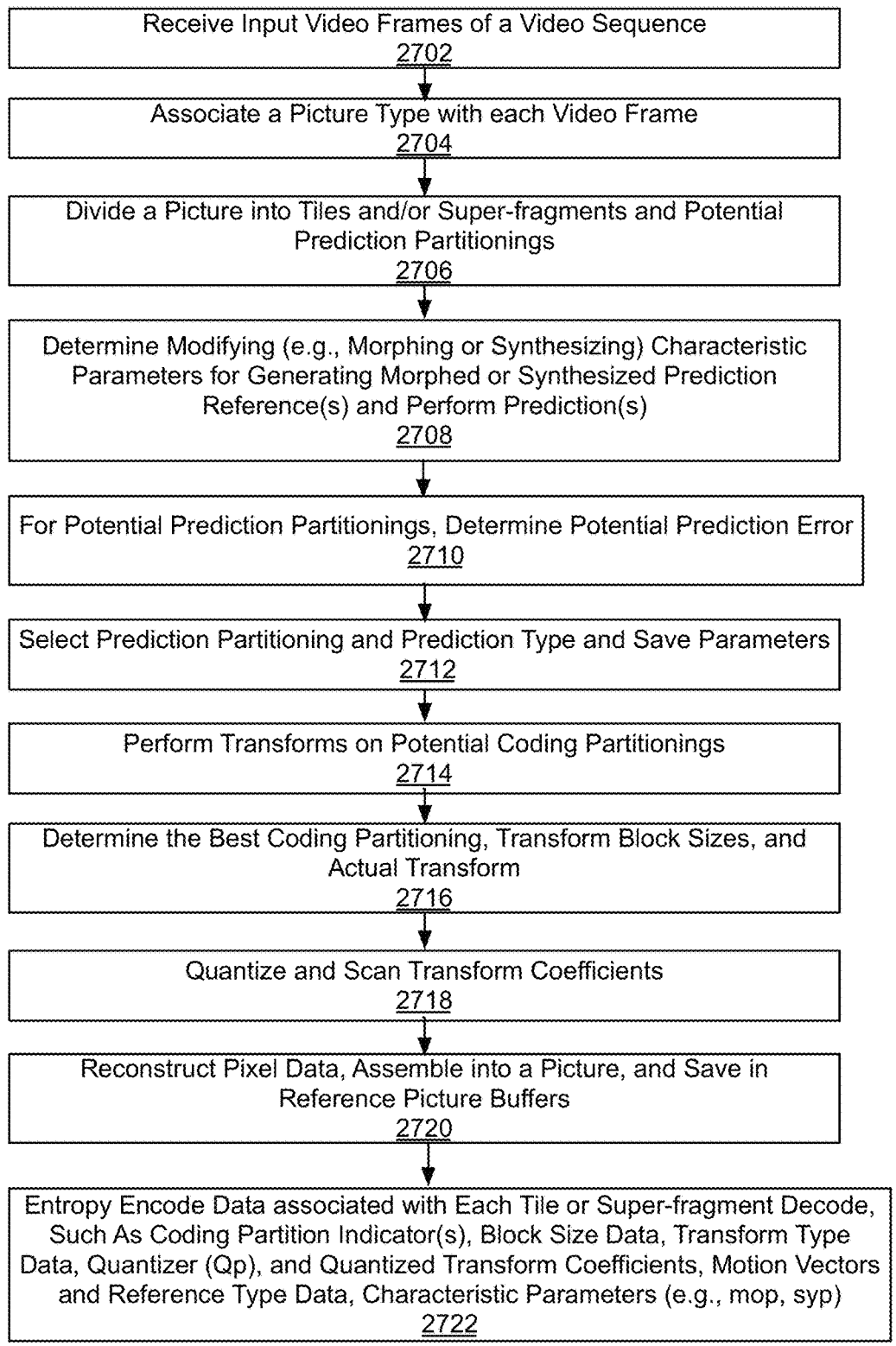
FIG. 27 is a flow diagram illustrating an example encoding process.

FIG. 27 is a flow diagram illustrating an example process 2700, arranged in accordance with at least some implementations of the present disclosure. Process 2700 may include one or more operations, functions or actions as illustrated by one or more of operations 2702, 2704, 2706, 2708, 2710, 2712, 2714, 2716, 2718, 2720, and/or 2722. Process 2700 may form at least part of a next generation video coding process. By way of non-limiting example, process 2700 may form at least part of a next generation video encoding process as undertaken by encoder system 100 of FIG. 1 and/or any other of encoder subsystems described herein.

Process 2700 may begin at operation 2702, "Receive Input Video Frames of a Video Sequence", where input video frames of a video sequence may be received via encoder 100 for example.

Process 2700 may continue at operation 2704, "Associate a Picture Type with each Video Frame", where a picture type may be associated with each video frame in a group of pictures via content pre-analyzer module 102 for example. For example, the picture type may be F/B-picture, P-picture, or I-picture, or the like. In some examples, a video sequence may include groups of pictures and the processing described herein (e.g., operations 2703 through 2711) may be performed on a frame or picture of a group of pictures and the processing may be repeated for all frames or pictures of a group and then repeated for all groups of pictures in a video sequence.

Process 2700 may continue at operation 2706, "Divide a Picture into Tiles and/or Super-fragments and Potential Prediction Partitionings", where a picture may be divided into tiles or super-fragments and potential prediction partitions via prediction partitions generator 105 for example.

Process 2700 may continue at operation 2708, "Determine Modifying (e.g., Morphing or Synthesizing) Characteristic Parameters for Generating Morphed or Synthesized Prediction Reference(s) and Perform Prediction(s)", where, modifying (e.g., morphing or synthesizing) characteristic parameters and prediction(s) may be performed. For example, modifying (e.g., morphing or synthesizing) characteristic parameters for generating morphed or synthesized prediction reference(s) may be generated and prediction(s) may be performed.

As discussed, in some examples, inter-prediction may be performed. In some examples, up to 4 decoded past and/or future pictures and several morphing/synthesis predictions may be used to generate a large number of reference types (e.g., reference pictures). For instance in 'inter' mode, up to nine reference types may be supported in P-pictures, and up to ten reference types may be supported for F/B-pictures. Further, 'multi' mode may provide a type of inter prediction mode in which instead of 1 reference picture, 2 reference pictures may be used and P- and F/B-pictures respectively may allow 3, and up to 8 reference types. For example, prediction may be based on a previously decoded frame generated using at least one of a morphing technique or a synthesizing technique. In such examples, and the bitstream (discussed below with respect to operation 2712) may include a frame reference, morphing parameters, or synthesizing parameters associated with the prediction partition.

Process 2700 may continue at operation 2710, "For Potential Prediction Partitioning, Determine Potential Prediction Error", where, for each potential prediction partitioning, a potential prediction error may be determined. For example, for each prediction partitioning (and associated prediction partitions, prediction(s), and prediction parameters), a prediction error may be determined. For example, determining the potential prediction error may include differencing original pixels (e.g., original pixel data of a prediction partition) with prediction pixels. In some examples, the associated prediction parameters may be stored. As discussed, in some examples, the prediction error data partition may include prediction error data generated based at least in part on a previously decoded frame generated using at least one of a morphing technique or a synthesizing technique.

Process 2700 may continue at operation 2712, "Select Prediction Partitioning and Prediction Type and Save Parameters", where a prediction partitioning and prediction type may be selected and the associated parameters may be saved. In some examples, the potential prediction partitioning with a minimum prediction error may be selected. In some examples, the potential prediction partitioning may be selected based on a rate distortion optimization (RDO).

Process 2700 may continue at operation 2714, "Perform Transforms on Potential Coding Partitionings", where fixed or content adaptive transforms with various block sizes may be performed on various potential coding partitionings of partition prediction error data. For example, partition prediction error data may be partitioned to generate a plurality of coding partitions. For example, the partition prediction error data may be partitioned by a bi-tree coding partitioner module or a k-d tree coding partitioner module of coding partitions generator module 107 as discussed herein. In some examples, partition prediction error data associated with an F/B- or P-picture may be partitioned by a bi-tree coding partitioner module. In some examples, video data associated with an I-picture (e.g., tiles or super-fragments in some examples) may be partitioned by a k-d tree coding partitioner module. In some examples, a coding partitioner module may be chosen or selected via a switch or switches. For example, the partitions may be generated by coding partitions generator module 107.

Process 2700 may continue at operation 2716, "Determine the Best Coding Partitioning, Transform Block Sizes, and Actual Transform", where the best coding partitioning, transform block sizes, and actual transforms may be determined. For example, various coding partitionings (e.g., having various coding partitions) may be evaluated based on RDO or another basis to determine a selected coding partitioning (which may also include further division of coding partitions into transform blocks when coding partitions to not match a transform block size as discussed). For example, the actual transform (or selected transform) may include any content adaptive transform or fixed transform performed on coding partition or block sizes as described herein.

Process 2700 may continue at operation 2718, "Quantize and Scan Transform Coefficients", where transform coefficients associated with coding partitions (and/or transform blocks) may be quantized and scanned in preparation for entropy coding.

Process 2700 may continue at operation 2720, "Reconstruct Pixel Data, Assemble into a Picture, and Save in Reference Picture Buffers", where pixel data may be reconstructed, assembled into a picture, and saved in reference picture buffers. For example, after a local decode loop (e.g., including inverse scan, inverse transform, and assembling coding partitions), prediction error data partitions may be generated. The prediction error data partitions may be added with a prediction partition to generate reconstructed prediction partitions, which may be assembled into tiles or super-fragments. The assembled tiles or super-fragments may be optionally processed via deblock filtering and/or quality restoration filtering and assembled to generate a picture. The picture may be saved in decoded picture buffer 119 as a reference picture for prediction of other (e.g., following) pictures.

Process 2700 may continue at operation 2722, "Decode the Entropy Encoded Bitstream to Determine Coding Partition Indicator(s), Block Size Data, Transform Type Data, Quantizer (Qp), Quantized Transform Coefficients, Motion Vectors and Reference Type Data, Characteristic Parameters (e.g., mop, syp)", where data may be entropy encoded. For example, the entropy encoded data may include the coding partition indicators, block size data, transform type data, quantizer (Qp), quantized transform coefficients, motion vectors and reference type data, characteristic parameters (e.g., mop, syp), the like, and/or combinations thereof. Additionally or alternatively, the entropy encoded data may include prediction partitioning, prediction parameters, the selected coding partitioning, the selected characteristics data, motion vector data, quantized transform coefficients, filter parameters, selection data (such as mode selection data), and indictors.

Operations 2702 through 2722 may provide for video encoding and bitstream transmission techniques, which may be employed by an encoder system as discussed herein.

Figures 28, 29:
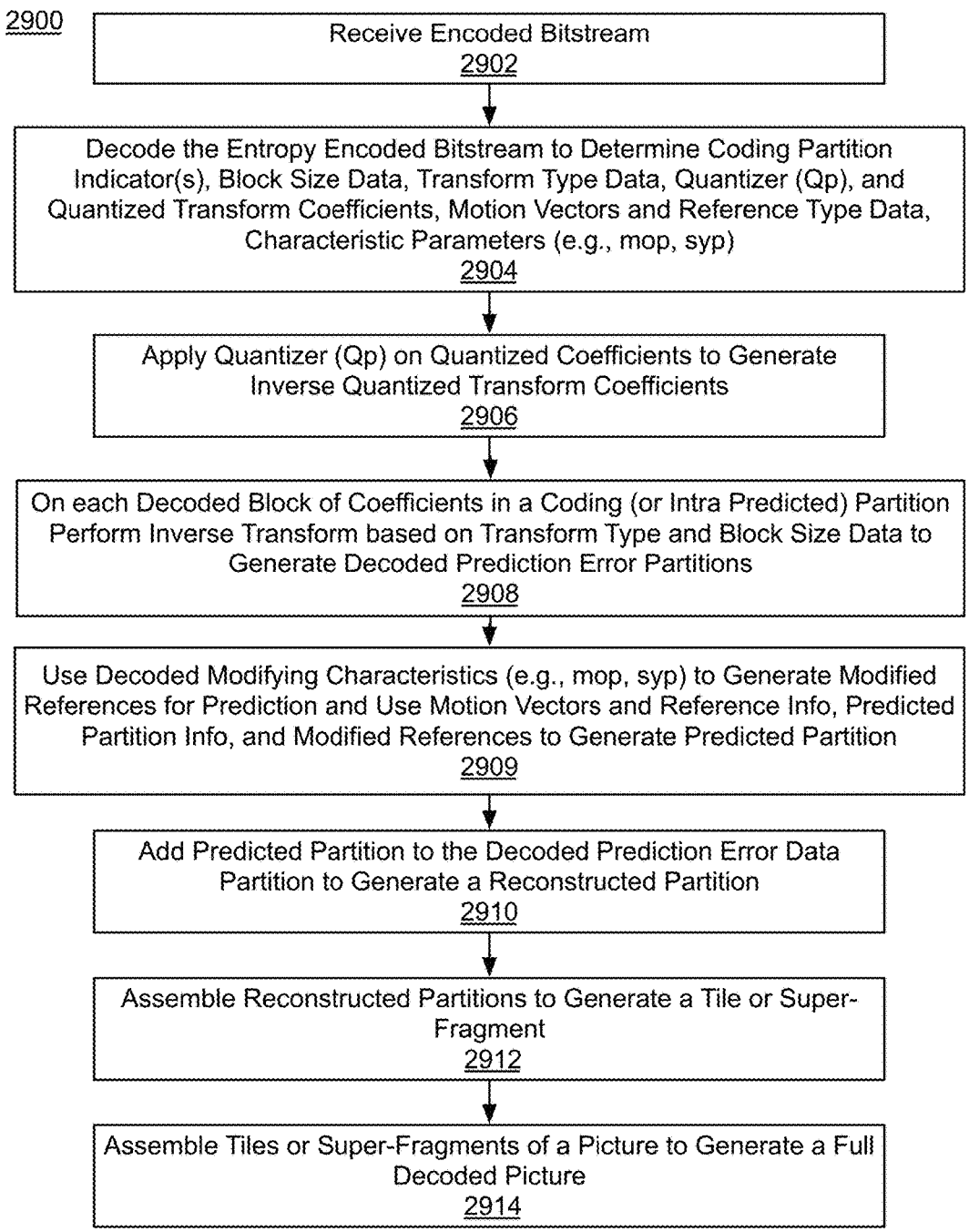
FIG. 28 illustrates an example bitstream.
FIG. 29 is a flow diagram illustrating an example decoding process.

FIG. 28 illustrates an example bitstream 2800, arranged in accordance with at least some implementations of the present disclosure. In some examples, bitstream 2800 may correspond to output bitstream 111 as shown in FIG. 1 and/or input bitstream 201 as shown in FIG. 2. Although not shown in FIG. 28 for the sake of clarity of presentation, in some examples bitstream 2800 may include a header portion and a data portion. In various examples, bitstream 2800 may include data, indicators, index values, mode selection data, or the like associated with encoding a video frame as discussed herein.

As discussed, bitstream 2800 may be generated by an encoder such as, for example, encoder 100 and/or received by a decoder 200 for decoding such that decoded video frames may be presented via a display device.

FIG. 29 is a flow diagram illustrating an example process 2900, arranged in accordance with at least some implementations of the present disclosure. Process 2900 may include one or more operations, functions or actions as illustrated by one or more of operations 2902, 2904, 2906, 2908, 2209, 2910, 2912, and/or 2914. Process 2900 may form at least part of a next generation video coding process. By way of non-limiting example, process 2900 may form at least part of a next generation video decoding process as undertaken by decoder system 200 of FIG. 2 and/or any other of encoder subsystems described herein.

Process 2900 may begin at operation 2902, "Receive Encoded Bitstream", where a bitstream may be received. For example, a bitstream encoded as discussed herein may be received at a video decoder. In some examples, bitstream 2800 may be received via decoder 200.

Process 2900 may continue at operation 2904, "Decode the Entropy Encoded Bitstream to Determine Coding Partition Indicator(s), Block Size Data, Transform Type Data, Quantizer (Qp), Quantized Transform Coefficients, Motion Vectors and Reference Type Data, Characteristic Parameters (e.g., mop, syp)", where the bitstream may be decoded to determine coding partition indicators, block size data, transform type data, quantizer (Qp), quantized transform coefficients, motion vectors and reference type data, characteristic parameters (e.g., mop, syp), the like, and/or combinations thereof. Additionally or alternatively, the entropy encoded data may include prediction partitioning, prediction parameters, the selected coding partitioning, the selected characteristics data, motion vector data, quantized transform coefficients, filter parameters, selection data (such as mode selection data), and indictors.

Process 2900 may continue at operation 2906, "Apply Quantizer (Qp) on Quantized Coefficients to Generate Inverse Quantized Transform Coefficients", where quantizer (Qp) may be applied to quantized transform coefficients to generate inverse quantized transform coefficients. For example, operation 2906 may be applied via adaptive inverse quantize module 203.

Process 2900 may continue at operation 2908, "On each Decoded Block of Coefficients in a Coding (or Intra Predicted) Partition Perform Inverse Transform based on Transform Type and Block Size Data to Generate Decoded Prediction Error Partitions", where, on each decode block of transform coefficients in a coding (or intra predicted) partition, an inverse transform based on the transform type and block size data may be performed to generate decoded prediction error partitions. In some examples, the inverse transform may include an inverse fixed transform. In some examples, the inverse transform may include an inverse content adaptive transform. In such examples, performing the inverse content adaptive transform may include determining basis functions associated with the inverse content adaptive transform based on a neighboring block of decoded video data, as discussed herein. Any forward transform used for encoding as discussed herein may be used for decoding using an associated inverse transform. In some examples, the inverse transform may be performed by adaptive inverse transform module 204. In some examples, generating the decoded prediction error partitions may also include assembling coding partitions via coding partitions assembler 205.

Process 2900 may continue at operation 2909, "Use Decoded Modifying Characteristics (e.g., mop, syp) to Generate Modified References for Prediction and Use Motion Vectors and Reference Info, Predicted Partition Info, and Modified References to Generate Predicted Partition", where modified references for prediction may be generated and predicted partitions may be generated as well. For example, where modified references for prediction may be generated based at least in part on decoded modifying characteristics (e.g., mop, syp) and predicted partitions may be generated based at least in part on motion vectors and reference information, predicted partition information, and modified references.

Process 2900 may continue at operation 2910, "Add Prediction Partition to the Decoded Prediction Error Data Partition to Generate a Reconstructed Partition", where a prediction partition my be added to the decoded prediction error data partition to generate a reconstructed prediction partition. For example, the decoded prediction error data partition may be added to the associated prediction partition via adder 206.

Process 2900 may continue at operation 2912, "Assemble Reconstructed Partitions to Generate a Tile or Super-Fragment", where the reconstructed prediction partitions may be assembled to generate tiles or super-fragments. For example, the reconstructed prediction partitions may be assembled to generate tiles or super-fragments via prediction partitions assembler module 207.

Process 2900 may continue at operation 2914, "Assemble Tiles or Super-Fragments of a Picture to Generate a Full Decoded Picture", where the tiles or super-fragments of a picture may be assembled to generate a full decoded picture. For example, after optional deblock filtering and/or quality restoration filtering, tiles or super-fragments may be assembled to generate a full decoded picture, which may be stored via decoded picture buffer 210 and/or transmitted for presentment via a display device after processing via adaptive picture re-organizer module 217 and content post-restorer module 218.

Various components of the systems described herein may be implemented in software, firmware, and/or hardware and/or any combination thereof. For example, various components may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes herein may include the undertaking of all operations shown in the order illustrated, the present disclosure is not limited in this regard and, in various examples, implementation of the example processes herein may include the undertaking of only a subset of the operations shown and/or in a different order than illustrated.

Figure 23:
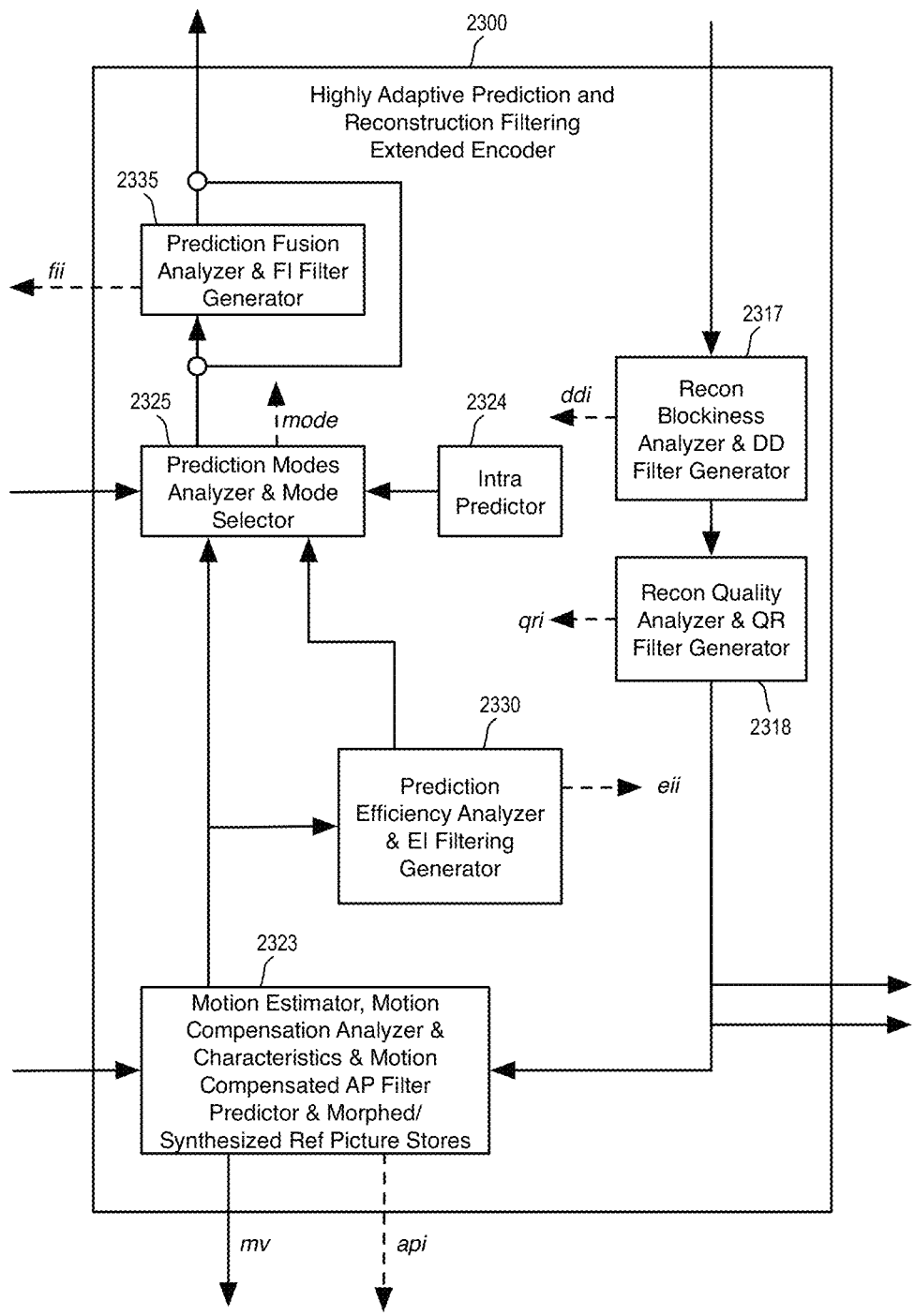
FIG. 23 is an illustrative diagram of an example encoder filter subsystem.

Some additional and/or alternative details related to process 2700, 2900 and other processes discussed herein may be illustrated in one or more examples of implementations discussed herein and, in particular, with respect to FIG. 23 below.

Figure 30A:
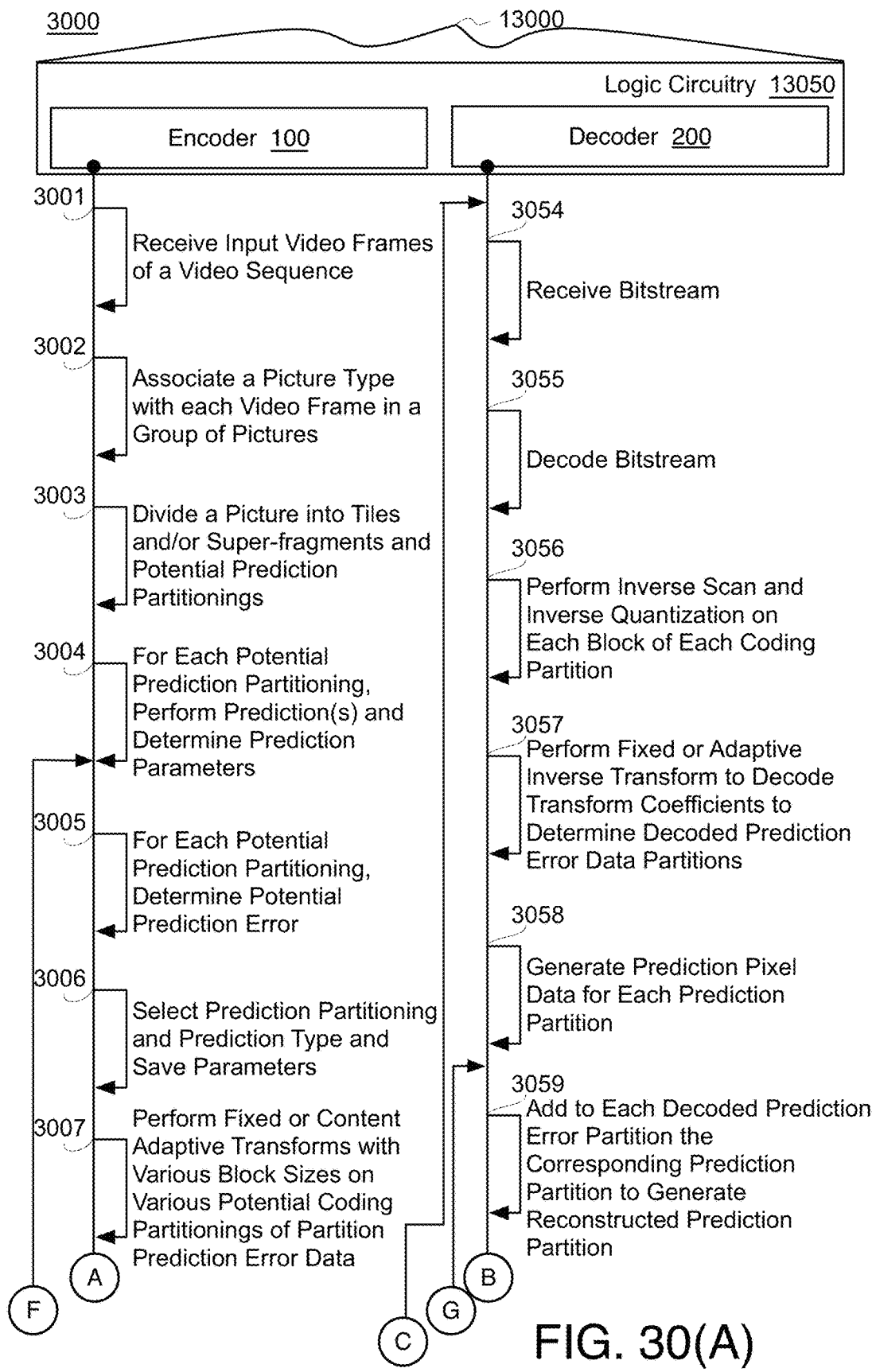
FIGS. 30(A), 30(B), and 30(C) is an illustrative diagram of an example video coding system and video coding process in operation.
Figure 30B:
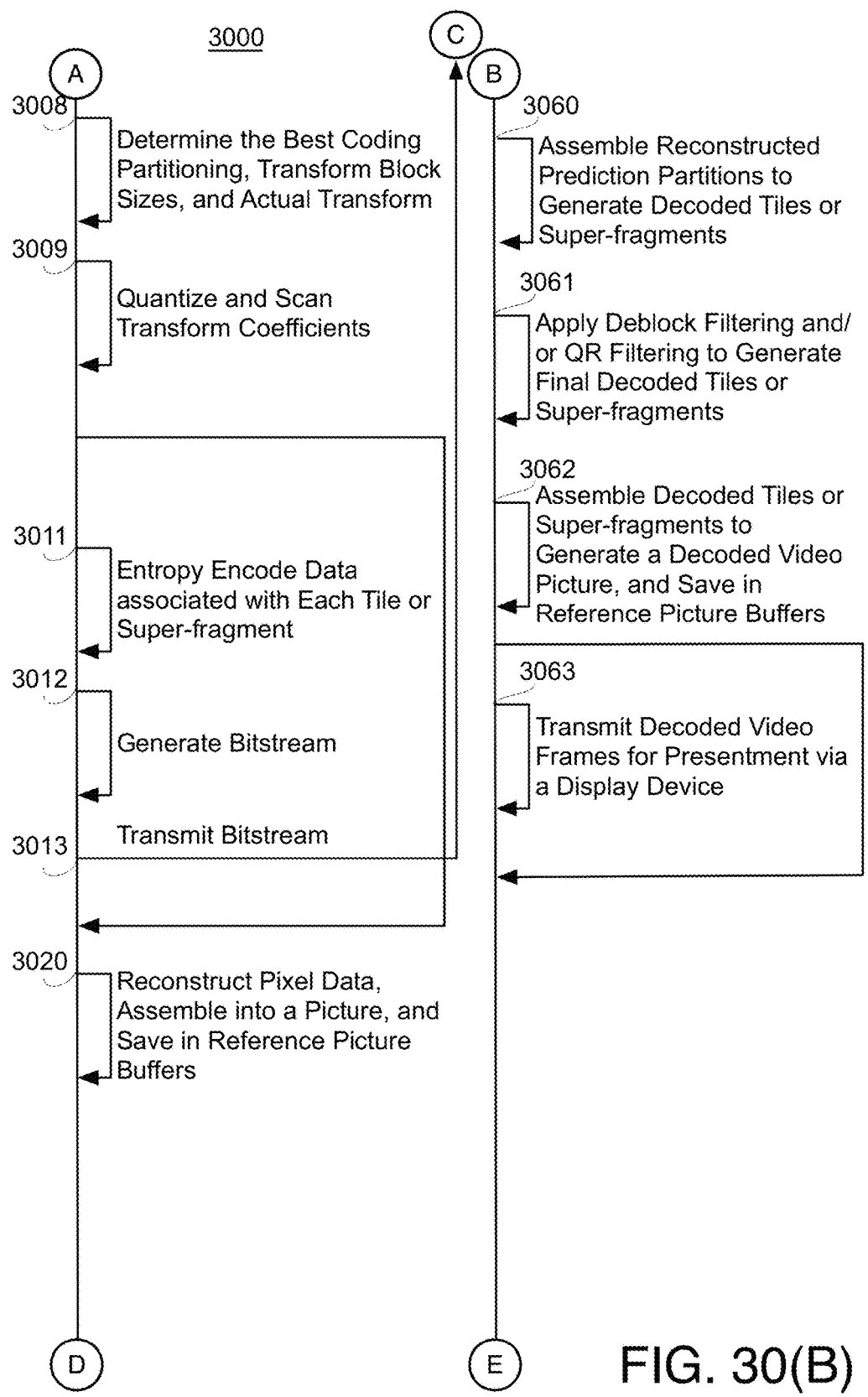
Figure 30C:
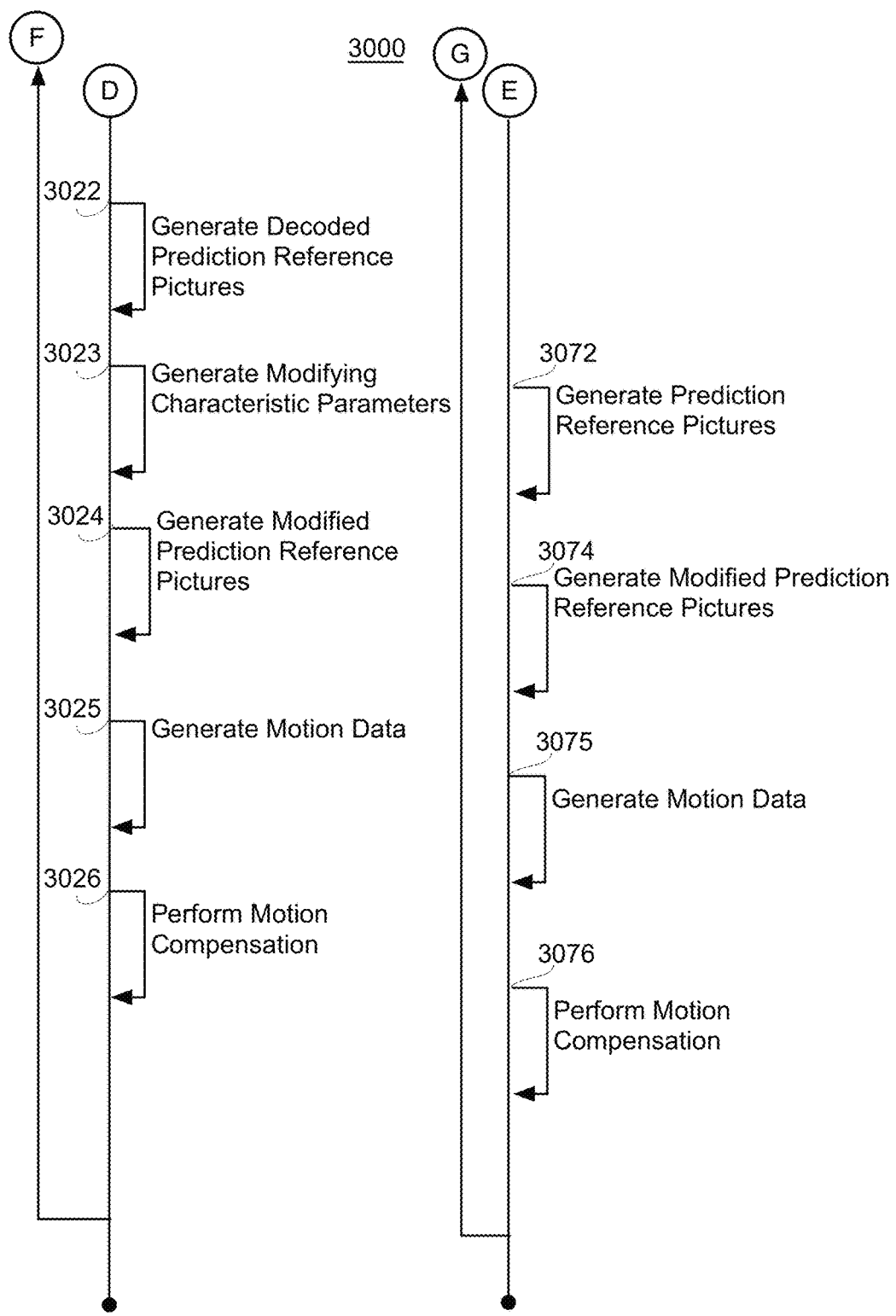

FIGS. 30(A), 30(B), and 30(C) provide an illustrative diagram of an example video coding system 13000 and video coding process 3000 in operation, arranged in accordance with at least some implementations of the present disclosure. In the illustrated implementation, process 3000 may include one or more operations, functions or actions as illustrated by one or more of actions 3001 through 3076. By way of non-limiting example, process 3000 will be described herein with reference to example video coding system 13000 including encoder 100 of FIG. 1 and decoder 200 of FIG. 2, and/or other encoder and decoder systems and subsystems described herein, as is discussed further herein below with respect to FIG. 31. In various examples, process 3000 may be undertaken by a system including both an encoder and decoder or by separate systems with one system employing an encoder (and optionally a decoder) and another system employing a decoder (and optionally an encoder). It is also noted, as discussed above, that an encoder may include a local decode loop employing a local decoder as a part of the encoder system.

In the illustrated implementation, video coding system 13000 may include logic circuitry 3050, the like, and/or combinations thereof. For example, logic circuitry 3050 may include encoder system 100 of FIG. 1 and/or decoder system 200 of FIG. 2 and may include any modules as discussed with respect to any of encoder systems and subsystems and/or decoder systems and subsystems described herein. Although video coding system 13000, as shown in FIGS. 30(A)-(C) may include one particular set of blocks or actions associated with particular modules, these blocks or actions may be associated with different modules than the particular modules illustrated here. Although process 3000, as illustrated, is directed to encoding and decoding, the concepts and/or operations described may be applied to encoding and/or decoding separately, and, more generally, to video coding.

Process 3000 may begin at operation 3001, "Receive Input Video Frames of a Video Sequence", where input video frames of a video sequence may be received via encoder 100 for example.

Process 3000 may continue at operation 3002, "Associate a Picture Type with each Video Frame in a Group of Pictures", where a picture type may be associated with each video frame in a group of pictures via content pre-analyzer module 102 for example. For example, the picture type may be F/B-picture, P-picture, or I-picture, or the like. In some examples, a video sequence may include groups of pictures and the processing described herein (e.g., operations 3003 through 3011) may be performed on a frame or picture of a group of pictures and the processing may be repeated for all frames or pictures of a group and then repeated for all groups of pictures in a video sequence.

Process 3000 may continue at operation 3003, "Divide a Picture into Tiles and/or Super-fragments and Potential Prediction Partitionings", where a picture may be divided into tiles or super-fragments and potential prediction partitions via prediction partitions generator 105 for example.

Process 3000 may continue at operation 3004, "For Each Potential Prediction Partitioning, Perform Prediction(s) and Determine Prediction Parameters", where, for each potential prediction partitionings, prediction(s) may be performed and prediction parameters may be determined. For example, a range of potential prediction partitionings (each having various prediction partitions) may be generated and the associated prediction(s) and prediction parameters may be determined. For example, the prediction(s) may include prediction(s) using characteristics and motion based multi-reference predictions or intra-predictions.

As discussed, in some examples, inter-prediction may be performed. In some examples, up to 4 decoded past and/or future pictures and several morphing/synthesis predictions may be used to generate a large number of reference types (e.g., reference pictures). For instance in 'inter' mode, up to 9 reference types may be supported in P-pictures, and up to 10 reference types may be supported for F/B-pictures. Further, 'multi' mode may provide a type of inter prediction mode in which instead of 1 reference picture, 2 reference pictures may be used and P- and F/B-pictures respectively may allow 3, and up to 8 reference types. For example, prediction may be based on a previously decoded frame generated using at least one of a morphing technique or a synthesizing technique. In such examples, and the bitstream (discussed below with respect to operation 3012) may include a frame reference, morphing parameters, or synthesizing parameters associated with the prediction partition.

Process 3000 may continue at operation 3005, "For Each Potential Prediction Partitioning, Determine Potential Prediction Error", where, for each potential prediction partitioning, a potential prediction error may be determined. For example, for each prediction partitioning (and associated prediction partitions, prediction(s), and prediction param- eters), a prediction error may be determined. For example, determining the potential prediction error may include differencing original pixels (e.g., original pixel data of a prediction partition) with prediction pixels. In some examples, the associated prediction parameters may be stored. As discussed, in some examples, the prediction error data partition may include prediction error data generated based at least in part on a previously decoded frame generated using at least one of a morphing technique or a synthesizing technique.

Process 3000 may continue at operation 3006, "Select Prediction Partitioning and Prediction Type and Save Parameters", where a prediction partitioning and prediction type may be selected and the associated parameters may be saved. In some examples, the potential prediction partitioning with a minimum prediction error may be selected. In some examples, the potential prediction partitioning may be selected based on a rate distortion optimization (RDO).

Process 3000 may continue at operation 3007, "Perform Fixed or Content Adaptive Transforms with Various Block Sizes on Various Potential Coding Partitionings of Partition Prediction Error Data", where fixed or content adaptive transforms with various block sizes may be performed on various potential coding partitionings of partition prediction error data. For example, partition prediction error data may be partitioned to generate a plurality of coding partitions. For example, the partition prediction error data may be partitioned by a bi-tree coding partitioner module or a k-d tree coding partitioner module of coding partitions generator module 107 as discussed herein. In some examples, partition prediction error data associated with an F/B- or P-picture may be partitioned by a bi-tree coding partitioner module. In some examples, video data associated with an I-picture (e.g., tiles or super-fragments in some examples) may be partitioned by a k-d tree coding partitioner module. In some examples, a coding partitioner module may be chosen or selected via a switch or switches. For example, the partitions may be generated by coding partitions generator module 107.

Process 3000 may continue at operation 3008, "Determine the Best Coding Partitioning, Transform Block Sizes, and Actual Transform", where the best coding partitioning, transform block sizes, and actual transforms may be determined. For example, various coding partitionings (e.g., having various coding partitions) may be evaluated based on RDO or another basis to determine a selected coding partitioning (which may also include further division of coding partitions into transform blocks when coding partitions to not match a transform block size as discussed). For example, the actual transform (or selected transform) may include any content adaptive transform or fixed transform performed on coding partition or block sizes as described herein.

Process 3000 may continue at operation 3009, "Quantize and Scan Transform Coefficients", where transform coefficients associated with coding partitions (and/or transform blocks) may be quantized and scanned in preparation for entropy coding.

Process 3000 may continue at operation 3011, "Entropy Encode Data associated with Each Tile or Super-fragment", where data associated with each tile or super-fragment may be entropy encoded. For example, data associated with each tile or super-fragment of each picture of each group of pictures of each video sequence may be entropy encoded. The entropy encoded data may include the prediction partitioning, prediction parameters, the selected coding partitioning, the selected characteristics data, motion vector data, quantized transform coefficients, filter parameters, selection data (such as mode selection data), and indictors.

Process 3000 may continue at operation 3012, "Generate Bitstream" where a bitstream may be generated based on the entropy encoded data. As discussed, in some examples, the bitstream may include a frame or picture reference, morphing parameters, or synthesizing parameters associated with a prediction partition.

Process 3000 may continue at operation 3013, "Transmit Bitstream", where the bitstream may be transmitted. For example, video coding system 13000 may transmit output bitstream 111, bitstream 2100, or the like via an antenna 3102 (please refer to FIG. 31).

Process 3000 may continue at operation 3020, "Reconstruct Pixel Data, Assemble into a Picture, and Save in Reference Picture Buffers", where pixel data may be reconstructed, assembled into a picture, and saved in reference picture buffers. For example, after a local decode loop (e.g., including inverse scan, inverse transform, and assembling coding partitions), prediction error data partitions may be generated. The prediction error data partitions may be added with a prediction partition to generate reconstructed prediction partitions, which may be assembled into tiles or super-fragments. The assembled tiles or super-fragments may be optionally processed via deblock filtering and/or quality restoration filtering and assembled to generate a picture. The picture may be saved in decoded picture buffer 119 as a reference picture for prediction of other (e.g., following) pictures.

Process 3000 may continue at operation 3022, "Generate Decoded Prediction Reference Pictures", where decoded prediction reference pictures may be decoded. For example, decoded (or final decoded) tiles or super-fragments may be assembled to generate a decoded video picture, and the decoded video picture may be saved in reference picture buffers (e.g., decoded picture buffer 119) for use in future prediction.

Process 3000 may continue at operation 3023, "Generate Modifying Characteristic Parameters", where, modified characteristic parameters may be generated. For example, a second modified prediction reference picture and second modifying characteristic parameters associated with the second modified prediction reference picture may be generated based at least in part on the second decoded prediction reference picture, where the second modified reference picture may be of a different type than the first modified reference picture.

Process 3000 may continue at operation 3024, "Generate Modified Prediction Reference Pictures", where modified prediction reference pictures may be generated, for example, a first modified prediction reference picture and first modifying characteristic parameters associated with the first modified prediction reference picture may be generated based at least in part on the first decoded prediction reference picture.

Process 3000 may continue at operation 3025, "Generate Motion Data", where, motion estimation data may be generated. For example, motion data associated with a prediction partition of a current picture may be generated based at least in part on one of the first modified prediction reference picture or the second modified prediction reference picture.

Process 3000 may continue at operation 3026, "Perform Motion Compensation", where, motion compensation may be performed. For example, motion compensation may be performed based at least in part on the motion data and at least one of the first modified prediction reference picture or the second modified prediction reference picture to generate prediction partition data for the prediction partition. Process 1300 may feed this information back to operation 1304 where each decoded prediction error partition (e.g., including zero prediction error partitions) may be added to the corresponding prediction partition to generate a reconstructed prediction partition.

Operations 3001 through 3026 may provide for video encoding and bitstream transmission techniques, which may be employed by an encoder system as discussed herein. The following operations, operations 3054 through 3076 may provide for video decoding and video display techniques, which may be employed by a decoder system as discussed herein.

Process 3000 may continue at operation 3054, "Receive Bitstream", where the bitstream may be received. For example, input bitstream 201, bitstream 2100, or the like may be received via decoder 200. In some examples, the bitstream may include data associated with a coding partition, one or more indicators, and/or data defining coding partition(s) as discussed above. In some examples, the bitstream may include the prediction partitioning, prediction parameters, the selected coding partitioning, the selected characteristics data, motion vector data, quantized transform coefficients, filter parameters, selection data (such as mode selection data), and indictors.

Process 3000 may continue at operation 3055, "Decode Bitstream", where the received bitstream may be decoded via adaptive entropy decoder module 202 for example. For example, received bitstream may be entropy decoded to determine the prediction partitioning, prediction parameters, the selected coding partitioning, the selected characteristics data, motion vector data, quantized transform coefficients, filter parameters, selection data (such as mode selection data), and indictors.

Process 3000 may continue at operation 3056, "Perform Inverse Scan and Inverse Quantization on Each Block of Each Coding Partition", where an inverse scan and inverse quantization may be performed on each block of each coding partition for the prediction partition being processed. For example, the inverse scan and inverse quantization may be performed via adaptive inverse quantize module 203.

Process 3000 may continue at operation 3057, "Perform Fixed or Content Adaptive Inverse Transform to Decode Transform Coefficients to Determine Decoded Prediction Error Data Partitions", where a fixed or content adaptive inverse transform may be performed to decode transform coefficients to determine decoded prediction error data partitions. For example, the inverse transform may include an inverse content adaptive transform such as a hybrid parametric Haar inverse transform such that the hybrid parametric Haar inverse transform may include a parametric Haar inverse transform in a direction of the parametric transform direction and a discrete cosine inverse transform in a direction orthogonal to the parametric transform direction. In some examples, the fixed inverse transform may include a discrete cosine inverse transform or a discrete cosine inverse transform approximator. For example, the fixed or content adaptive transform may be performed via adaptive inverse transform module 204. As discussed, the content adaptive inverse transform may be based on other previously decoded data, such as, for example, decoded neighboring partitions or blocks. In some examples, generating the decoded prediction error data partitions may include assembling decoded coding partitions via coding partitions assembler module 205.

Process 3000 may continue at operation 3058, "Generate Prediction Pixel Data for Each Prediction Partition", where prediction pixel data may be generated for each prediction partition. For example, prediction pixel data may be generated using the selected prediction type (e.g., based on characteristics and motion, or intra-, or other types) and associated prediction parameters.

Process 3000 may continue at operation 3059, "Add to Each Decoded Prediction Error Partition the Corresponding Prediction Partition to Generate Reconstructed Prediction Partition", where each decoded prediction error partition (e.g., including zero prediction error partitions) may be added to the corresponding prediction partition to generated a reconstructed prediction partition. For example, prediction partitions may be generated via the decode loop illustrated in FIG. 2 and added via adder 206 to decoded prediction error partitions.

Process 3000 may continue at operation 3060, "Assemble Reconstructed Prediction Partitions to Generate Decoded Tiles or Super-fragments", where reconstructed prediction partitions may be assembled to generate decoded tiles or super-fragments. For example, prediction partitions may be assembled to generate decoded tiles or super-fragments via prediction partitions assembler module 207.

Process 3000 may continue at operation 3061, "Apply Deblock Filtering and/or QR Filtering to Generate Final Decoded Tiles or Super-fragments", where optional deblock filtering and/or quality restoration filtering may be applied to the decoded tiles or super-fragments to generate final decoded tiles or super-fragments. For example, optional deblock filtering may be applied via deblock filtering module 208 and/or optional quality restoration filtering may be applied via quality restoration filtering module 209.

Process 3000 may continue at operation 3062, "Assemble Decoded Tiles or Super-fragments to Generate a Decoded Video Picture, and Save in Reference Picture Buffers", where decoded (or final decoded) tiles or super-fragments may be assembled to generate a decoded video picture, and the decoded video picture may be saved in reference picture buffers (e.g., decoded picture buffer 210) for use in future prediction.

Process 3000 may continue at operation 3063, "Transmit Decoded Video Frames for Presentment via a Display Device", where decoded video frames may be transmitted for presentment via a display device. For example, decoded video pictures may be further processed via adaptive picture re-organizer 217 and content post restorer module 218 and transmitted to a display device as video frames of display video 219 for presentment to a user. For example, the video frame(s) may be transmitted to a display device 2405 (as shown in FIG. 24) for presentment.

Process 1300 may continue at operation 1372, "Generate Decoded Prediction Reference Pictures", where decoded prediction reference pictures may be decoded. For example, decoded coding partitions may be assembled to generate a decoded prediction error data partition, and the decoded video picture (e.g. a third decoded prediction reference picture and a fourth decoded prediction reference picture may be generated) may be saved in reference picture buffers for use in future prediction.

Process 3000 may continue at operation 3074, "Generate Modified Prediction Reference Pictures", where modified prediction reference pictures may be generated, for example, at least a portion of a third modified prediction reference picture may be generated based at least in part on the third modifying characteristic parameters. Similarly, at least a portion a fourth modified prediction reference picture may be generated based at least in part on the second modifying characteristic parameters associated.

Process 3000 may continue at operation 3075, "Generate Motion Data", where, motion estimation data may be generated. For example, motion data associated with a prediction partition of a current picture may be generated based at least in part on one of the third modified prediction reference picture or the third modified prediction reference picture.

Process 3000 may continue at operation 3076, "Perform Motion Compensation", where, motion compensation may be performed. For example, motion compensation may be performed based at least in part on the motion data and at least one of the third modified prediction reference picture or the fourth modified prediction reference picture to generate prediction partition data for the prediction partition. Process 1300 may feed this information back to operation 1359 where each decoded prediction error partition (e.g., including zero prediction error partitions) may be added to the corresponding prediction partition to generate a reconstructed prediction partition.

Process 1300 may be implemented via any of the coder systems as discussed herein. Further, process 1300 may be repeated either in serial or in parallel on any number of instantiations of video data such as prediction error data partitions, original data partitions, or wavelet data or the like (e.g., at operation 1301, process 1300 may receive original data or wavelet data for processing in analogy to the described prediction error data partition).

In operation, process 1300 may operate as a computer-implemented method for video coding includes segmenting a first video frame of a first type and a second video frame of a second type into a first plurality of tiles or super-fragments and a second plurality of tiles or super-fragments. The first plurality of tiles or super-fragments may be partitioned using a first partitioning technique and the second plurality of tiles or super-fragments may be partitioned using a second partitioning technique, where the first and second partitioning techniques are different. A selected prediction partitioning and an associated plurality of prediction partitions may be determined for the second video frame. A first reconstructed tile or super-fragment may be generated. Deblock filtering parameters and a first final reconstructed tile or super-fragment may be generated based at least in part on the first reconstructed tile or super-fragment and the deblock filtering parameters. The first final reconstructed tile or super-fragment and a second final reconstructed tile or super-fragment may be assembled to generate a first decoded prediction reference picture. Morphing characteristic parameters and a morphed prediction reference picture may be generated based at least in part on the morphing characteristic parameters and the first decoded reference picture. Synthesizing characteristic parameters and a synthesized prediction reference picture may be generated based at least in part on the synthesizing characteristic parameters and the first decoded reference picture or a second decoded reference picture. A mode and a reference type may be determined for each of the plurality of prediction partitions. Motion data associated with the plurality of prediction partitions may be generated based at least in part on one of the morphed prediction reference picture or the synthesized prediction reference picture. Motion compensation may be performed based on the motion data and at least one of the morphed prediction reference picture or the synthesized prediction reference picture to generate a plurality of predicted partitions for the plurality of prediction partition. The plurality of predicted partitions may be differenced with corresponding original pixel data to generate a corresponding plurality of prediction error data partitions. A subset of prediction error data partitions of the plurality of prediction error data partitions are determined to be required to be encoded. Individual prediction error data partitions of the subset of prediction error data partitions may be partitioned into a selected coding partitioning and an associated plurality of coding partitions. Content adaptive transforms may be performed on one or more first coding partitions and fixed transforms may be performed on one or more second coding partitions of the plurality of coding partitionings to generate transform coefficients. The transform coefficients may be quantized to generate quantized transform coefficients. Frame data associated with the first type and the second type, mode data associated with the modes and the reference type, prediction partitioning indicators or prediction partitioning codewords associated with the selected prediction partitioning, coding partitioning indicators or coding partitioning codewords associated with the selected coding partitioning, the motion data, the quantized transform coefficients, the morphing characteristic parameters, the synthesizing characteristic parameters, and the deblock filtering parameters may be entropy encoded into a bitstream.

In another example, a computer-implemented method for video coding may further include generating deblock filtering or deblock and dither filtering parameters and in-loop filtering or quality restoration filtering parameters and generating the second final reconstructed tile or super-fragment based at least in part on the deblock filtering or deblock and dither filtering parameters and the in-loop filtering or quality restoration filtering parameters and a second reconstructed tile or super-fragment. The first decoded prediction reference picture may be stored in a picture buffer, where performing the motion compensation may include generating adaptive motion filtering parameters or adaptive precision filtering parameters and performing the motion compensation based at least in part on an adaptive motion or an adaptive precision filtering using the adaptive motion filtering parameters or adaptive precision filtering parameters. Enhanced prediction parameters and an enhanced predicted partition may be generated based on a predicted partition and the enhanced prediction parameters. Whether to use the enhanced predicted partition or the predicted partition as a selected predicted partition for the prediction partition may be determined. When the selected predicted partition includes the enhanced predicted partition entropy encoding the enhanced prediction parameters into the bitstream, whether to apply fusion filtering or fusion improvement filtering to the selected predicted partition may be determined. When fusion filtering or fusion improvement filtering is to be applied to the selected predicted partition the selected predicted partition and a second selected predicted partition may be assembled to generate at least a portion of an assembled picture. When fusion filtering or fusion improvement filtering is to be applied to the selected predicted partition, fusion filtering parameters or fusion improvement filtering parameters may be generated and the portion of the assembled picture may be fusion filtered or fusion improvement filtered based at least in part on the fusion filtering parameters or fusion improvement filtering parameters. When fusion filtering or fusion improvement filtering is to be applied to the selected predicted partition, the fusion filtering parameters or the fusion improvement filtering parameters may be entropy encoded into the bitstream. Data associated with the selected content adaptive and fixed transforms, the deblock filtering or deblock and dither filtering parameters, and the in-loop filtering or quality restoration filtering parameters may be entropy encoded into the bitstream, where the entropy encoding may include at least one of an adaptive symbol-run variable length coding technique or an adaptive proxy variable length coding technique, and where entropy encoding the prediction partitioning indicators or the prediction partitioning codewords may include a different entropy encoding technique than entropy encoding the morphing characteristic parameters or the synthesizing characteristic parameters. The bitstream may be transmitted.

Similarly, the bitstream may be received. The bitstream may be entropy decoded to determine the frame data associated with the first type and the second type, mode data associated with the modes and the reference type, prediction partitioning indicators or prediction partitioning codewords associated with the selected prediction partitioning, coding partitioning indicators or coding partitioning codewords associated with the selected coding partitioning, the motion data, the quantized transform coefficients, the morphing characteristic parameters, the synthesizing characteristic parameters, the deblock filtering parameters, the enhanced prediction parameters, the fusion filtering parameters or the fusion improvement filtering parameters, the data associated with the selected content adaptive and fixed transforms, the deblock filtering or deblock and dither filtering parameters, and the in-loop filtering or quality restoration filtering parameters, where the entropy decoding may include at least one of the adaptive symbol-run variable length coding technique or the adaptive proxy variable length coding technique, where entropy decoding the prediction partitioning indicators or the prediction partitioning codewords may include a different entropy decoding technique than entropy decoding the quantized transform coefficients.

In some implementations, an inverse quantization may be performed based at least in part on the quantized transform coefficients to generate decoded transform coefficients. Inverse transforms may be performed based at least in part on the decoded transform coefficients and the transform indicators to generate a plurality of decoded coding partitions, where the inverse transforms may include at least one of an inverse fixed transforms, an inverse discrete cosine transform, an inverse discrete cosine transform approximator, an inverse adaptive transform, or an inverse hybrid parametric Haar transform. The plurality of decoded coding partitions may be assembled to generate a decoded prediction error data partition. At least one of a first decoded tile or super-fragment may be generated. Decoder deblock filtering or decoder deblock and dither filtering and decoder in-loop or decoder quality restoration filtering may be applied to the first decoded tile or super-fragment based at least in part on the deblock filtering parameters or deblock and dither filtering parameters and the in-loop filtering parameters or quality restoration filtering parameters to generate a first final decoded reconstructed tile or super-fragment. The first final decoded reconstructed tile or super-fragment and a second final decoded reconstructed tile or super-fragment may be assembled to generate a decoded reconstructed video frame. The decoded reconstructed video frame may be stored in a decoder picture buffer. A decoder morphed prediction reference picture may be generated based at least in part on the morphing characteristic parameters. A decoder synthesized prediction reference picture may be generated based at least in part on the synthesizing characteristic parameters.

In some implementations, decoder motion compensation may be performed based at least in part on the decoder morphed prediction reference picture or the decoder synthesized prediction reference picture to generate a decoded predicted partition, where the decoder motion compensation may include a decoder adaptive motion filtering or a decoder adaptive precision filtering based at least in part on the adaptive motion filtering parameters or adaptive precision filtering parameters. An enhanced decoded predicted partition may be generated based at least in part on the enhanced prediction parameters and the decoded predicted partition. Whether to use the decoded enhanced predicted partition or the decoded predicted partition as a selected decoded predicted partition may be determined. Whether to apply decoder fusion filtering or decoder fusion improvement filtering to the selected decoded predicted partition may be determined. When decoder fusion filtering or decoder fusion improvement filtering is to be applied to the selected decoded predicted partition, the selected decoded predicted partition and a second selected decoded predicted partition may be assembled to generate at least a portion of a decoded assembled picture. When decoder fusion filtering or decoder fusion improvement filtering is to be applied to the selected decoded predicted partition, the portion of the decoded assembled picture may be decoder fusion filtered or decoder fusion improvement filtered based at least in part on the fusion filtering parameters or the fusion improvement filtering parameters. The selected decoded predicted partition may be added to the decoded prediction error data partition to generate a first decoded reconstructed partition. The first decoded reconstructed partition and a second decoded reconstructed partition may be combined to generate a third final decoded reconstructed tile or super-fragment. The third final decoded reconstructed tile or super-fragment and a fourth final decoded reconstructed tile or super-fragment may be assembled to generate a second decoded reconstructed video frame. The second decoded reconstructed video frame may be transmitted for presentment via a display device. The first video frame may be segmented into the first plurality of super-fragments may include dividing the first video frame into a third plurality of tiles and segmenting the first video frame into two or more region layers, where at least one super-fragment of the first plurality of super-fragments includes an individual region layer of the two or more region layers within an individual tile of the second plurality of tiles.

In some implementations, the first partitioning technique may include a k-d tree partitioning technique and the second partitioning technique may include a bi-tree partitioning technique. The determination of the selected prediction partitioning and the associated plurality of prediction partitions for the second video frame may include: partitioning the second video into a plurality of potential prediction partitionings based on the second partitioning technique; performing predictions for each of the plurality of potential prediction partitionings and determining potential prediction errors for each of the plurality of potential prediction partitionings; performing a rate distortion optimization based on the predictions and the potential prediction errors to determine the selected prediction partitioning and the associated plurality of prediction partitions; and generating the prediction partitioning indicators or prediction partitioning codewords associated with the selected prediction partitioning and the plurality of prediction partitions. Partitioning the individual prediction error data partitions of the subset of prediction error data partitions may include a bi-tree partitioning. Partitioning the individual prediction error data partitions of the subset of prediction error data partitions into the selected coding partitioning and the associated plurality of coding partitions may include: partitioning individual prediction error data partitions of the subset of prediction error data partitions into a plurality of potential coding partitionings; performing content adaptive transforms on one or more first coding partitions of each of the plurality of potential coding partitionings and fixed transforms on one or more second coding partitions of each of the plurality of potential coding partitionings, wherein the first coding partitions include small to medium sized partitions, wherein the second coding partitions include medium to large sized partitions, wherein the fixed transforms includes at least one of a discrete cosine transform or a discrete cosine transform approximator, and wherein the content adaptive transforms includes a hybrid parametric Haar transform, wherein the hybrid parametric Haar transform includes a parametric Haar transform in a first direction and a discrete cosine transform in a second direction; and/or performing a second rate distortion optimization based on the content adaptive transforms and fixed transforms of the plurality of potential coding partitionings to determine the selected coding partitioning and the associated plurality of coding partitions and associated selected content adaptive and fixed transforms, wherein the coding partitions have associated transform coefficients.

In some implementations, the first video frame is an I-picture and the second video frame is at least one of a B/F-picture or a P-picture. The determination of whether the first video frame is a first type the second video frame is a second type may include a third rate distortion optimization. The modes may include at least one of intra mode, inter mode, multi mode, skip mode, or auto mode. The reference types may include at least one of the morphed prediction reference picture, the synthesized prediction reference picture, the first decoded prediction reference picture, or the second decoded prediction reference picture, and wherein the first decoded prediction reference picture includes a past decoded prediction reference picture or a future decoded prediction reference picture. The determination of modes and reference types may include a fourth rate distortion optimization.

In some implementations, the morphed prediction reference picture may include at least one of a gain modified prediction reference picture, a blur modified prediction reference picture, a dominant motion modified prediction reference picture, or a registration modified prediction reference picture and wherein the synthesized prediction reference picture includes at least one of a super resolution prediction reference picture or a projection trajectory prediction reference picture. Generation of the morphing characteristic parameters may include at least one of generating the morphing characteristic parameters based at least in part on the second video frame and a previously decoded prediction reference picture or generating the morphing characteristic parameters based at least in part on the second video frame and a third original video frame, and the motion data may include a motion vector.

While implementation of the example processes herein may include the undertaking of all operations shown in the order illustrated, the present disclosure is not limited in this regard and, in various examples, implementation of the example processes herein may include the undertaking of only a subset of the operations shown and/or in a different order than illustrated.

Various components of the systems described herein may be implemented in software, firmware, and/or hardware and/or any combination thereof. For example, various components of system 1400 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the video systems as discussed herein.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

Figure 31:
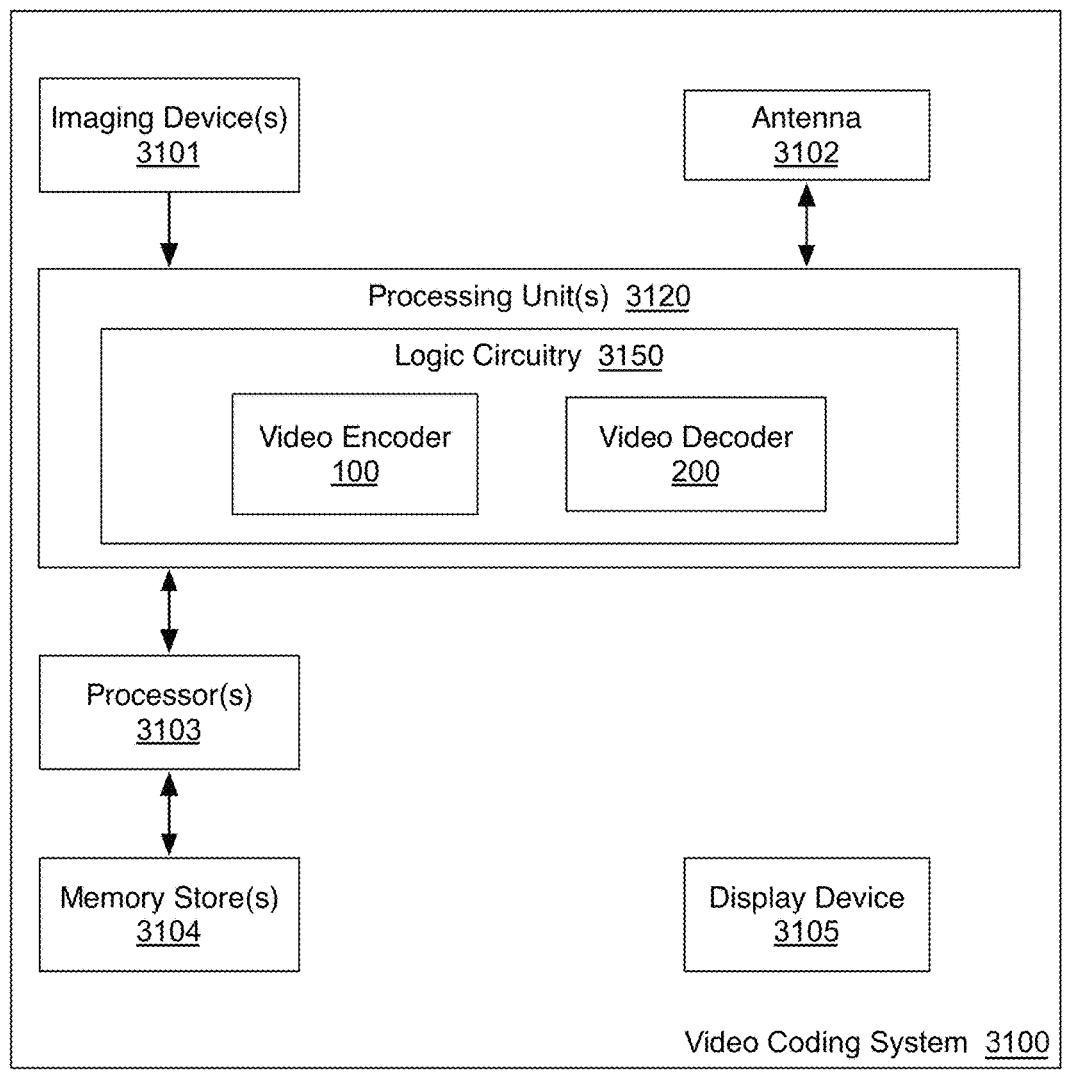
FIG. 31 is an illustrative diagram of an example video coding system.

FIG. 31 is an illustrative diagram of example video coding system 3100, arranged in accordance with at least some implementations of the present disclosure. In the illustrated implementation, video coding system 3100 may include imaging device(s) 3101, video encoder 100 and/or a video encoder implemented via logic circuitry 3150 of processing unit(s) 3120, an antenna 3102, one or more processor(s) 3103, one or more memory store(s) 3104, and/or a display device 3105.

As illustrated, imaging device(s) 3101, antenna 3102, processing unit(s) 3120, logic circuitry 3150, video encoder 100, video decoder 200, processor(s) 3103, memory store(s) 3104, and/or display device 3105 may be capable of communication with one another. As discussed, although illustrated with both video encoder 100 and video decoder 200, video coding system 3100 may include only video encoder 100 or only video decoder 200 in various examples.

As shown, in some examples, video coding system 3100 may include antenna 3102. Antenna 3102 may be configured to transmit or receive an encoded bitstream of video data, for example. Further, in some examples, video coding system 3100 may include display device 3105. Display device 3105 may be configured to present video data. As shown, in some examples, logic circuitry 3150 may be implemented via processing unit(s) 3120. Processing unit(s) 3120 may include application-specific integrated circuit (ASIC) logic, graphics processor(s), general purpose processor(s), or the like. Video coding system 3100 also may include optional processor(s) 3103, which may similarly include application-specific integrated circuit (ASIC) logic, graphics processor(s), general purpose processor(s), or the like. In some examples, logic circuitry 3150 may be implemented via hardware or video coding dedicated hardware or the like, and processor(s) 3103 may implemented general purpose software or operating systems or the like. In addition, memory stores 3104 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 3104 may be implemented by cache memory. In some examples, logic circuitry 3150 may access memory stores 3104 (for implementation of an image buffer for example). In other examples, logic circuitry 3150 and/or processing unit(s) 3120 may include memory stores (e.g., cache or the like) for the implementation of an image buffer or the like.

In some examples, video encoder 100 implemented via logic circuitry may include an image buffer (e.g., via either processing unit(s) 3120 or memory store(s) 3104)) and a graphics processing unit (e.g., via processing unit(s) 3120). The graphics processing unit may be communicatively coupled to the image buffer. The graphics processing unit may include video encoder 100 as implemented via logic circuitry 3150 to embody the various modules as discussed with respect to FIG. 1 and/or any other encoder system or subsystem described herein. For example, the graphics processing unit may include prediction partitions generator logic circuitry, adaptive picture organizer logic circuitry, inter-prediction logic circuitry, motion compensation generation logic circuitry, differencing logic circuitry, sub-partitions generator logic circuitry, adaptive transform logic circuitry, adaptive entropy encoder logic circuitry, and so on. The logic circuitry may be configured to perform the various operations as discussed herein.

In another example, video encoder 100 may include an image buffer and a graphics processing unit communicatively coupled to the image buffer. The graphics processing unit may be configured to: segment a first video frame of a first type and a second video frame of a second type into a first plurality of tiles or super-fragments and a second plurality of tiles or super-fragments. The graphics processing unit may also be configured to partition the first plurality of tiles or super-fragments using a first partitioning technique and the second plurality of tiles or super-fragments using a second partitioning technique, wherein the first and second partitioning techniques are different. A selected prediction partitioning and an associated plurality of prediction partitions for the second video frame may be determined. A first reconstructed tile or super-fragment may be generated. Deblock filtering parameters and a first final reconstructed tile or super-fragment may be generated based at least in part on the first reconstructed tile or super-fragment and the deblock filtering parameters. The first final reconstructed tile or super-fragment and a second final reconstructed tile or super-fragment may be assembled to generate a first decoded prediction reference picture. Morphing characteristic parameters and a morphed prediction reference picture may be generated based at least in part on the morphing characteristic parameters and the first decoded reference picture. Synthesizing characteristic parameters and a synthesized prediction reference picture may be generated based at least in part on the synthesizing characteristic parameters and the first decoded reference picture or a second decoded reference picture. A mode and a reference type may be determined for each of the plurality of prediction partitions. Motion data associated with the plurality of prediction partitions may be generated based at least in part on one of the morphed prediction reference picture or the synthesized prediction reference picture. Motion compensation may be performed based on the motion data and at least one of the morphed prediction reference picture or the synthesized prediction reference picture to generate a plurality of predicted partitions for the plurality of prediction partition. A difference may be taken of the plurality of predicted partitions with corresponding original pixel data to generate a corresponding plurality of prediction error data partitions. A determination may be made whether a subset of prediction error data partitions of the plurality of prediction error data partitions are required to be encoded. For the subset of prediction error data partitions that are required to be encoded: individual prediction error data partitions of the subset of prediction error data partitions may be partitioned into a selected coding partitioning and an associated plurality of coding partitions; content adaptive transforms may be performed on one or more first coding partitions and fixed transforms on one or more second coding partitions of the plurality of coding partitionings to generate transform coefficients; and the transform coefficients may be quantized to generate quantized transform coefficients. Frame data associated with the first type and the second type, mode data associated with the modes and the reference type, prediction partitioning indicators or prediction partitioning codewords associated with the selected prediction partitioning, coding partitioning indicators or coding partitioning codewords associated with the selected coding partitioning, the motion data, the quantized transform coefficients, the morphing characteristic parameters, the synthesizing characteristic parameters, and the deblock filtering parameters all may be entropy encoded into a bitstream.

In some examples, antenna 3102 of video coding system 3100 may be configured to receive an encoded bitstream of video data. Video coding system 3100 may also include video decoder 200 coupled to antenna 3102 and configured to decode the encoded bitstream.

In a further example, decoder system 200 may include a video decoder configured to decode an encoded bitstream. The video decoder may be configured to entropy decode the encoded bitstream to determine quantized transform coefficients, data associated with the selected content adaptive and fixed transforms, coding partitioning indicators or coding partitioning codewords, deblock filtering parameters, morphing characteristic parameters, synthesizing characteristic parameters, motion data, prediction partitioning indicators or prediction partitioning codewords. An inverse quantization may be performed based at least in part on the quantized transform coefficients to generate decoded transform coefficients. An inverse transforms may be based at least in part on the decoded transform coefficients and the data associated with the selected content adaptive and fixed transforms to generate a plurality of decoded coding partitions. The plurality of decoded coding partitions may be assembled based at least in part on the coding partitioning indicators or coding partitioning codewords to generate a decoded prediction error data partition. At least one of a first decoded tile or super-fragment may be generated. Deblock filtering may be applied to the first decoded tile or super-fragment based at least in part on the deblock filtering parameters to generate a first final decoded reconstructed tile or super-fragment. The first final decoded reconstructed tile or super-fragment and a second final decoded reconstructed tile or super-fragment may be assembled to generate a decoded reconstructed video frame. A morphed prediction reference picture may be generated based at least in part on the morphing characteristic parameters and the decoded reconstructed video frame. A synthesized prediction reference picture may be generated based at least in part on the synthesizing characteristic parameters and at least one of the reconstructed video frame or a second reconstructed video frame. Motion compensation may be performed based at least in part on the decoder morphed prediction reference picture or the decoder synthesized prediction reference picture and the motion data to generate a decoded predicted partition. The decoded predicted partition may be added to the decoded prediction error data partition to generate a first decoded reconstructed partition. The first decoded reconstructed partition and a second decoded reconstructed partition may be combined based at least in part on the prediction partitioning indicators or prediction partitioning codewords to generate a third final decoded reconstructed tile or super-fragment. The third final decoded reconstructed tile or super-fragment and a fourth final decoded reconstructed tile or super-fragment may be assembled to generate a second decoded reconstructed video frame. The second decoded reconstructed video frame may be transmitted for presentment via a display device.

In embodiments, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein.

Figure 32:
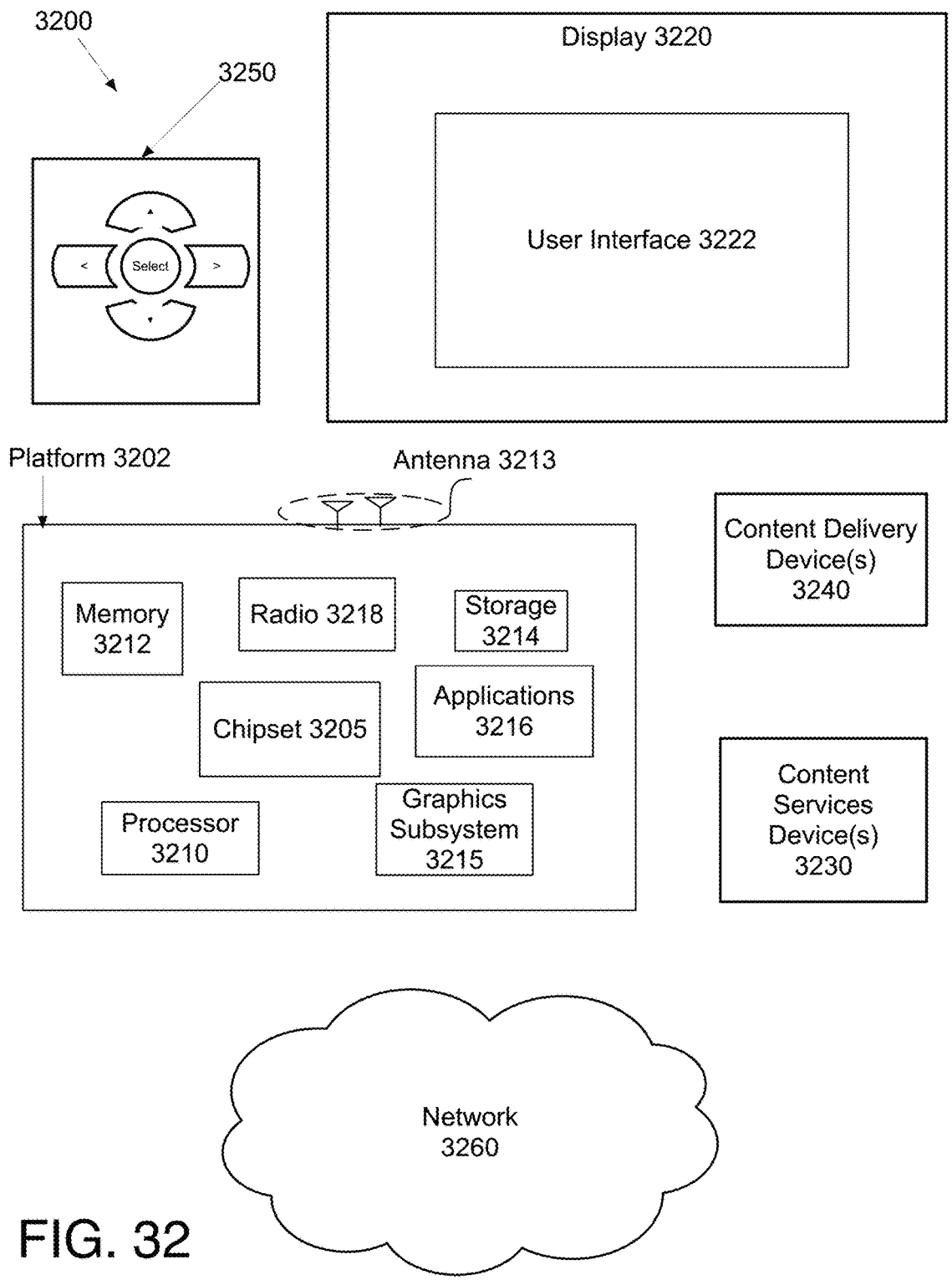
FIG. 32 is an illustrative diagram of an example system.

FIG. 32 is an illustrative diagram of an example system 3200, arranged in accordance with at least some implementations of the present disclosure. In various implementations, system 3200 may be a media system although system 3200 is not limited to this context. For example, system 3200 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 3200 includes a platform 3202 coupled to a display 3220. Platform 3202 may receive content from a content device such as content services device(s) 3230 or content delivery device(s) 3240 or other similar content sources. A navigation controller 3250 including one or more navigation features may be used to interact with, for example, platform 3202 and/or display 3220. Each of these components is described in greater detail below.

In various implementations, platform 3202 may include any combination of a chipset 3205, processor 3210, memory 3212, antenna 3213, storage 3214, graphics subsystem 3215, applications 3216 and/or radio 3218. Chipset 3205 may provide intercommunication among processor 3210, memory 3212, storage 3214, graphics subsystem 3215, applications 3216 and/or radio 3218. For example, chipset 3205 may include a storage adapter (not depicted) capable of providing intercommunication with storage 3214.

Processor 3210 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 3210 may be dual-core processor(s), dual-core mobile processor(s), and so forth.

Memory 3212 may be implemented as a volatile memory device such as, but not limited to, a Random Access Memory (RAM), Dynamic Random Access Memory (DRAM), or Static RAM (SRAM).

Storage 3214 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 3214 may include technology to increase the storage performance enhanced protection for valuable digital media when multiple hard drives are included, for example.

Graphics subsystem 3215 may perform processing of images such as still or video for display. Graphics subsystem 3215 may be a graphics processing unit (GPU) or a visual processing unit (VPU), for example. An analog or digital interface may be used to communicatively couple graphics subsystem 3215 and display 3220. For example, the interface may be any of a High-Definition Multimedia Interface, DisplayPort, wireless HDMI, and/or wireless HD compliant techniques. Graphics subsystem 3215 may be integrated into processor 3210 or chipset 3205. In some implementations, graphics subsystem 3215 may be a stand-alone device communicatively coupled to chipset 3205.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 3218 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 3218 may operate in accordance with one or more applicable standards in any version.

In various implementations, display 3220 may include any television type monitor or display. Display 3220 may include, for example, a computer display screen, touch screen display, video monitor, television-like device, and/or a television. Display 3220 may be digital and/or analog. In various implementations, display 3220 may be a holographic display. Also, display 3220 may be a transparent surface that may receive a visual projection. Such projections may convey various forms of information, images, and/or objects. For example, such projections may be a visual overlay for a mobile augmented reality (MAR) application. Under the control of one or more software applications 3216, platform 3202 may display user interface 3222 on display 3220.

In various implementations, content services device(s) 3230 may be hosted by any national, international and/or independent service and thus accessible to platform 3202 via the Internet, for example. Content services device(s) 3230 may be coupled to platform 3202 and/or to display 3220. Platform 3202 and/or content services device(s) 3230 may be coupled to a network 3260 to communicate (e.g., send and/or receive) media information to and from network 3260. Content delivery device(s) 3240 also may be coupled to platform 3202 and/or to display 3220.

In various implementations, content services device(s) 3230 may include a cable television box, personal computer, network, telephone, Internet enabled devices or appliance capable of delivering digital information and/or content, and any other similar device capable of unidirectionally or bidirectionally communicating content between content providers and platform 3202 and/display 3220, via network 3260 or directly. It will be appreciated that the content may be communicated unidirectionally and/or bidirectionally to and from any one of the components in system 3200 and a content provider via network 3260. Examples of content may include any media information including, for example, video, music, medical and gaming information, and so forth.

Content services device(s) 3230 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 3202 may receive control signals from navigation controller 3250 having one or more navigation features. The navigation features of controller 3250 may be used to interact with user interface 3222, for example. In various embodiments, navigation controller 3250 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 3250 may be replicated on a display (e.g., display 3220) by movements of a pointer, cursor, focus ring, or other visual indicators displayed on the display. For example, under the control of software applications 3216, the navigation features located on navigation controller 3250 may be mapped to virtual navigation features displayed on user interface 3222, for example. In various embodiments, controller 3250 may not be a separate component but may be integrated into platform 3202 and/or display 3220. The present disclosure, however, is not limited to the elements or in the context shown or described herein.

In various implementations, drivers (not shown) may include technology to enable users to instantly turn on and off platform 3202 like a television with the touch of a button after initial boot-up, when enabled, for example. Program logic may allow platform 3202 to stream content to media adaptors or other content services device(s) 3230 or content delivery device(s) 3240 even when the platform is turned "off." In addition, chipset 3205 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 3200 may be integrated. For example, platform 3202 and content services device(s) 3230 may be integrated, or platform 3202 and content delivery device(s) 3240 may be integrated, or platform 3202, content services device(s) 3230, and content delivery device(s) 3240 may be integrated, for example. In various embodiments, platform 3202 and display 3220 may be an integrated unit. Display 3220 and content service device(s) 3230 may be integrated, or display 3220 and content delivery device(s) 3240 may be integrated, for example. These examples are not meant to limit the present disclosure.

In various embodiments, system 3200 may be implemented as a wireless system, a wired system, or a combination of both. When implemented as a wireless system, system 3200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 3200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 3202 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 32.

Figure 33:
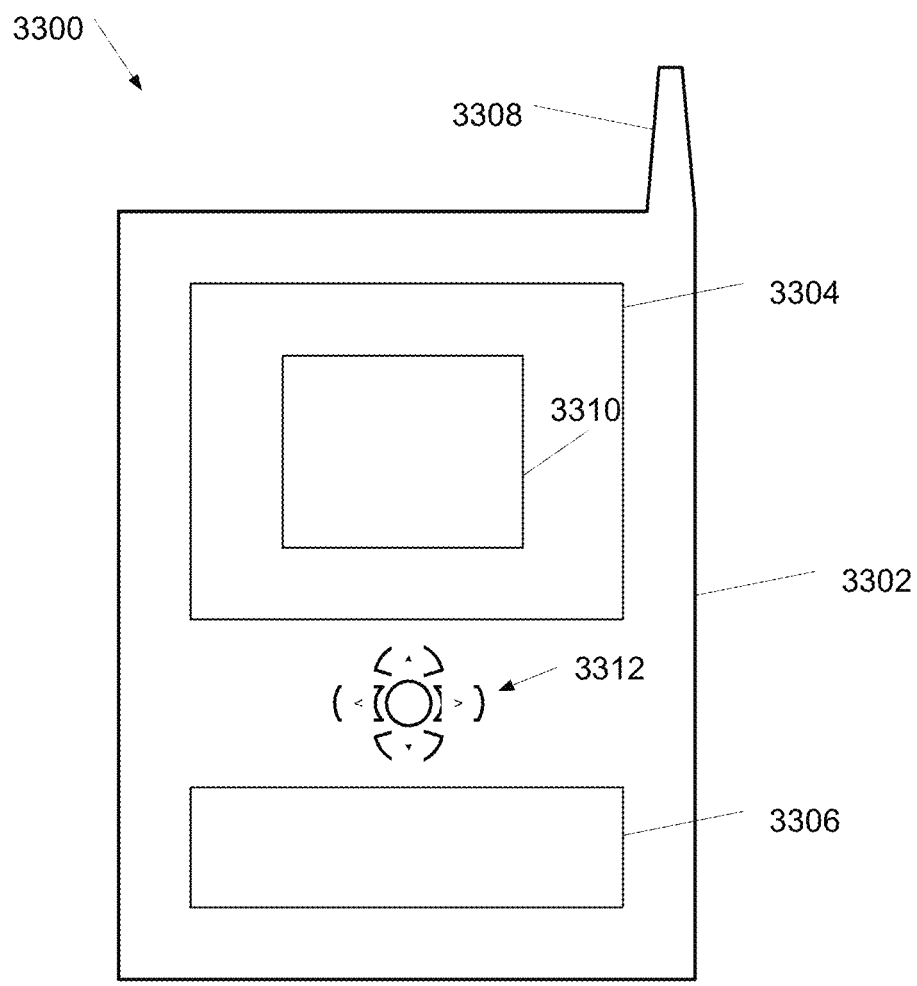
FIG. 33 illustrates an example device, all arranged in accordance with at least some implementations of the present disclosure.

As described above, system 3200 may be embodied in varying physical styles or form factors. FIG. 33 illustrates implementations of a small form factor device 3300 in which system 3300 may be embodied. In various embodiments, for example, device 3300 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 33, device 3300 may include a housing 3302, a display 3304, an input/output (I/O) device 3306 which may include user interface 3310, and an antenna 3308. Device 3300 also may include navigation features 3312. Display 3304 may include any suitable display unit for displaying information appropriate for a mobile computing device. I/O device 3306 may include any suitable I/O device for entering information into a mobile computing device. Examples for I/O device 3306 may include an alphanumeric keyboard, a numeric keypad, a touch pad, input keys, buttons, switches, rocker switches, microphones, speakers, voice recognition device and software, and so forth. Information also may be entered into device 3300 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method for video coding includes segmenting a first video frame of a first type and a second video frame of a second type into a first plurality of tiles or super-fragments and a second plurality of tiles or super-fragments. The first plurality of tiles or super-fragments may be partitioned using a first partitioning technique and the second plurality of tiles or super-fragments may be partitioned using a second partitioning technique, where the first and second partitioning techniques are different. A selected prediction partitioning and an associated plurality of prediction partitions may be determined for the second video frame. A first reconstructed tile or super-fragment may be generated. Deblock filtering parameters and a first final reconstructed tile or super-fragment may be generated based at least in part on the first reconstructed tile or super-fragment and the deblock filtering parameters. The first final reconstructed tile or super-fragment and a second final reconstructed tile or super-fragment may be assembled to generate a first decoded prediction reference picture. Morphing characteristic parameters and a morphed prediction reference picture may be generated based at least in part on the morphing characteristic parameters and the first decoded reference picture. Synthesizing characteristic parameters and a synthesized prediction reference picture may be generated based at least in part on the synthesizing characteristic parameters and the first decoded reference picture or a second decoded reference picture. A mode and a reference type may be determined for each of the plurality of prediction partitions. Motion data associated with the plurality of prediction partitions may be generated based at least in part on one of the morphed prediction reference picture or the synthesized prediction reference picture. Motion compensation may be performed based on the motion data and at least one of the morphed prediction reference picture or the synthesized prediction reference picture to generate a plurality of predicted partitions for the plurality of prediction partition. The plurality of predicted partitions may be differenced with corresponding original pixel data to generate a corresponding plurality of prediction error data partitions. A subset of prediction error data partitions of the plurality of prediction error data partitions are determined to be required to be encoded. Individual prediction error data partitions of the subset of prediction error data partitions may be partitioned into a selected coding partitioning and an associated plurality of coding partitions. Content adaptive transforms may be performed on one or more first coding partitions and fixed transforms may be performed on one or more second coding partitions of the plurality of coding partitionings to generate transform coefficients. The transform coefficients may be quantized to generate quantized transform coefficients. Frame data associated with the first type and the second type, mode data associated with the modes and the reference type, prediction partitioning indicators or prediction partitioning codewords associated with the selected prediction partitioning, coding partitioning indicators or coding partitioning codewords associated with the selected coding partitioning, the motion data, the quantized transform coefficients, the morphing characteristic parameters, the synthesizing characteristic parameters, and the deblock filtering parameters may be entropy encoded into a bitstream.

In another example, a computer-implemented method for video coding may further include generating deblock filtering or deblock and dither filtering parameters and in-loop filtering or quality restoration filtering parameters and generating the second final reconstructed tile or super-fragment based at least in part on the deblock filtering or deblock and dither filtering parameters and the in-loop filtering or quality restoration filtering parameters and a second reconstructed tile or super-fragment. The first decoded prediction reference picture may be stored in a picture buffer, where performing the motion compensation may include generating adaptive motion filtering parameters or adaptive precision filtering parameters and performing the motion compensation based at least in part on an adaptive motion or an adaptive precision filtering using the adaptive motion filtering parameters or adaptive precision filtering parameters. Enhanced prediction parameters and an enhanced predicted partition may be generated based on a predicted partition and the enhanced prediction parameters. Whether to use the enhanced predicted partition or the predicted partition as a selected predicted partition for the prediction partition may be determined. When the selected predicted partition includes the enhanced predicted partition entropy encoding the enhanced prediction parameters into the bitstream, whether to apply fusion filtering or fusion improvement filtering to the selected predicted partition may be determined. When fusion filtering or fusion improvement filtering is to be applied to the selected predicted partition the selected predicted partition and a second selected predicted partition may be assembled to generate at least a portion of an assembled picture. When fusion filtering or fusion improvement filtering is to be applied to the selected predicted partition, fusion filtering parameters or fusion improvement filtering parameters may be generated and the portion of the assembled picture may be fusion filtered or fusion improvement filtered based at least in part on the fusion filtering parameters or fusion improvement filtering parameters. When fusion filtering or fusion improvement filtering is to be applied to the selected predicted partition, the fusion filtering parameters or the fusion improvement filtering parameters may be entropy encoded into the bitstream. Data associated with the selected content adaptive and fixed transforms, the deblock filtering or deblock and dither filtering parameters, and the in-loop filtering or quality restoration filtering parameters may be entropy encoded into the bitstream, where the entropy encoding may include at least one of an adaptive symbol-run variable length coding technique or an adaptive proxy variable length coding technique, and where entropy encoding the prediction partitioning indicators or the prediction partitioning codewords may include a different entropy encoding technique than entropy encoding the morphing characteristic parameters or the synthesizing characteristic parameters. The bitstream may be transmitted.

Similarly, the bitstream may be received. The bitstream may be entropy decoded to determine the frame data associated with the first type and the second type, mode data associated with the modes and the reference type, prediction partitioning indicators or prediction partitioning codewords associated with the selected prediction partitioning, coding partitioning indicators or coding partitioning codewords associated with the selected coding partitioning, the motion data, the quantized transform coefficients, the morphing characteristic parameters, the synthesizing characteristic parameters, the deblock filtering parameters, the enhanced prediction parameters, the fusion filtering parameters or the fusion improvement filtering parameters, the data associated with the selected content adaptive and fixed transforms, the deblock filtering or deblock and dither filtering parameters, and the in-loop filtering or quality restoration filtering parameters, where the entropy decoding may include at least one of the adaptive symbol-run variable length coding technique or the adaptive proxy variable length coding technique, where entropy decoding the prediction partitioning indicators or the prediction partitioning codewords may include a different entropy decoding technique than entropy decoding the quantized transform coefficients.

In some implementations, an inverse quantization may be performed based at least in part on the quantized transform coefficients to generate decoded transform coefficients. Inverse transforms may be performed based at least in part on the decoded transform coefficients and the transform indicators to generate a plurality of decoded coding partitions, where the inverse transforms may include at least one of an inverse fixed transforms, an inverse discrete cosine transform, an inverse discrete cosine transform approximator, an inverse adaptive transform, or an inverse hybrid parametric Haar transform. The plurality of decoded coding partitions may be assembled to generate a decoded prediction error data partition. At least one of a first decoded tile or super-fragment may be generated. Decoder deblock filtering or decoder deblock and dither filtering and decoder in-loop or decoder quality restoration filtering may be applied to the first decoded tile or super-fragment based at least in part on the deblock filtering parameters or deblock and dither filtering parameters and the in-loop filtering parameters or quality restoration filtering parameters to generate a first final decoded reconstructed tile or super-fragment. The first final decoded reconstructed tile or super-fragment and a second final decoded reconstructed tile or super-fragment may be assembled to generate a decoded reconstructed video frame. The decoded reconstructed video frame may be stored in a decoder picture buffer. A decoder morphed prediction reference picture may be generated based at least in part on the morphing characteristic parameters. A decoder synthesized prediction reference picture may be generated based at least in part on the synthesizing characteristic parameters.

In some implementations, decoder motion compensation may be performed based at least in part on the decoder morphed prediction reference picture or the decoder synthesized prediction reference picture to generate a decoded predicted partition, where the decoder motion compensation may include a decoder adaptive motion filtering or a decoder adaptive precision filtering based at least in part on the adaptive motion filtering parameters or adaptive precision filtering parameters. An enhanced decoded predicted partition may be generated based at least in part on the enhanced prediction parameters and the decoded predicted partition. Whether to use the decoded enhanced predicted partition or the decoded predicted partition as a selected decoded predicted partition may be determined. Whether to apply decoder fusion filtering or decoder fusion improvement filtering to the selected decoded predicted partition may be determined. When decoder fusion filtering or decoder fusion improvement filtering is to be applied to the selected decoded predicted partition, the selected decoded predicted partition and a second selected decoded predicted partition may be assembled to generate at least a portion of a decoded assembled picture. When decoder fusion filtering or decoder fusion improvement filtering is to be applied to the selected decoded predicted partition, the portion of the decoded assembled picture may be decoder fusion filtered or decoder fusion improvement filtered based at least in part on the fusion filtering parameters or the fusion improvement filtering parameters. The selected decoded predicted partition may be added to the decoded prediction error data partition to generate a first decoded reconstructed partition. The first decoded reconstructed partition and a second decoded reconstructed partition may be combined to generate a third final decoded reconstructed tile or super-fragment. The third final decoded reconstructed tile or super-fragment and a fourth final decoded reconstructed tile or super-fragment may be assembled to generate a second decoded reconstructed video frame. The second decoded reconstructed video frame may be transmitted for presentment via a display device. The first video frame may be segmented into the first plurality of super-fragments may include dividing the first video frame into a third plurality of tiles and segmenting the first video frame into two or more region layers, where at least one super-fragment of the first plurality of super-fragments includes an individual region layer of the two or more region layers within an individual tile of the second plurality of tiles.

In some implementations, the first partitioning technique may include a k-d tree partitioning technique and the second partitioning technique may include a bi-tree partitioning technique. The determination of the selected prediction partitioning and the associated plurality of prediction partitions for the second video frame may include: partitioning the second video into a plurality of potential prediction partitionings based on the second partitioning technique; performing predictions for each of the plurality of potential prediction partitionings and determining potential prediction errors for each of the plurality of potential prediction partitionings; performing a rate distortion optimization based on the predictions and the potential prediction errors to determine the selected prediction partitioning and the associated plurality of prediction partitions; and generating the prediction partitioning indicators or prediction partitioning codewords associated with the selected prediction partitioning and the plurality of prediction partitions. Partitioning the individual prediction error data partitions of the subset of prediction error data partitions may include a bi-tree partitioning. Partitioning the individual prediction error data partitions of the subset of prediction error data partitions into the selected coding partitioning and the associated plurality of coding partitions may include: partitioning individual prediction error data partitions of the subset of prediction error data partitions into a plurality of potential coding partitionings; performing content adaptive transforms on one or more first coding partitions of each of the plurality of potential coding partitionings and fixed transforms on one or more second coding partitions of each of the plurality of potential coding partitionings, wherein the first coding partitions include small to medium sized partitions, wherein the second coding partitions include medium to large sized partitions, wherein the fixed transforms includes at least one of a discrete cosine transform or a discrete cosine transform approximator, and wherein the content adaptive transforms includes a hybrid parametric Haar transform, wherein the hybrid parametric Haar transform includes a parametric Haar transform in a first direction and a discrete cosine transform in a second direction; and/or performing a second rate distortion optimization based on the content adaptive transforms and fixed transforms of the plurality of potential coding partitionings to determine the selected coding partitioning and the associated plurality of coding partitions and associated selected content adaptive and fixed transforms, wherein the coding partitions have associated transform coefficients.

In some implementations, the first video frame is an I-picture and the second video frame is at least one of a B/F-picture or a P-picture. The determination of whether the first video frame is a first type the second video frame is a second type may include a third rate distortion optimization. The modes may include at least one of intra mode, inter mode, multi mode, skip mode, or auto mode. The reference types may include at least one of the morphed prediction reference picture, the synthesized prediction reference picture, the first decoded prediction reference picture, or the second decoded prediction reference picture, and wherein the first decoded prediction reference picture includes a past decoded prediction reference picture or a future decoded prediction reference picture. The determination of modes and reference types may include a fourth rate distortion optimization.

In some implementations, the morphed prediction reference picture may include at least one of a gain modified prediction reference picture, a blur modified prediction reference picture, a dominant motion modified prediction reference picture, or a registration modified prediction reference picture and wherein the synthesized prediction reference picture includes at least one of a super resolution prediction reference picture or a projection trajectory prediction reference picture. Generation of the morphing characteristic parameters may include at least one of generating the morphing characteristic parameters based at least in part on the second video frame and a previously decoded prediction reference picture or generating the morphing characteristic parameters based at least in part on the second video frame and a third original video frame, and the motion data may include a motion vector.

In another example, a video encoder may include an image buffer and a graphics processing unit communicatively coupled to the image buffer. The graphics processing unit may be configured to: segment a first video frame of a first type and a second video frame of a second type into a first plurality of tiles or super-fragments and a second plurality of tiles or super-fragments. The graphics processing unit may also be configured to partition the first plurality of tiles or super-fragments using a first partitioning technique and the second plurality of tiles or super-fragments using a second partitioning technique, wherein the first and second partitioning techniques are different. A selected prediction partitioning and an associated plurality of prediction partitions for the second video frame may be determined. A first reconstructed tile or super-fragment may be generated. Deblock filtering parameters and a first final reconstructed tile or super-fragment may be generated based at least in part on the first reconstructed tile or super-fragment and the deblock filtering parameters. The first final reconstructed tile or super-fragment and a second final reconstructed tile or super-fragment may be assembled to generate a first decoded prediction reference picture. Morphing characteristic parameters and a morphed prediction reference picture may be generated based at least in part on the morphing characteristic parameters and the first decoded reference picture. Synthesizing characteristic parameters and a synthesized prediction reference picture may be generated based at least in part on the synthesizing characteristic parameters and the first decoded reference picture or a second decoded reference picture. A mode and a reference type may be determined for each of the plurality of prediction partitions. Motion data associated with the plurality of prediction partitions may be generated based at least in part on one of the morphed prediction reference picture or the synthesized prediction reference picture. Motion compensation may be performed based on the motion data and at least one of the morphed prediction reference picture or the synthesized prediction reference picture to generate a plurality of predicted partitions for the plurality of prediction partition. A difference may be taken of the plurality of predicted partitions with corresponding original pixel data to generate a corresponding plurality of prediction error data partitions. A determination may be made whether a subset of prediction error data partitions of the plurality of prediction error data partitions are required to be encoded. For the subset of prediction error data partitions that are required to be encoded: individual prediction error data partitions of the subset of prediction error data partitions may be partitioned into a selected coding partitioning and an associated plurality of coding partitions; content adaptive transforms may be performed on one or more first coding partitions and fixed transforms on one or more second coding partitions of the plurality of coding partitionings to generate transform coefficients; and the transform coefficients may be quantized to generate quantized transform coefficients. Frame data associated with the first type and the second type, mode data associated with the modes and the reference type, prediction partitioning indicators or prediction partitioning codewords associated with the selected prediction partitioning, coding partitioning indicators or coding partitioning codewords associated with the selected coding partitioning, the motion data, the quantized transform coefficients, the morphing characteristic parameters, the synthesizing characteristic parameters, and the deblock filtering parameters all may be entropy encoded into a bitstream.

In a further example a decoder system may include a video decoder configured to decode an encoded bitstream. The video decoder may be configured to entropy decode the encoded bitstream to determine quantized transform coefficients, data associated with the selected content adaptive and fixed transforms, coding partitioning indicators or coding partitioning codewords, deblock filtering parameters, morphing characteristic parameters, synthesizing characteristic parameters, motion data, prediction partitioning indicators or prediction partitioning codewords. An inverse quantization may be performed based at least in part on the quantized transform coefficients to generate decoded transform coefficients. An inverse transforms may be based at least in part on the decoded transform coefficients and the data associated with the selected content adaptive and fixed transforms to generate a plurality of decoded coding partitions. The plurality of decoded coding partitions may be assembled based at least in part on the coding partitioning indicators or coding partitioning codewords to generate a decoded prediction error data partition. At least one of a first decoded tile or super-fragment may be generated. Deblock filtering may be applied to the first decoded tile or super-fragment based at least in part on the deblock filtering parameters to generate a first final decoded reconstructed tile or super-fragment.

The first final decoded reconstructed tile or super-fragment and a second final decoded reconstructed tile or super-fragment may be assembled to generate a decoded reconstructed video frame. A morphed prediction reference picture may be generated based at least in part on the morphing characteristic parameters and the decoded reconstructed video frame. A synthesized prediction reference picture may be generated based at least in part on the synthesizing characteristic parameters and at least one of the reconstructed video frame or a second reconstructed video frame. Motion compensation may be performed based at least in part on the decoder morphed prediction reference picture or the decoder synthesized prediction reference picture and the motion data to generate a decoded predicted partition. The decoded predicted partition may be added to the decoded prediction error data partition to generate a first decoded reconstructed partition. The first decoded reconstructed partition and a second decoded reconstructed partition may be combined based at least in part on the prediction partitioning indicators or prediction partitioning codewords to generate a third final decoded reconstructed tile or super-fragment. The third final decoded reconstructed tile or super-fragment and a fourth final decoded reconstructed tile or super-fragment may be assembled to generate a second decoded reconstructed video frame. The second decoded reconstructed video frame may be transmitted for presentment via a display device.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for video coding, comprising:
   segmenting a first video frame of a first type and a second video frame of a second type into a first plurality of tiles or super-fragments and a second plurality of tiles or super-fragments;
   partitioning the first plurality of tiles or super-fragments using a first partitioning technique and the second plurality of tiles or super-fragments using a second partitioning technique, wherein the first and second partitioning techniques are different;
   determining a selected prediction partitioning and an associated plurality of prediction partitions for the second video frame;
   generating a first reconstructed tile or super-fragment;
   generating deblock filtering parameters and a first final reconstructed tile or super-fragment based at least in part on the first reconstructed tile or super-fragment and the deblock filtering parameters;
   assembling the first final reconstructed tile or super-fragment and a second final reconstructed tile or super-fragment to generate a first decoded prediction reference picture;
   generating morphing characteristic parameters and a morphed prediction reference picture based at least in part on the morphing characteristic parameters and the first decoded reference picture;
   generating synthesizing characteristic parameters and a synthesized prediction reference picture based at least in part on the synthesizing characteristic parameters and the first decoded reference picture or a second decoded reference picture;
   determining a mode and a reference type for each of the plurality of prediction partitions;
   generating motion data associated with the plurality of prediction partitions based at least in part on one of the morphed prediction reference picture or the synthesized prediction reference picture;
   performing motion compensation based on the motion data and at least one of the morphed prediction reference picture or the synthesized prediction reference picture to generate a plurality of predicted partitions for the plurality of prediction partition;
   differencing the plurality of predicted partitions with corresponding original pixel data to generate a corresponding plurality of prediction error data partitions;
   determining a subset of prediction error data partitions of the plurality of prediction error data partitions are required to be encoded;
   for the subset of prediction error data partitions that are required to be encoded:
      partitioning individual prediction error data partitions of the subset of prediction error data partitions into a selected coding partitioning and an associated plurality of coding partitions;
      performing content adaptive transforms on one or more first coding partitions and fixed transforms on one or more second coding partitions of the plurality of coding partitionings to generate transform coefficients; and
      quantizing the transform coefficients to generate quantized transform coefficients; and
   entropy encoding frame data associated with the first type and the second type, mode data associated with the modes and the reference type, prediction partitioning indicators or prediction partitioning codewords associated with the selected prediction partitioning, coding partitioning indicators or coding partitioning codewords associated with the selected coding partitioning, the motion data, the quantized transform coefficients, the morphing characteristic parameters, the synthesizing characteristic parameters, and the deblock filtering parameters into a bitstream.

2. The method of claim 1, wherein the first partitioning technique comprises a k-d tree partitioning technique and the second partitioning techniques comprises a bi-tree partitioning technique.

3. The method of claim 1, wherein determining the selected prediction partitioning and the associated plurality of prediction partitions for the second video frame comprises:
   partitioning the second video into a plurality of potential prediction partitionings based on the second partitioning technique;

performing predictions for each of the plurality of potential prediction partitionings and determining potential prediction errors for each of the plurality of potential prediction partitionings;

performing a rate distortion optimization based on the predictions and the potential prediction errors to determine the selected prediction partitioning and the associated plurality of prediction partitions; and generating the prediction partitioning indicators or prediction partitioning codewords associated with the selected prediction partitioning and the plurality of prediction partitions.

4. The method of claim 1, wherein partitioning the individual prediction error data partitions of the subset of prediction error data partitions comprises a bi-tree partitioning.

5. The method of claim 1, wherein partitioning the individual prediction error data partitions of the subset of prediction error data partitions into the selected coding partitioning and the associated plurality of coding partitions comprises:

partitioning individual prediction error data partitions of the subset of prediction error data partitions into a plurality of potential coding partitionings;

performing content adaptive transforms on one or more first coding partitions of each of the plurality of potential coding partitionings and fixed transforms on one or more second coding partitions of each of the plurality of potential coding partitionings; and performing a rate distortion optimization based on the content adaptive transforms and fixed transforms of the plurality of potential coding partitionings to determine the selected coding partitioning and the associated plurality of coding partitions and associated selected content adaptive and fixed transforms.

6. The method of claim 1, wherein the fixed transforms comprises at least one of a discrete cosine transform or a discrete cosine transform approximator, and wherein the content adaptive transforms comprises a hybrid parametric Haar transform.

7. The method of claim 1, wherein the entropy encoding comprises at least one of an adaptive symbol-run variable length coding technique or an adaptive proxy variable length coding technique, and wherein entropy encoding the prediction partitioning indicators or the prediction partitioning codewords comprises a different entropy encoding technique than entropy encoding the morphing characteristic parameters or the synthesizing characteristic parameters.

8. The method of claim 1, wherein the morphed prediction reference picture comprises at least one of a gain modified prediction reference picture, a blur modified prediction reference picture, a dominant motion modified prediction reference picture, or a registration modified prediction reference picture and wherein the synthesized prediction reference picture comprises at least one of a super resolution prediction reference picture or a projection trajectory prediction reference picture.

9. The method of claim 1, further comprising:
generating deblock filtering or deblock and dither filtering parameters and in-loop filtering or quality restoration filtering parameters and generating the second final reconstructed tile or super-fragment based at least in part on the deblock filtering or deblock and dither filtering parameters and the in-loop filtering or quality restoration filtering parameters and a second reconstructed tile or super-fragment;

storing the first decoded prediction reference picture in a picture buffer, wherein performing the motion compensation comprises generating adaptive motion filtering parameters or adaptive precision filtering parameters and performing the motion compensation based at least in part on an adaptive motion or an adaptive precision filtering using the adaptive motion filtering parameters or adaptive precision filtering parameters;

generating enhanced prediction parameters and an enhanced predicted partition based on a predicted partition and the enhanced prediction parameters;

determining whether to use the enhanced predicted partition or the predicted partition as a selected predicted partition for the prediction partition;

when the selected predicted partition comprises the enhanced predicted partition entropy encoding the enhanced prediction parameters into the bitstream;

determining whether to apply fusion filtering or fusion improvement filtering to the selected predicted partition;

when fusion filtering or fusion improvement filtering is to be applied to the selected predicted partition:
assembling the selected predicted partition and a second selected predicted partition to generate at least a portion of an assembled picture;

generating fusion filtering parameters or fusion improvement filtering parameters and fusion filtering or fusion improvement filtering the portion of the assembled picture based at least in part on the fusion filtering parameters or fusion improvement filtering parameters; and entropy encoding the fusion filtering parameters or the fusion improvement filtering parameters into the bitstream.

10. The method of claim 1, wherein generating the morphing characteristic parameters comprises at least one of generating the morphing characteristic parameters based at least in part on the second video frame and a previously decoded prediction reference picture or generating the morphing characteristic parameters based at least in part on the second video frame and a third original video frame.

11. The method of claim 1, further comprising:
generating deblock filtering or deblock and dither filtering parameters and in-loop filtering or quality restoration filtering parameters and generating the second final reconstructed tile or super-fragment based at least in part on the deblock filtering or deblock and dither filtering parameters and the in-loop filtering or quality restoration filtering parameters and a second reconstructed tile or super-fragment;

storing the first decoded prediction reference picture in a picture buffer, wherein performing the motion compensation comprises generating adaptive motion filtering parameters or adaptive precision filtering parameters and performing the motion compensation based at least in part on an adaptive motion or an adaptive precision filtering using the adaptive motion filtering parameters or adaptive precision filtering parameters;

generating enhanced prediction parameters and an enhanced predicted partition based on a predicted partition and the enhanced prediction parameters;

determining whether to use the enhanced predicted partition or the predicted partition as a selected predicted partition for the prediction partition;

when the selected predicted partition comprises the enhanced predicted partition entropy encoding the enhanced prediction parameters into the bitstream;

determining whether to apply fusion filtering or fusion improvement filtering to the selected predicted partition;

when fusion filtering or fusion improvement filtering is to be applied to the selected predicted partition:
  assembling the selected predicted partition and a second selected predicted partition to generate at least a portion of an assembled picture;
  generating fusion filtering parameters or fusion improvement filtering parameters and fusion filtering or fusion improvement filtering the portion of the assembled picture based at least in part on the fusion filtering parameters or fusion improvement filtering parameters; and
  entropy encoding the fusion filtering parameters or the fusion improvement filtering parameters into the bitstream; and entropy encoding data associated with the selected content adaptive and fixed transforms, the deblock filtering or deblock and dither filtering parameters, and the in-loop filtering or quality restoration filtering parameters into the bitstream, wherein the entropy encoding comprises at least one of an adaptive symbol-run variable length coding technique or an adaptive proxy variable length coding technique, and wherein entropy encoding the prediction partitioning indicators or the prediction partitioning codewords comprises a different entropy encoding technique than entropy encoding the morphing characteristic parameters or the synthesizing characteristic parameters;

transmitting the bitstream;

receiving the bitstream;

entropy decoding the bitstream to determine the frame data associated with the first type and the second type, mode data associated with the modes and the reference type, prediction partitioning indicators or prediction partitioning codewords associated with the selected prediction partitioning, coding partitioning indicators or coding partitioning codewords associated with the selected coding partitioning, the motion data, the quantized transform coefficients, the morphing characteristic parameters, the synthesizing characteristic parameters, the deblock filtering parameters, the enhanced prediction parameters, the fusion filtering parameters or the fusion improvement filtering parameters, the data associated with the selected content adaptive and fixed transforms, the deblock filtering or deblock and dither filtering parameters, and the in-loop filtering or quality restoration filtering parameters, wherein the entropy decoding comprises at least one of the adaptive symbol-run variable length coding technique or the adaptive proxy variable length coding technique, and wherein entropy decoding the prediction partitioning indicators or the prediction partitioning codewords comprises a different entropy decoding technique than entropy decoding the quantized transform coefficients;

performing an inverse quantization based at least in part on the quantized transform coefficients to generate decoded transform coefficients;

performing inverse transforms based at least in part on the decoded transform coefficients and the transform indicators to generate a plurality of decoded coding partitions, wherein the inverse transforms comprises at least one of an inverse fixed transforms, an inverse discrete cosine transform, an inverse discrete cosine transform approximator, an inverse adaptive transform, or an inverse hybrid parametric Haar transform;

assembling the plurality of decoded coding partitions to generate a decoded prediction error data partition;

generating at least one of a first decoded tile or super-fragment;

applying decoder deblock filtering or decoder deblock and dither filtering and decoder in-loop or decoder quality restoration filtering to the first decoded tile or super-fragment based at least in part on the deblock filtering parameters or deblock and dither filtering parameters and the in-loop filtering parameters or quality restoration filtering parameters to generate a first final decoded reconstructed tile or super-fragment;

assembling the first final decoded reconstructed tile or super-fragment and a second final decoded reconstructed tile or super-fragment to generate a decoded reconstructed video frame;

storing the decoded reconstructed video frame in a decoder picture buffer;

generating a decoder morphed prediction reference picture based at least in part on the morphing characteristic parameters;

generating a decoder synthesized prediction reference picture based at least in part on the synthesizing characteristic parameters;

performing decoder motion compensation based at least in part on the decoder morphed prediction reference picture or the decoder synthesized prediction reference picture to generate a decoded predicted partition, wherein the decoder motion compensation comprises a decoder adaptive motion filtering or a decoder adaptive precision filtering based at least in part on the adaptive motion filtering parameters or adaptive precision filtering parameters;

generating an enhanced decoded predicted partition based at least in part on the enhanced prediction parameters and the decoded predicted partition;

determining whether to use the decoded enhanced predicted partition or the decoded predicted partition as a selected decoded predicted partition;

determining whether to apply decoder fusion filtering or decoder fusion improvement filtering to the selected decoded predicted partition;

when decoder fusion filtering or decoder fusion improvement filtering is to be applied to the selected decoded predicted partition:
  assembling the selected decoded predicted partition and a second selected decoded predicted partition to generate at least a portion of a decoded assembled picture; and
  decoder fusion filtering or decoder fusion improvement filtering the portion of the decoded assembled picture based at least in part on the fusion filtering parameters or the fusion improvement filtering parameters;

adding the selected decoded predicted partition to the decoded prediction error data partition to generate a first decoded reconstructed partition;

combining the first decoded reconstructed partition and a second decoded reconstructed partition to generate a third final decoded reconstructed tile or super-fragment;

assembling the third final decoded reconstructed tile or super-fragment and a fourth final decoded reconstructed tile or super-fragment to generate a second decoded reconstructed video frame; and transmitting the second decoded reconstructed video frame for presentment via a display device, wherein segmenting the first video frame into the first plurality of super-fragments comprises dividing the first video frame into a third plurality of tiles and segmenting the first video frame into two or more region layers, wherein at least one super-fragment of the first plurality of super-fragments comprises an individual region layer of the two or more region layers within an individual tile of the second plurality of tiles, wherein the first partitioning technique comprises a k-d tree partitioning technique and the second partitioning techniques comprises a bi-tree partitioning technique, wherein determining the selected prediction partitioning and the associated plurality of prediction partitions for the second video frame comprises:

partitioning the second video into a plurality of potential prediction partitionings based on the second partitioning technique;

performing predictions for each of the plurality of potential prediction partitionings and determining potential prediction errors for each of the plurality of potential prediction partitionings;

performing a rate distortion optimization based on the predictions and the potential prediction errors to determine the selected prediction partitioning and the associated plurality of prediction partitions; and generating the prediction partitioning indicators or prediction partitioning codewords associated with the selected prediction partitioning and the plurality of prediction partitions;

wherein partitioning the individual prediction error data partitions of the subset of prediction error data partitions comprises a bi-tree partitioning, wherein partitioning the individual prediction error data partitions of the subset of prediction error data partitions into the selected coding partitioning and the associated plurality of coding partitions comprises:

partitioning individual prediction error data partitions of the subset of prediction error data partitions into a plurality of potential coding partitionings;

performing content adaptive transforms on one or more first coding partitions of each of the plurality of potential coding partitionings and fixed transforms on one or more second coding partitions of each of the plurality of potential coding partitionings, wherein the first coding partitions comprise small to medium sized partitions, wherein the second coding partitions comprise medium to large sized partitions, wherein the fixed transforms comprises at least one of a discrete cosine transform or a discrete cosine transform approximator, and wherein the content adaptive transforms comprises a hybrid parametric Haar transform, wherein the hybrid parametric Haar transform comprises a parametric Haar transform in a first direction and a discrete cosine transform in a second direction; and performing a second rate distortion optimization based on the content adaptive transforms and fixed transforms of the plurality of potential coding partitionings to determine the selected coding partitioning and the associated plurality of coding partitions and associated selected content adaptive and fixed transforms, wherein the coding partitions have associated transform coefficients;

wherein the first video frame is an I-picture and the second video frame is at least one of a B/F-picture or a P-picture, wherein determining the first video frame is a first type the second video frame is a second type comprises a third rate distortion optimization, wherein the modes comprise at least one of intra mode, inter mode, multi mode, skip mode, or auto mode, wherein the reference types comprise at least one of the morphed prediction reference picture, the synthesized prediction reference picture, the first decoded prediction reference picture, or the second decoded prediction reference picture, and wherein the first decoded prediction reference picture comprises a past decoded prediction reference picture or a future decoded prediction reference picture, wherein determining modes and reference types comprises a fourth rate distortion optimization, wherein the morphed prediction reference picture comprises at least one of a gain modified prediction reference picture, a blur modified prediction reference picture, a dominant motion modified prediction reference picture, or a registration modified prediction reference picture and wherein the synthesized prediction reference picture comprises at least one of a super resolution prediction reference picture or a projection trajectory prediction reference picture, wherein generating the morphing characteristic parameters comprises at least one of generating the morphing characteristic parameters based at least in part on the second video frame and a previously decoded prediction reference picture or generating the morphing characteristic parameters based at least in part on the second video frame and a third original video frame, and wherein the motion data comprises a motion vector.

12. A video encoder comprising:
an image buffer;
a graphics processing unit communicatively coupled to the image buffer and configured to:
segment a first video frame of a first type and a second video frame of a second type into a first plurality of tiles or super-fragments and a second plurality of tiles or super-fragments;
partition the first plurality of tiles or super-fragments using a first partitioning technique and the second plurality of tiles or super-fragments using a second partitioning technique, wherein the first and second partitioning techniques are different;
determine a selected prediction partitioning and an associated plurality of prediction partitions for the second video frame;
generate a first reconstructed tile or super-fragment;
generate deblock filtering parameters and a first final reconstructed tile or super-fragment based at least in part on the first reconstructed tile or super-fragment and the deblock filtering parameters;
assemble the first final reconstructed tile or super-fragment and a second final reconstructed tile or super-fragment to generate a first decoded prediction reference picture;
generate morphing characteristic parameters and a morphed prediction reference picture based at least in part on the morphing characteristic parameters and the first decoded reference picture;
generate synthesizing characteristic parameters and a synthesized prediction reference picture based at least in part on the synthesizing characteristic parameters and the first decoded reference picture or a second decoded reference picture;

determine a mode and a reference type for each of the plurality of prediction partitions;
generate motion data associated with the plurality of prediction partitions based at least in part on one of the morphed prediction reference picture or the synthesized prediction reference picture;
perform motion compensation based on the motion data and at least one of the morphed prediction reference picture or the synthesized prediction reference picture to generate a plurality of predicted partitions for the plurality of prediction partition;
difference the plurality of predicted partitions with corresponding original pixel data to generate a corresponding plurality of prediction error data partitions;
determine a subset of prediction error data partitions of the plurality of prediction error data partitions are required to be encoded;
for the subset of prediction error data partitions that are required to be encoded:
    partition individual prediction error data partitions of the subset of prediction error data partitions into a selected coding partitioning and an associated plurality of coding partitions;
    perform content adaptive transforms on one or more first coding partitions and fixed transforms on one or more second coding partitions of the plurality of coding partitionings to generate transform coefficients; and
    quantize the transform coefficients to generate quantized transform coefficients;
entropy encode frame data associated with the first type and the second type, mode data associated with the modes and the reference type, prediction partitioning indicators or prediction partitioning codewords associated with the selected prediction partitioning, coding partitioning indicators or coding partitioning codewords associated with the selected coding partitioning, the motion data, the quantized transform coefficients, the morphing characteristic parameters, the synthesizing characteristic parameters, and the deblock filtering parameters into a bitstream.

13. The video encoder of claim 12, wherein the graphics processing unit is further configured to:
generate deblock filtering or deblock and dither filtering parameters and in-loop filtering or quality restoration filtering parameters and generate the second final reconstructed tile or super-fragment based at least in part on the deblock filtering or deblock and dither filtering parameters and the in-loop filtering or quality restoration filtering parameters and a second reconstructed tile or super-fragment;
store the first decoded prediction reference picture in a picture buffer, wherein to perform the motion compensation comprises the graphics processing unit being configured to generate adaptive motion filtering parameters or adaptive precision filtering parameters and perform the motion compensation based at least in part on an adaptive motion or an adaptive precision filtering using the adaptive motion filtering parameters or adaptive precision filtering parameters;
generate enhanced prediction parameters and an enhanced predicted partition based on a predicted partition and the enhanced prediction parameters;
determine whether to use the enhanced predicted partition or the predicted partition as a selected predicted partition for the prediction partition;
when the selected predicted partition comprises the enhanced predicted partition entropy encode the enhanced prediction parameters into the bitstream;
determining whether to apply fusion filtering or fusion improvement filtering to the selected predicted partition;
when fusion filtering or fusion improvement filtering is to be applied to the selected predicted partition:
    assemble the selected predicted partition and a second selected predicted partition to generate at least a portion of an assembled picture;
    generate fusion filtering parameters or fusion improvement filtering parameters and fusion filtering or fusion improvement filtering the portion of the assembled picture based at least in part on the fusion filtering parameters or fusion improvement filtering parameters; and
    entropy encode the fusion filtering parameters or the fusion improvement filtering parameters into the bitstream; and
entropy encode data associated with the selected content adaptive and fixed transforms, the deblock filtering or deblock and dither filtering parameters, and the in-loop filtering or quality restoration filtering parameters into the bitstream, wherein to entropy encode comprises the graphics processing unit being configured to perform an adaptive symbol-run variable length coding technique or an adaptive proxy variable length coding technique, and wherein to entropy encode the prediction partitioning indicators or the prediction partitioning codewords comprises the graphics processing unit being configured to perform a different entropy encoding technique that used to entropy encode the morphing characteristic parameters or the synthesizing characteristic parameters; and
transmit the bitstream,
wherein to segment the first video frame into the first plurality of super-fragments comprises the graphics processing unit being configured to divide the first video frame into a third plurality of tiles and segment the first video frame into two or more region layers, wherein at least one super-fragment of the first plurality of super-fragments comprises an individual region layer of the two or more region layers within an individual tile of the second plurality of tiles,
wherein the first partitioning technique comprises a k-d tree partitioning technique and the second partitioning techniques comprises a bi-tree partitioning technique,
wherein to determine the selected prediction partitioning and the associated plurality of prediction partitions for the second video frame comprises the graphics processing unit being configured to:
    partition the second video into a plurality of potential prediction partitionings based on the second partitioning technique;
    perform predictions for each of the plurality of potential prediction partitionings and determining potential prediction errors for each of the plurality of potential prediction partitionings;
    perform a rate distortion optimization based on the predictions and the potential prediction errors to determine the selected prediction partitioning and the associated plurality of prediction partitions; and
    generate the prediction partitioning indicators or prediction partitioning codewords associated with the selected prediction partitioning and the plurality of prediction partitions;

wherein to partitioning the individual prediction error data partitions of the subset of prediction error data partitions comprises the graphics processing unit being configured to perform a bi-tree partitioning, wherein to partition the individual prediction error data partitions of the subset of prediction error data partitions into the selected coding partitioning and the associated plurality of coding partitions comprises the graphics processing unit being configured to:

partition individual prediction error data partitions of the subset of prediction error data partitions into a plurality of potential coding partitionings;

perform content adaptive transforms on one or more first coding partitions of each of the plurality of potential coding partitionings and fixed transforms on one or more second coding partitions of each of the plurality of potential coding partitionings, wherein the first coding partitions comprise small to medium sized partitions, wherein the second coding partitions comprise medium to large sized partitions, wherein the fixed transforms comprises at least one of a discrete cosine transform or a discrete cosine transform approximator, and wherein the content adaptive transforms comprises a hybrid parametric Haar transform, wherein the hybrid parametric Haar transform comprises a parametric Haar transform in a first direction and a discrete cosine transform in a second direction; and perform a second rate distortion optimization based on the content adaptive transforms and fixed transforms of the plurality of potential coding partitionings to determine the selected coding partitioning and the associated plurality of coding partitions and associated selected content adaptive and fixed transforms, wherein the coding partitions have associated transform coefficients;

wherein the first video frame is an I-picture and the second video frame is at least one of a B/F-picture or a P-picture, wherein to determine the first video frame is a first type the second video frame is a second type comprises the graphics processing unit being configured to implement a third rate distortion optimization, wherein the modes comprise at least one of intra mode, inter mode, multi mode, skip mode, or auto mode, wherein the reference types comprise at least one of the morphed prediction reference picture, the synthesized prediction reference picture, the first decoded prediction reference picture, or the second decoded prediction reference picture, and wherein the first decoded prediction reference picture comprises a past decoded prediction reference picture or a future decoded prediction reference picture, wherein to determine modes and reference types comprises the graphics processing unit being configured to implement a fourth rate distortion optimization, wherein the morphed prediction reference picture comprises at least one of a gain modified prediction reference picture, a blur modified prediction reference picture, a dominant motion modified prediction reference picture, or a registration modified prediction reference picture and wherein the synthesized prediction reference picture comprises at least one of a super resolution prediction reference picture or a projection trajectory prediction reference picture, wherein to generate the morphing characteristic parameters comprises the graphics processing unit being configured to generate the morphing characteristic parameters based at least in part on the second video frame and a previously decoded prediction reference picture or generate the morphing characteristic parameters based at least in part on the second video frame and a third original video frame, and wherein the motion data comprises a motion vector.

14. A decoder system comprising:

an image buffer;

a video decoder communicatively coupled to the image buffer, the video decoder configured to decode an encoded bitstream, wherein the video decoder is configured to:

entropy decode the encoded bitstream to determine quantized transform coefficients, data associated with the selected content adaptive and fixed transforms, coding partitioning indicators or coding partitioning codewords, deblock filtering parameters, morphing characteristic parameters, synthesizing characteristic parameters, motion data, prediction partitioning indicators or prediction partitioning codewords, perform an inverse quantization based at least in part on the quantized transform coefficients to generate decoded transform coefficients;

perform inverse transforms based at least in part on the decoded transform coefficients and the data associated with the selected content adaptive and fixed transforms to generate a plurality of decoded coding partitions;

assemble the plurality of decoded coding partitions based at least in part on the coding partitioning indicators or coding partitioning codewords to generate a decoded prediction error data partition;

generate at least one of a first decoded tile or super-fragment;

apply deblock filtering to the first decoded tile or super-fragment based at least in part on the deblock filtering parameters to generate a first final decoded reconstructed tile or super-fragment;

assemble the first final decoded reconstructed tile or super-fragment and a second final decoded reconstructed tile or super-fragment to generate a decoded reconstructed video frame;

generate a morphed prediction reference picture based at least in part on the morphing characteristic parameters and the decoded reconstructed video frame;

generate a synthesized prediction reference picture based at least in part on the synthesizing characteristic parameters and at least one of the reconstructed video frame or a second reconstructed video frame;

perform motion compensation based at least in part on the decoder morphed prediction reference picture or the decoder synthesized prediction reference picture and the motion data to generate a decoded predicted partition;

add the decoded predicted partition to the decoded prediction error data partition to generate a first decoded reconstructed partition;

combine the first decoded reconstructed partition and a second decoded reconstructed partition based at least in part on the prediction partitioning indicators or prediction partitioning codewords to generate a third final decoded reconstructed tile or super-fragment;

assemble the third final decoded reconstructed tile or super-fragment and a fourth final decoded reconstructed tile or super-fragment to generate a second decoded reconstructed video frame; and transmit the second decoded reconstructed video frame for presentment via a display device.

15. The decoder system of claim 14, further comprising:
an antenna communicatively coupled to the antenna and configured to receive the encoded bitstream of video data; and
a display device configured to present video frames.

16. The decoder system of claim 14, wherein to entropy decode comprises the video decoder being configured to implement at least one of an adaptive symbol-run variable length coding technique or an adaptive proxy variable length coding technique, and wherein to entropy decode the prediction partitioning indicators or the prediction partitioning codewords the video decoder being configured to implement a different entropy decoding technique than that used to entropy decode the quantized transform coefficients.

17. The decoder system of claim 14, wherein the inverse transforms comprises at least one of an inverse fixed transforms, an inverse discrete cosine transform, an inverse discrete cosine transform approximator, an inverse adaptive transform, or an inverse hybrid parametric Haar transform.

18. The decoder system of claim 14, wherein the coding partitioning indicators or coding partitioning codewords comprise bi-tree partitioning coding partitioning indicators or coding partitioning codewords.

19. The decoder system of claim 14, wherein the prediction partitioning indicators or prediction partitioning codewords comprise at least one of k-d tree partitioning or bi-tree partitioning prediction partitioning indicators or prediction partitioning codewords.

20. The decoder system of claim 14, wherein the video decoder is further configured to:
entropy decode the bitstream to determine enhanced prediction parameters, fusion filtering parameters or fusion improvement filtering parameters, and adaptive motion filtering parameters or adaptive precision filtering parameters;
generate an enhanced decoded predicted partition based at least in part on the enhanced prediction parameters and the decoded predicted partition;
determine whether to use the decoded enhanced predicted partition or the decoded predicted partition as a selected decoded predicted partition;
determine whether to apply decoder fusion filtering or decoder fusion improvement filtering to the selected decoded predicted partition;
when decoder fusion filtering or decoder fusion improvement filtering is to be applied to the selected decoded predicted partition:
assemble the selected decoded predicted partition and a second selected decoded predicted partition to generate at least a portion of a decoded assembled picture; and
fusion filter or fusion improvement filter the portion of the decoded assembled picture based at least in part on the fusion filtering parameters or the fusion improvement filtering parameters.

21. The decoder system of claim 14, wherein the morphed prediction reference picture comprises at least one of a gain modified prediction reference picture, a blur modified prediction reference picture, a dominant motion modified prediction reference picture, or a registration modified prediction reference picture and wherein the synthesized prediction reference picture comprises at least one of a super resolution prediction reference picture or a projection trajectory prediction reference picture.

22. The decoder of system 14, further comprising:
an antenna communicatively coupled to the antenna and configured to receive the encoded bitstream of video data; and
a display device configured to present video frames,
wherein the video decoder is further configured to:
receive the bitstream;
entropy decode the bitstream to determine frame data associated with a first type of the first decoded reconstructed video frame and a second type of the second decoded reconstructed video frame, mode data associated with a mode and a reference type for the prediction partition, enhanced prediction parameters, fusion filtering parameters or fusion improvement filtering parameters, deblock filtering or deblock and dither filtering parameters, and in-loop filtering or quality restoration filtering parameters, wherein to entropy decode comprises the video decoder being configured to implement at least one of an adaptive symbol-run variable length coding technique or an adaptive proxy variable length coding technique, and wherein to entropy decode the prediction partitioning indicators or the prediction partitioning codewords the video decoder being configured to implement a different entropy decoding technique than that used to entropy decode the quantized transform coefficients, wherein to perform motion compensation comprises the video decoder being configured to implement an adaptive motion filtering or an adaptive precision filtering based at least in part on the adaptive motion filtering parameters or adaptive precision filtering parameters;
generate an enhanced decoded predicted partition based at least in part on the enhanced prediction parameters and the decoded predicted partition;
determine whether to use the decoded enhanced predicted partition or the decoded predicted partition as a selected decoded predicted partition;
determine whether to apply decoder fusion filtering or decoder fusion improvement filtering to the selected decoded predicted partition;
when decoder fusion filtering or decoder fusion improvement filtering is to be applied to the selected decoded predicted partition:
assemble the selected decoded predicted partition and a second selected decoded predicted partition to generate at least a portion of a decoded assembled picture; and
fusion filter or fusion improvement filter the portion of the decoded assembled picture based at least in part on the fusion filtering parameters or the fusion improvement filtering parameters,
wherein the coding partitioning indicators or coding partitioning codewords comprise bi-tree partitioning coding partitioning indicators or coding partitioning codewords,
wherein the prediction partitioning indicators or prediction partitioning codewords comprise at least one of k-d tree partitioning or bi-tree partitioning prediction partitioning indicators or prediction partitioning codewords,
wherein the inverse transforms comprises at least one of an inverse fixed transforms, an inverse discrete cosine transform, an inverse discrete cosine transform approximator, an inverse adaptive transform, or an inverse hybrid parametric Haar transform, wherein the morphed prediction reference picture comprises at least one of a gain modified prediction reference picture, a blur modified prediction reference picture, a dominant motion modified prediction reference picture, or a registration modified prediction reference picture and wherein the synthesized prediction reference picture comprises at least one of a super resolution prediction reference picture or a projection trajectory prediction reference picture, wherein generating the morphing characteristic parameters comprises at least one of generating the morphing characteristic parameters based at least in part on the second video frame and a previously decoded prediction reference picture or generating the morphing characteristic parameters based at least in part on the second video frame and a third original video frame, and wherein the motion data comprises a motion vector.

23. At least one non-transitory machine readable medium comprising a plurality of instructions that in response to being executed on a computing device, cause the computing device to:

segment a first video frame of a first type and a second video frame of a second type into a first plurality of tiles or super-fragments and a second plurality of tiles or super-fragments;

partition the first plurality of tiles or super-fragments using a first partitioning technique and the second plurality of tiles or super-fragments using a second partitioning technique, wherein the first and second partitioning techniques are different;

determine a selected prediction partitioning and an associated plurality of prediction partitions for the second video frame;

generate a first reconstructed tile or super-fragment;

generate deblock filtering parameters and a first final reconstructed tile or super-fragment based at least in part on the first reconstructed tile or superfragment and the deblock filtering parameters;

assemble the first final reconstructed tile or super-fragment and a second final reconstructed tile or super-fragment to generate a first decoded prediction reference picture;

generate morphing characteristic parameters and a morphed prediction reference picture based at least in part on the morphing characteristic parameters and the first decoded reference picture;

generate synthesizing characteristic parameters and a synthesized prediction reference picture based at least in part on the synthesizing characteristic parameters and the first decoded reference picture or a second decoded reference picture;

determine a mode and a reference type for each of the plurality of prediction partitions;

generate motion data associated with the plurality of prediction partitions based at least in part on one of the morphed prediction reference picture or the synthesized prediction reference picture;

perform motion compensation based on the motion data and at least one of the morphed prediction reference picture or the synthesized prediction reference picture to generate a plurality of predicted partitions for the plurality of prediction partition;

difference the plurality of predicted partitions with corresponding original pixel data to generate a corresponding plurality of prediction error data partitions;

determine a subset of prediction error data partitions of the plurality of prediction error data partitions are required to be encoded;

for the subset of prediction error data partitions that are required to be encoded:

partition individual prediction error data partitions of the subset of prediction error data partitions into a selected coding partitioning and an associated plurality of coding partitions;

perform content adaptive transforms on one or more first coding partitions and fixed transforms on one or more second coding partitions of the plurality of coding partitionings to generate transform coefficients; and quantize the transform coefficients to generate quantized transform coefficients;

entropy encode frame data associated with the first type and the second type, mode data associated with the modes and the reference type, prediction partitioning indicators or prediction partitioning codewords associated with the selected prediction partitioning, coding partitioning indicators or coding partitioning codewords associated with the selected coding partitioning, the motion data, the quantized transform coefficients, the morphing characteristic parameters, the synthesizing characteristic parameters, and the deblock filtering parameters into a bitstream.

24. The machine readable medium of claim 23, further comprising instructions that in response to being executed on the computing device, cause the computing device to:

generate deblock filtering or deblock and dither filtering parameters and in-loop filtering or quality restoration filtering parameters and generate the second final reconstructed tile or super-fragment based at least in part on the deblock filtering or deblock and dither filtering parameters and the in-loop filtering or quality restoration filtering parameters and a second reconstructed tile or super-fragment;

store the first decoded prediction reference picture in a picture buffer, wherein to perform the motion compensation comprises generation of adaptive motion filtering parameters or adaptive precision filtering parameters and perform the motion compensation based at least in part on an adaptive motion or an adaptive precision filtering using the adaptive motion filtering parameters or adaptive precision filtering parameters;

generate enhanced prediction parameters and an enhanced predicted partition based on a predicted partition and the enhanced prediction parameters;

determine whether to use the enhanced predicted partition or the predicted partition as a selected predicted partition for the prediction partition;

when the selected predicted partition comprises the enhanced predicted partition entropy encode the enhanced prediction parameters into the bitstream;

determining whether to apply fusion filtering or fusion improvement filtering to the selected predicted partition;

when fusion filtering or fusion improvement filtering is to be applied to the selected predicted partition:

assemble the selected predicted partition and a second selected predicted partition to generate at least a portion of an assembled picture;

generate fusion filtering parameters or fusion improvement filtering parameters and fusion filtering or fusion improvement filtering the portion of the assembled picture based at least in part on the fusion filtering parameters or fusion improvement filtering parameters; and entropy encode the fusion filtering parameters or the fusion improvement filtering parameters into the bitstream; and entropy encode data associated with the selected content adaptive and fixed transforms, the deblock filtering or deblock and dither filtering parameters, and the in-loop filtering or quality restoration filtering parameters into the bitstream, wherein to entropy encode comprises performance of an adaptive symbol-run variable length coding technique or an adaptive proxy variable length coding technique, and wherein to entropy encode the prediction partitioning indicators or the prediction partitioning codewords comprises performance of a different entropy encoding technique that used to entropy encode the morphing characteristic parameters or the synthesizing characteristic parameters; and transmit the bitstream, wherein to segment the first video frame into the first plurality of super-fragments comprises division of the first video frame into a third plurality of tiles and segment the first video frame into two or more region layers, wherein at least one super-fragment of the first plurality of super-fragments comprises an individual region layer of the two or more region layers within an individual tile of the second plurality of tiles, wherein the first partitioning technique comprises a k-d tree partitioning technique and the second partitioning techniques comprises a bi-tree partitioning technique, wherein to determine the selected prediction partitioning and the associated plurality of prediction partitions for the second video frame comprises:

partition the second video into a plurality of potential prediction partitionings based on the second partitioning technique;

perform predictions for each of the plurality of potential prediction partitionings and determining potential prediction errors for each of the plurality of potential prediction partitionings;

perform a rate distortion optimization based on the predictions and the potential prediction errors to determine the selected prediction partitioning and the associated plurality of prediction partitions; and generate the prediction partitioning indicators or prediction partitioning codewords associated with the selected prediction partitioning and the plurality of prediction partitions;

wherein to partitioning the individual prediction error data partitions of the subset of prediction error data partitions comprises a bi-tree partitioning, wherein to partition the individual prediction error data partitions of the subset of prediction error data partitions into the selected coding partitioning and the associated plurality of coding partitions comprises:

partition individual prediction error data partitions of the subset of prediction error data partitions into a plurality of potential coding partitionings;

perform content adaptive transforms on one or more first coding partitions of each of the plurality of potential coding partitionings and fixed transforms on one or more second coding partitions of each of the plurality of potential coding partitionings, wherein the first coding partitions comprise small to medium sized partitions, wherein the second coding partitions comprise medium to large sized partitions, wherein the fixed transforms comprises at least one of a discrete cosine transform or a discrete cosine transform approximator, and wherein the content adaptive transforms comprises a hybrid parametric Haar transform, wherein the hybrid parametric Haar transform comprises a parametric Haar transform in a first direction and a discrete cosine transform in a second direction; and perform a second rate distortion optimization based on the content adaptive transforms and fixed transforms of the plurality of potential coding partitionings to determine the selected coding partitioning and the associated plurality of coding partitions and associated selected content adaptive and fixed transforms, wherein the coding partitions have associated transform coefficients;

wherein the first video frame is an I-picture and the second video frame is at least one of a B/F-picture or a P-picture, wherein to determine the first video frame is a first type the second video frame is a second type comprises implementation of a third rate distortion optimization, wherein the modes comprise at least one of intra mode, inter mode, multi mode, skip mode, or auto mode, wherein the reference types comprise at least one of the morphed prediction reference picture, the synthesized prediction reference picture, the first decoded prediction reference picture, or the second decoded prediction reference picture, and wherein the first decoded prediction reference picture comprises a past decoded prediction reference picture or a future decoded prediction reference picture, wherein to determine modes and reference types comprises implementation of a fourth rate distortion optimization, wherein the morphed prediction reference picture comprises at least one of a gain modified prediction reference picture, a blur modified prediction reference picture, a dominant motion modified prediction reference picture, or a registration modified prediction reference picture and wherein the synthesized prediction reference picture comprises at least one of a super resolution prediction reference picture or a projection trajectory prediction reference picture, wherein to generate the morphing characteristic parameters comprises generation of the morphing characteristic parameters based at least in part on the second video frame and a previously decoded prediction reference picture or generate the morphing characteristic parameters based at least in part on the second video frame and a third original video frame, and wherein the motion data comprises a motion vector.

* * * * *